United States Patent
Metcalf

(10) Patent No.: US 9,124,308 B2
(45) Date of Patent: Sep. 1, 2015

(54) FURNITURE WITH WIRELESS POWER

(75) Inventor: Keith E. Metcalf, Jasper, IN (US)

(73) Assignee: Kimball International, Inc., Jasper, IN (US)

(*) Notice: Subject to any disclaimer, the term of this patent is extended or adjusted under 35 U.S.C. 154(b) by 282 days.

(21) Appl. No.: 13/587,482

(22) Filed: Aug. 16, 2012

(65) Prior Publication Data
US 2013/0207478 A1 Aug. 15, 2013

Related U.S. Application Data

(63) Continuation-in-part of application No. 13/267,194, filed on Oct. 6, 2011, now Pat. No. 8,262,244, which is a continuation of application No. 12/778,783, filed on May 12, 2010, now Pat. No. 8,061,864.

(60) Provisional application No. 61/300,093, filed on Feb. 1, 2010, provisional application No. 61/186,519, filed on Jun. 12, 2009, provisional application No. 61/177,459, filed on May 12, 2009.

(51) Int. Cl.
*A47B 23/06* (2006.01)
*H04B 5/00* (2006.01)
(Continued)

(52) U.S. Cl.
CPC .............. *H04B 5/0037* (2013.01); *A47B 21/00* (2013.01); *A47B 21/06* (2013.01); *A47B 97/00* (2013.01); *A47C 7/70* (2013.01); *A47C 7/72* (2013.01); *A47C 7/725* (2013.01); *H01F 38/14* (2013.01); *H04B 5/0075* (2013.01); *H04B 5/0093* (2013.01); *F21V 33/0012* (2013.01); *H01R 13/6205* (2013.01); *H02J 5/005* (2013.01)

(58) Field of Classification Search
USPC ................. 362/127, 130–131, 133–134, 253; 307/104, 149–150; 320/107–108, 137; 336/40, 118–119, 121, 130–131
See application file for complete search history.

(56) References Cited

U.S. PATENT DOCUMENTS 3,675,108 A  7/1972 Nicholl
3,843,857 A  10/1974 Cunningham
(Continued)

FOREIGN PATENT DOCUMENTS

JP  2005-094843  4/2005
JP  2005-110412  4/2005
(Continued)

OTHER PUBLICATIONS

Hui et al., "A new generation of universal contactless Battery Charging platform for portable Consumer Electronic equipment," May 2005, IEEE Transactions on Power Electronics, vol. 20, No. 3.
(Continued)

*Primary Examiner* — Meghan Dunwiddie
(74) *Attorney, Agent, or Firm* — Faegre Baker Daniels LLP

(57) ABSTRACT

Furniture components, such as office furniture components, are configured to include electronic components that transfer electrical power to peripheral electronic devices via wireless technologies, including conductive and inductive technologies. The articles of furniture may include grommet devices received within work surfaces, the grommet devices incorporating or housing the electronics of wireless power systems. The articles of furniture may also include the electronics of wireless power systems physically embedded or integrated within work surfaces in a manner in which the continuous surfaces of the work surfaces are maintained, and the work surfaces may optionally further include lighting or other indication features to indicate the locations of the electronics to a user.

20 Claims, 43 Drawing Sheets

(51) Int. Cl.
  *A47B 21/00* (2006.01)
  *A47B 21/06* (2006.01)
  *A47B 97/00* (2006.01)
  *A47C 7/72* (2006.01)
  *H01F 38/14* (2006.01)
  *A47C 7/70* (2006.01)
  *H01R 13/62* (2006.01)
  *H02J 5/00* (2006.01)
  *F21V 33/00* (2006.01)

(56) References Cited

U.S. PATENT DOCUMENTS

| | | |
|---|---|---|
| 4,374,354 A | 2/1983 | Petrovic et al. |
| 4,910,372 A | 3/1990 | Vukich |
| 5,277,609 A | 1/1994 | Ondrejka |
| 5,293,308 A | 3/1994 | Boys et al. |
| 5,428,521 A | 6/1995 | Kigawa et al. |
| 5,563,334 A | 10/1996 | Bracht et al. |
| 5,594,317 A | 1/1997 | Yeow et al. |
| 5,949,155 A | 9/1999 | Tamura et al. |
| 5,959,433 A | 9/1999 | Rohde |
| 6,022,087 A | 2/2000 | Gilbert |
| 6,100,663 A | 8/2000 | Boys et al. |
| 6,133,845 A | 10/2000 | Toms et al. |
| 6,184,651 B1 | 2/2001 | Fernandez et al. |
| 6,291,805 B1 | 9/2001 | Simeray et al. |
| 6,424,248 B1 | 7/2002 | Toms et al. |
| 6,459,218 B2 | 10/2002 | Boys et al. |
| 6,489,745 B1 | 12/2002 | Koreis |
| 6,550,728 B1 | 4/2003 | Fuhrman |
| 6,594,471 B1 | 7/2003 | Crowley et al. |
| 6,633,155 B1 | 10/2003 | Liang |
| 6,650,088 B1 | 11/2003 | Webb et al. |
| 6,803,744 B1 | 10/2004 | Sabo |
| 6,906,495 B2 | 6/2005 | Cheng et al. |
| 6,913,477 B2 | 7/2005 | Dayan et al. |
| 7,042,196 B2 | 5/2006 | Ka-Lai et al. |
| 7,064,275 B2 | 6/2006 | Henriott et al. |
| 7,079,722 B2 | 7/2006 | Mahbobi |
| 7,151,357 B2 | 12/2006 | Xian et al. |
| 7,172,196 B2 | 2/2007 | Randall |
| 7,180,265 B2 | 2/2007 | Naskali et al. |
| 7,180,503 B2 | 2/2007 | Burr et al. |
| 7,189,107 B1 | 3/2007 | Strayer et al. |
| 7,212,414 B2 | 5/2007 | Baarman |
| 7,233,137 B2 | 6/2007 | Nakamura et al. |
| 7,239,110 B2 | 7/2007 | Cheng et al. |
| 7,248,017 B2 | 7/2007 | Cheng et al. |
| 7,262,700 B2 | 8/2007 | Hsu |
| 7,263,388 B2 | 8/2007 | Yamamoto |
| 7,374,444 B1 | 5/2008 | Bennett |
| 7,378,817 B2 | 5/2008 | Calhoon et al. |
| 7,392,068 B2 | 6/2008 | Dayan et al. |
| 7,393,053 B2 | 7/2008 | Kurrasch et al. |
| 7,399,202 B2 | 7/2008 | Dayan et al. |
| 7,471,062 B2 | 12/2008 | Bruning |
| 7,514,899 B2 | 4/2009 | Deng-Peng |
| 7,518,337 B2 | 4/2009 | Beart et al. |
| 7,525,283 B2 | 4/2009 | Cheng et al. |
| 7,554,316 B2 | 6/2009 | Stevens et al. |
| 7,622,891 B2 | 11/2009 | Cheng et al. |
| 7,633,263 B2 | 12/2009 | Toya et al. |
| 7,639,994 B2 | 12/2009 | Greene et al. |
| 7,714,537 B2 | 5/2010 | Cheng et al. |
| 7,715,187 B2 | 5/2010 | Hotelling et al. |
| 8,061,864 B2 | 11/2011 | Metcalf et al. |
| 2002/0043927 A1 | 4/2002 | Kimura |
| 2002/0045772 A1 | 4/2002 | Watanabe |
| 2002/0061323 A1 | 5/2002 | Podszun et al. |
| 2002/0067874 A1 | 6/2002 | Beaman |
| 2002/0072782 A1 | 6/2002 | Osorio |
| 2002/0171335 A1 | 11/2002 | Held |
| 2003/0048254 A1 | 3/2003 | Huang |
| 2003/0210106 A1 | 11/2003 | Chang et al. |
| 2004/0026998 A1 | 2/2004 | Henriott et al. |
| 2004/0189246 A1 | 9/2004 | Bulai et al. |
| 2005/0052156 A1 | 3/2005 | Liebenow |
| 2006/0043927 A1 | 3/2006 | Beart et al. |
| 2006/0061323 A1 | 3/2006 | Cheng et al. |
| 2006/0064037 A1 | 3/2006 | Shalon et al. |
| 2007/0069684 A1 | 3/2007 | Ramsden |
| 2007/0109708 A1 | 5/2007 | Hussman et al. |
| 2007/0117596 A1 | 5/2007 | Greene et al. |
| 2007/0149162 A1 | 6/2007 | Greene et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210889 A1 | 9/2007 | Baarman et al. |
| 2007/0216392 A1 | 9/2007 | Stevens et al. |
| 2007/0222542 A1 | 9/2007 | Joannopoulos et al. |
| 2007/0279002 A1 | 12/2007 | Partovi |
| 2007/0298846 A1 | 12/2007 | Greene et al. |
| 2008/0049372 A1 | 2/2008 | Loke |
| 2008/0051043 A1 | 2/2008 | Greene et al. |
| 2008/0054638 A1 | 3/2008 | Greene et al. |
| 2008/0067874 A1 | 3/2008 | Tseng |
| 2008/0116847 A1 | 5/2008 | Loke et al. |
| 2008/0142499 A1 | 6/2008 | Byrne |
| 2008/0142504 A1 | 6/2008 | Byrne |
| 2008/0166965 A1 | 7/2008 | Greene et al. |
| 2008/0169910 A1 | 7/2008 | Greene et al. |
| 2008/0186129 A1 | 8/2008 | Fitzgibbon |
| 2008/0211320 A1 | 9/2008 | Cook et al. |
| 2008/0211458 A1 | 9/2008 | Lawther et al. |
| 2008/0211684 A1 | 9/2008 | Beck |
| 2008/0220823 A1 | 9/2008 | Kavounas |
| 2008/0246215 A1 | 10/2008 | Randall |
| 2008/0298100 A1 | 12/2008 | Esaka et al. |
| 2009/0001775 A1 | 1/2009 | Smith |
| 2009/0045772 A1 | 2/2009 | Cook et al. |
| 2009/0065235 A1 | 3/2009 | Uchibori et al. |
| 2009/0072782 A1 | 3/2009 | Randall |
| 2009/0096415 A1 | 4/2009 | Beart et al. |
| 2009/0098750 A1 | 4/2009 | Randall |
| 2009/0105419 A1 | 4/2009 | Mukuda et al. |
| 2009/0106567 A1 | 4/2009 | Baarman |
| 2009/0179501 A1 | 7/2009 | Randall |
| 2009/0189565 A1 | 7/2009 | Cheng et al. |
| 2009/0190276 A1 | 7/2009 | Randall |
| 2009/0212636 A1 | 8/2009 | Cook et al. |
| 2009/0212637 A1 | 8/2009 | Baarman et al. |
| 2009/0212638 A1 | 8/2009 | Johnson |
| 2009/0212639 A1 | 8/2009 | Johnson |
| 2009/0212737 A1 | 8/2009 | Johnson et al. |
| 2009/0236140 A1 | 9/2009 | Randall |
| 2009/0243396 A1 | 10/2009 | Randall |
| 2009/0278494 A1 | 11/2009 | Randall |
| 2009/0284220 A1 | 11/2009 | Toncich et al. |
| 2009/0284245 A1 | 11/2009 | Kirby et al. |
| 2009/0284369 A1 | 11/2009 | Toncich et al. |
| 2010/0038970 A1 | 2/2010 | Cook et al. |
| 2010/0055928 A1 | 3/2010 | Randall |
| 2010/0127660 A1 | 5/2010 | Cook et al. |
| 2010/0156197 A1 | 6/2010 | Randall |
| 2010/0156345 A1 | 6/2010 | Phelps, III |
| 2010/0164298 A1 | 7/2010 | Karalis et al. |
| 2010/0181961 A1 | 7/2010 | Novak et al. |
| 2010/0194206 A1 | 8/2010 | Burdo et al. |
| 2010/0201202 A1 | 8/2010 | Kirby et al. |
| 2010/0201533 A1 | 8/2010 | Kirby et al. |
| 2010/0213895 A1 | 8/2010 | Keating et al. |
| 2010/0219183 A1 | 9/2010 | Azancot et al. |
| 2010/0219698 A1 | 9/2010 | Azancot et al. |
| 2010/0219791 A1 | 9/2010 | Cheng et al. |
| 2010/0225272 A1 | 9/2010 | Kirby et al. |

FOREIGN PATENT DOCUMENTS

| | | |
|---|---|---|
| JP | 2008-36101 | 2/2008 |
| WO | 03/050664 | 6/2003 |
| WO | 2009/037380 | 3/2009 |
| WO | 2009/131990 | 10/2009 |
| WO | 2010/036980 | 4/2010 |

(56) References Cited

FOREIGN PATENT DOCUMENTS

OTHER PUBLICATIONS

Hatanaka et al., "Coil shape in a desk-type contactless power station system," 2001, Journal of the Magnetics Society of Japan, vol. 25, No. 4-2, pp. 1015-1018, http://sciencelinks.jp/j-east/article/200117/000020011701A0506093.php.

Hatanaka et al., "Power transmission of a desk with a cord-free power supply," 2002, IEEE Transactions on Magnetics, vol. 38, Issue 5, Part 1, pp. 3329-3331, http://ieeexplore.ieee.org/xpls/abs_all.jsp?arnumber=1042542&tag=1.

Davies, "WildCharge WiProwess deal could see cable-free charging in cars, desks, notebooks," 2009, Slashgear.com, http://www.slashgear.com/wildcharge-wiprowess-deal-could-see-cable-free-charging-in-cars-desks-notebooks-0955572/.

"Wireless Power in a day," 2009, WiPower, http://www.wipower.com/press/Design%20Kit%20PR.pdf.

Bauer, "Wireless recharging systems developed in West Michigan could power golf carts, electric cars," 2010, mlive.com, http:www.mlive.com/business/west-michigan/index.ssf/2010/01/wireless_recharging_systems_de.html.

McLafferty, "Fulton Innovation partners with global supplier of precision engineered assemblies," ecoupled, Jan. 6, 2010.

Benderoff, Eric; "Gadgets Freed of Binding Cables: ECoupled Provides Juice Without Wires" walkersands.com./http://www.walkersands.com/Chicago-Tribune-January-7-2007.htm (accessed Jul. 7, 2010).

Nistor, Alexandru; "Berkline Integrates Wireless Charging Station into Their High-Tech Furniture" gadgets.softpedia.com. http://gadgets.softpedia.com/news/Berkline-Integrates-Wireless-Charging-Station-Into-Their-High-Tech-Furniture-9495-01.html (accessed Jul. 7, 2010).

Indystar Staff; "Take a comfy seat and enjoy high-tech gear" indy.com http://www.indy.com/posts/take-a-comfy-seat-and-enjoy-high-tech-gear (accessed Jul. 7, 2010).

Ki, "Charging Ahead: Intelligent Wireless Power for Real World Environments", http://ki.com/wirelesspower/assets/KI_eCoupled_Overview.pdf (accessed Jul. 7, 2010).

De Maesschalck, Thomas; "eCoupled—Charge your phone by putting it on your desk", DarkVisionHardware, http://www.dvhardware.net/article16544.html (accessed Jul. 7, 2010).

"PureEnergy Solutions Announces Furniture-Embedded Wire-Free Charging at 2010 CES", http://www.shoppurenergy.com/pureenergy-solutions-announces-furniture-embedded-wire-free-charging-at-2010-ces/ (accessed Jul. 7, 2010).

Written Opinion and International Search Report dated Jul. 7, 2010 in corresponding International Application No. PCT/US2010/034567.

Internet Blog: "Wireless Electricity-Setup Wireless Networks", Oct. 2, 2007.

"Murata, Epson to Develop Wireless Charging System", Dec. 2007, Nikkei Electronics Asia, Oct. 1, 2008.

Internet Blog: "Wireless Charging for Mobile Devices", Aug. 25, 2008, Phillips Research.

White Paper: Reflections and Analysis from Stentec, "Charge! The Race for Wireless Power", Stentec Ltd., at least as early as May 12, 2010.

"Wireless Charging", The Economist Technology Quarterly, Mar. 7, 2009.

Bob Kirkbride, "Wired—or Not", The Monday Morning Quarterback, Aug. 11, 2008.

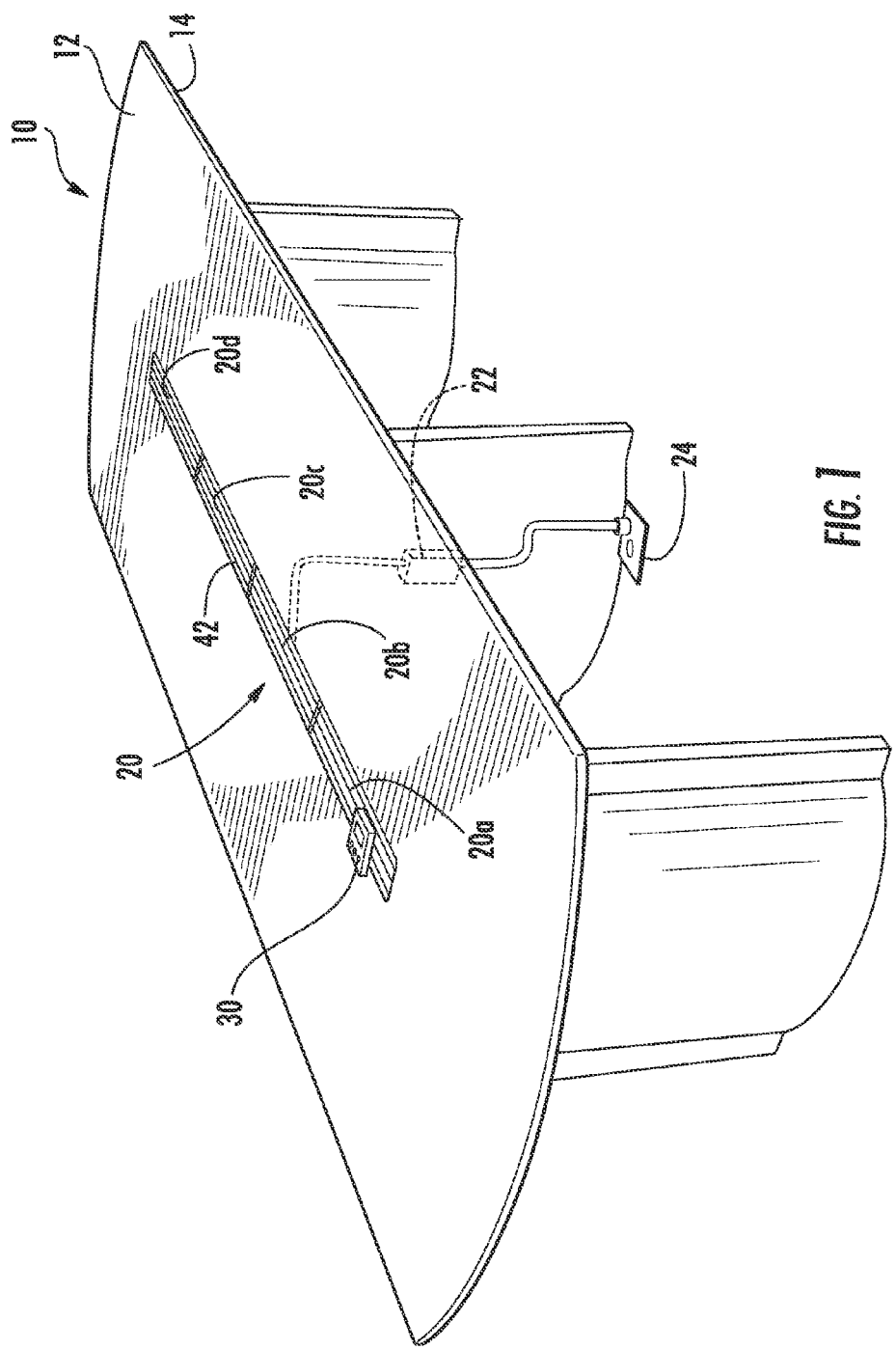

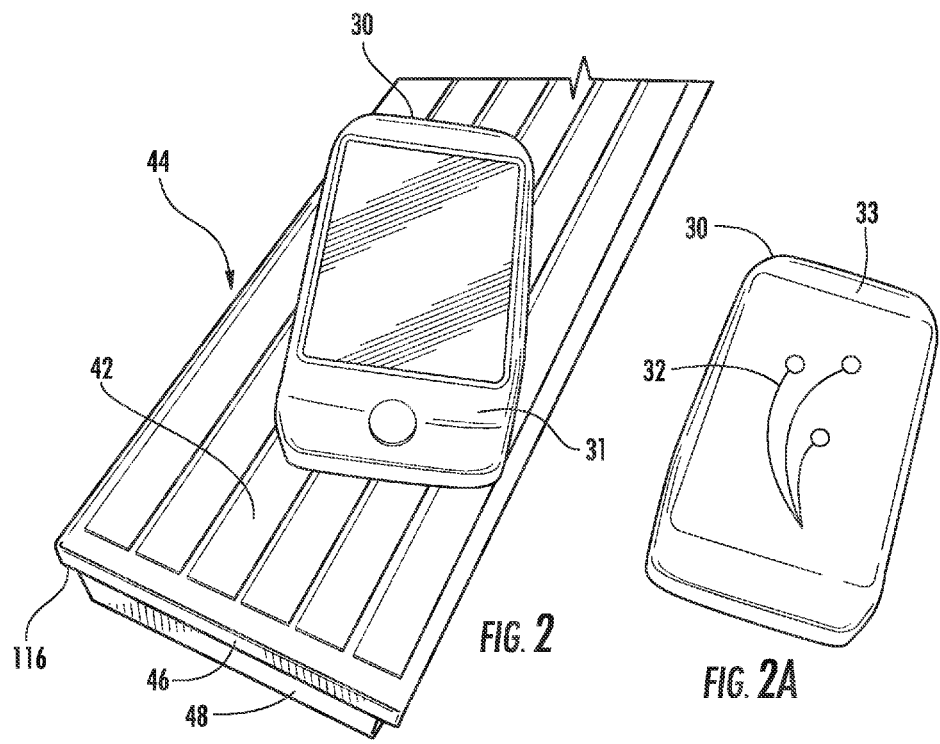
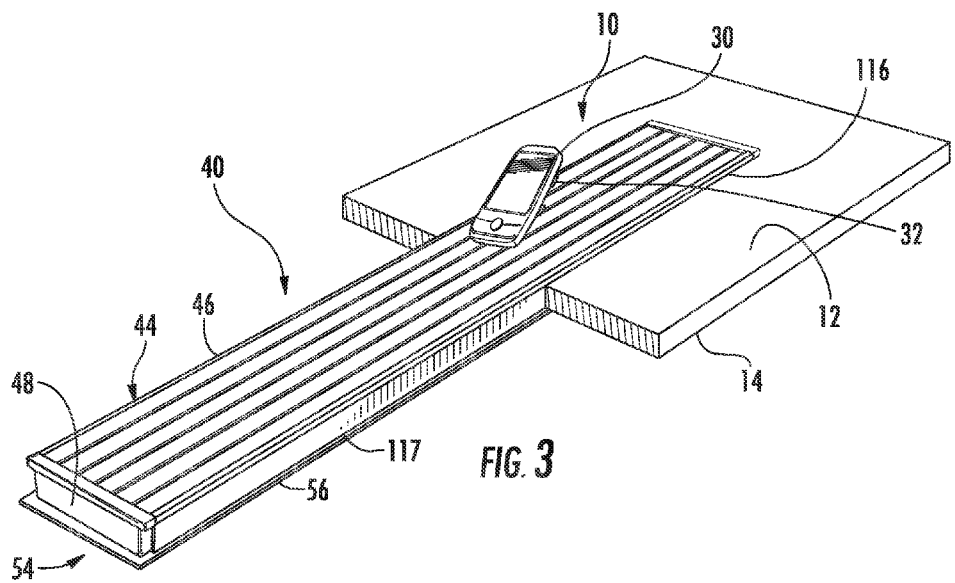

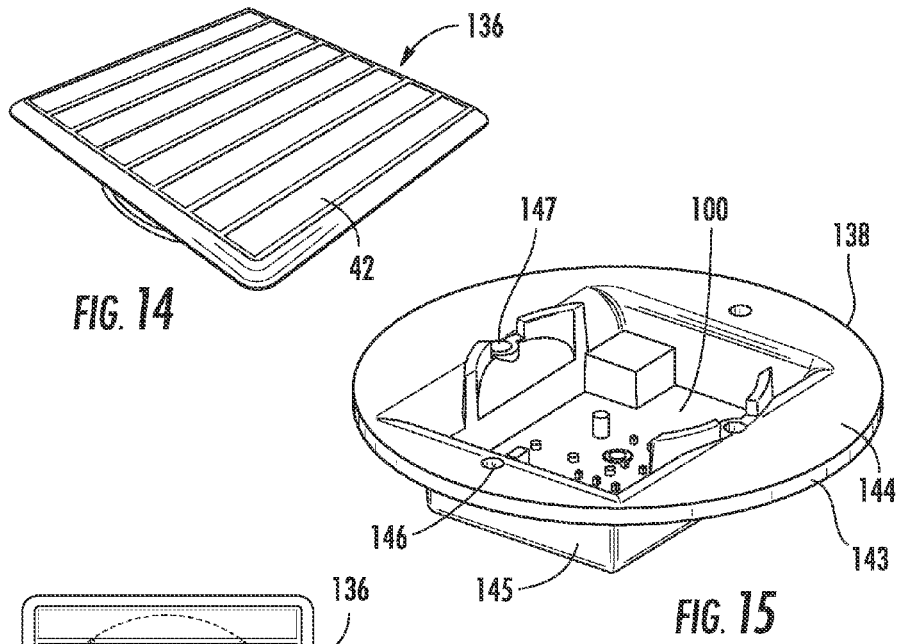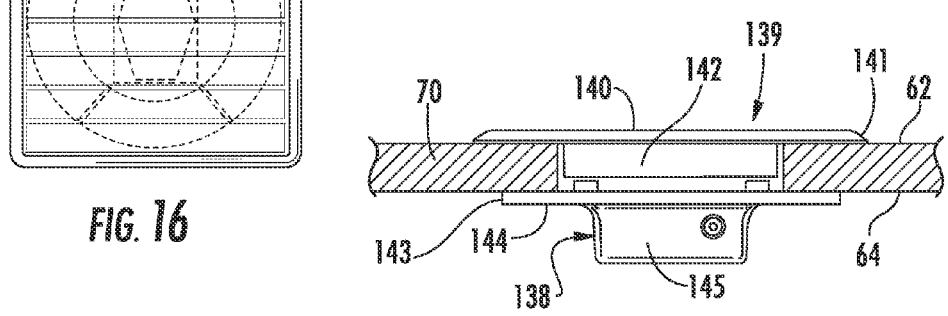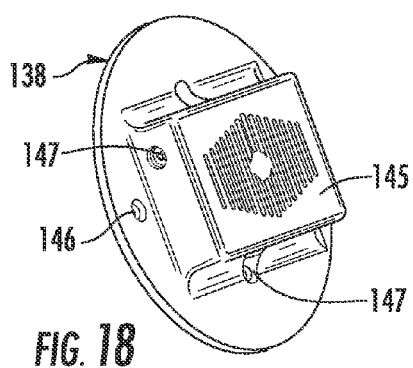

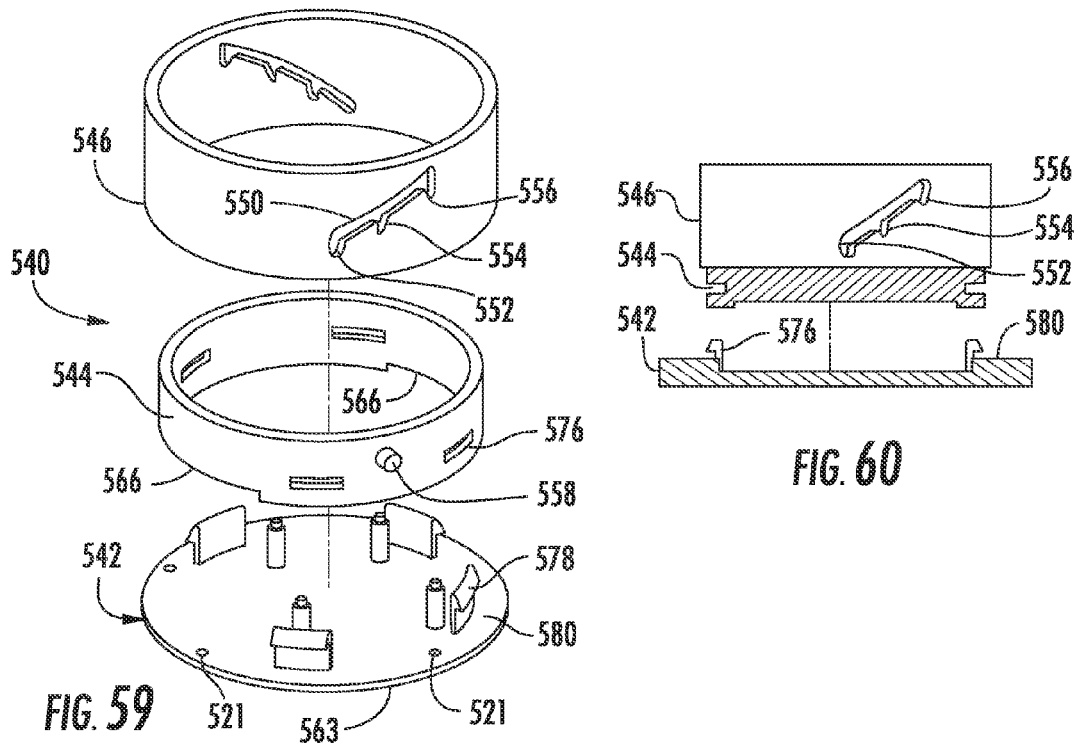
FIG. 59
FIG. 60
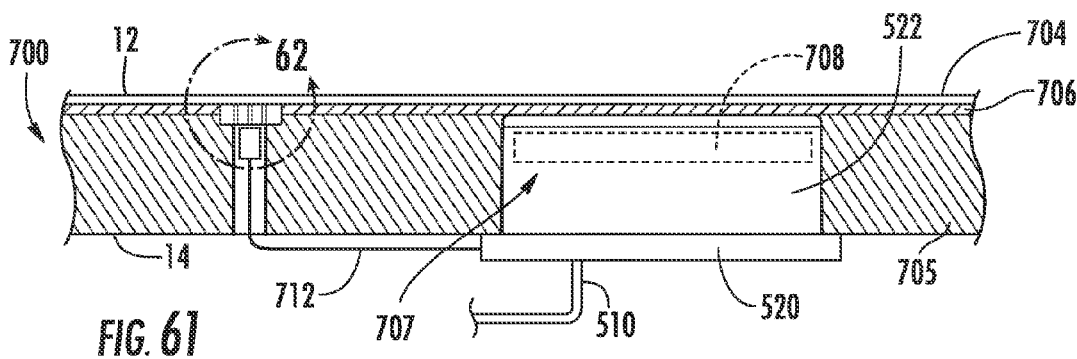
FIG. 61
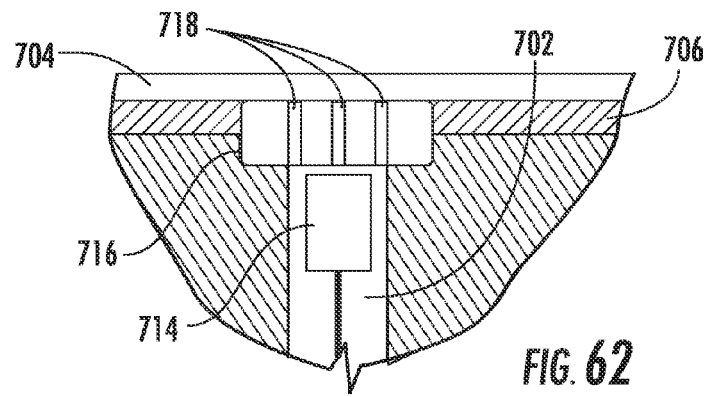
FIG. 62

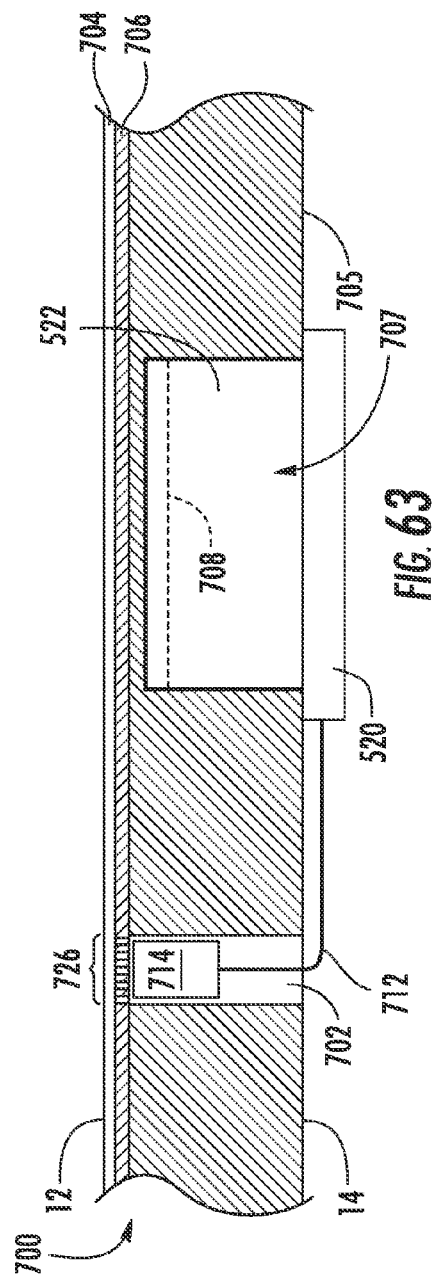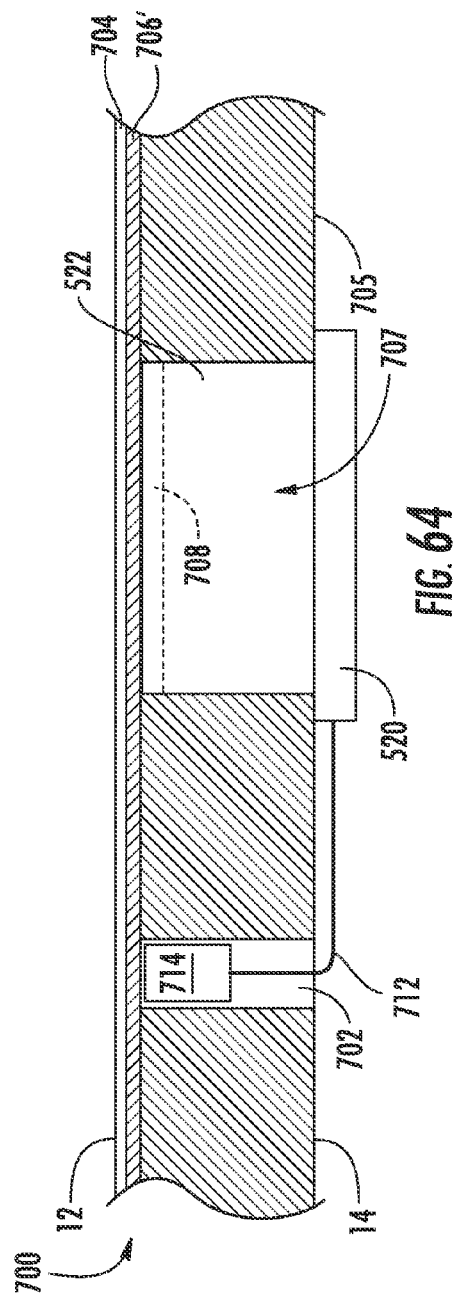

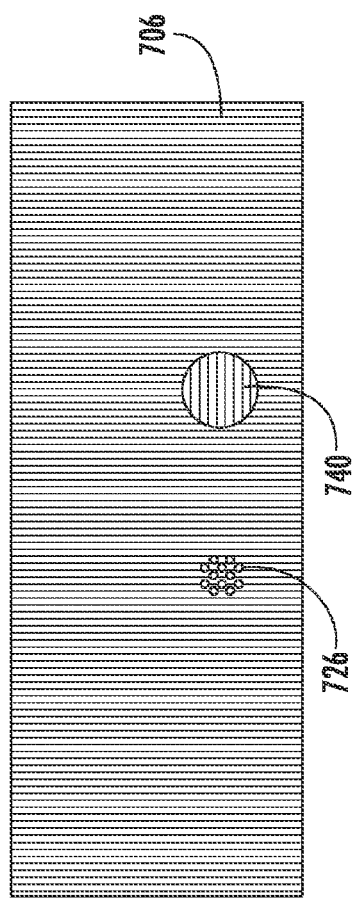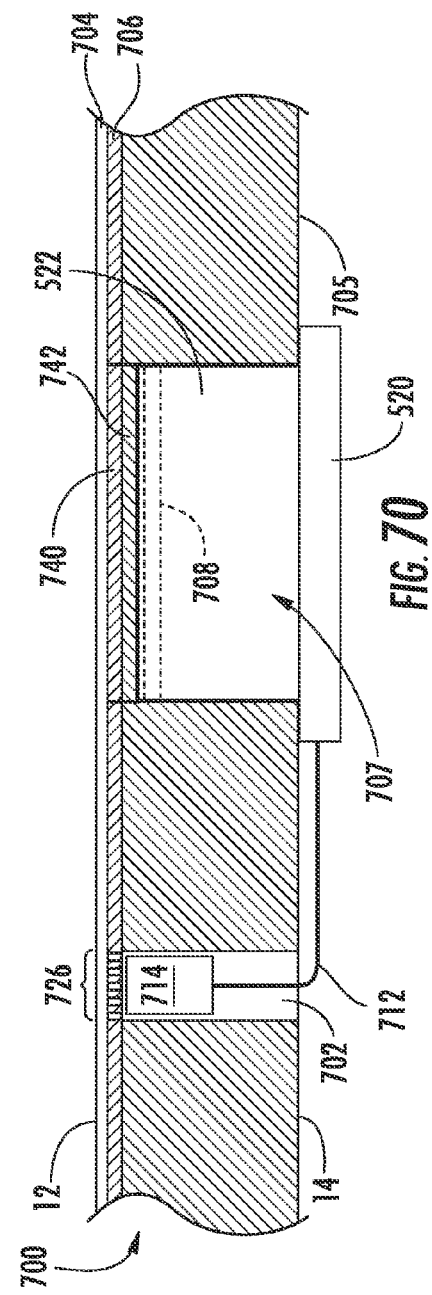

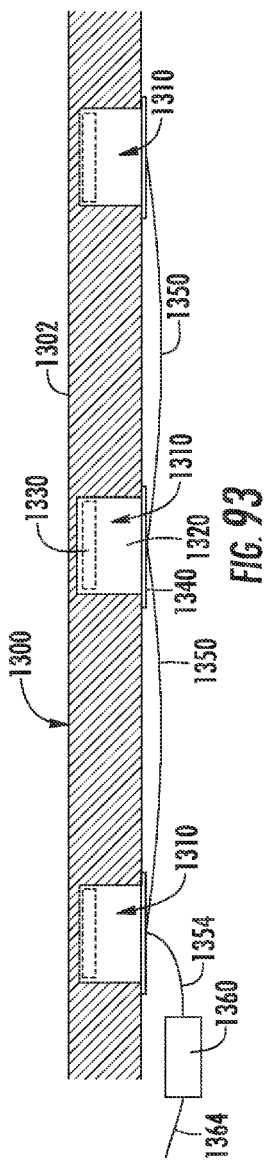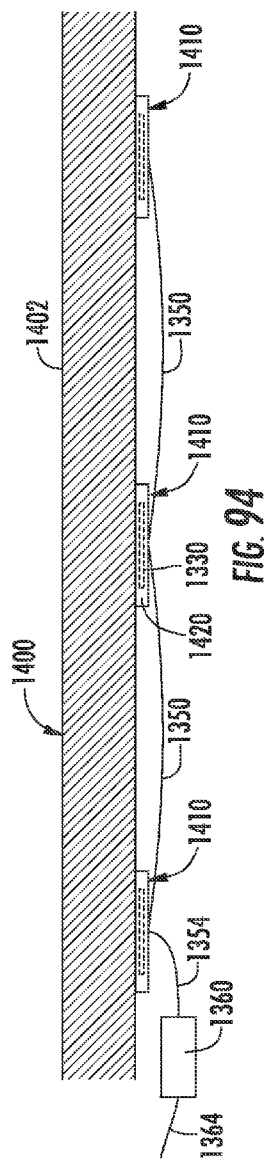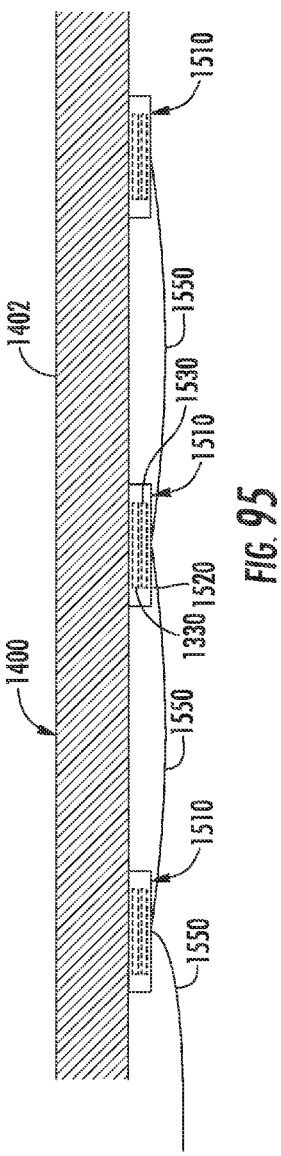

FURNITURE WITH WIRELESS POWER

CROSS-REFERENCE TO RELATED APPLICATIONS

The present U.S. Non-Provisional Patent application is a continuation-in-part application of U.S. patent application Ser. No. 13/267,194 filed on Oct. 6, 2011 now U.S. Pat. No. 8,262,244, which is a continuation of U.S. patent application Ser. No. 12/778,783 filed on May 12, 2010, now U.S. Pat. No. 8,061,864, which claims the benefit of priority from commonly owned U.S. Provisional Patent Application No. 61/300,093 filed on Feb. 1, 2010, U.S. Provisional Patent Application No. 61/186,519 filed on Jun. 12, 2009, and U.S. Provisional Patent Application No. 61/177,459 filed on May 12, 2009, all entitled "FURNITURE WITH WIRELESS POWER" and all expressly incorporated by reference herein in their entirety.

FIELD OF THE DISCLOSURE

The present disclosure relates generally to furniture components. More particularly, the present invention relates to office furniture components comprising devices for providing power wirelessly to electronic devices and other furniture components.

BACKGROUND

Office furniture components, such as desks and partition systems, typically include power outlets, and their associated cabling and power in-feed mechanisms, built into the components. A connection is established between an AC power source and an electronic device through a series of sockets, plugs and cables. This arrangement requires cables which limit the mobility of the furniture and require power outlets to be available in close proximity to the furniture to avoid stringing cable in open floor spaces.

The proliferation of electronic devices in office and home environments demands readily accessible sources of power. Electronic devices such as portable and mobile devices include phones, portable computers, MP3 and iPod music players, and personal digital assistants. Each electronic device requires a source of power which typically comprises an AC plug and a power converter to convert AC power to any of a plurality of DC power levels. An unintended consequence of the proliferation of electronic devices is the proliferation of power converters, power sources, plugs and cables which clutter the office and home environments.

All electronic devices must be powered, whether by a power source or by a battery, and batteries have to be recharged. The development of standards for DC converters and charging stations may potentially reduce cabling clutter. However, DC converters and charging stations will still be required to power electronic devices; therefore, cabling clutter remains a nuisance.

SUMMARY

The present disclosure provides furniture components, such as office furniture components, that are configured to include electronic components that transfer electrical power to peripheral electronic devices via wireless technologies, including conductive and inductive technologies. The articles of furniture may include grommet devices received within work surfaces, the grommet devices incorporating or housing the electronics of wireless power systems. The articles of furniture may also include the electronics of wireless power systems physically embedded or integrated within work surfaces in a manner in which the continuous surfaces of the work surfaces are maintained, and the work surfaces may optionally further include lighting or other indication features to indicate the locations of the electronics to a user.

In one embodiment according with the disclosure, a furniture component for transferring power wirelessly is provided. The furniture component comprises a support structure, a seating device supported by the support structure and configured to seat a person thereon, a pivot mechanism supported by the support structure, and a working platform supported by the pivot mechanism and configured to pivot relative to the support structure. The furniture component also comprises a wireless power transfer device supported by the working platform. The wireless power transfer device is adapted to transfer power wirelessly to an electrical load. A power conductor is supported by the support structure and adapted to receive electrical power at one end thereof and to provide the electrical power to the wireless power transfer device.

In another embodiment according with the disclosure, a furniture assembly for transferring power wirelessly is provided. The furniture assembly comprises a furniture component comprising a support structure, a seating device supported by the support structure and configured to seat a person thereon, an extension assembly supported by the support structure, and a first inductive power transfer device. The extension assembly includes a support member configured to move from a retracted position to an extended position. The first inductive power transfer device is supported by the support member. The first inductive power transfer device is adapted, in the extended position of the support member, to inductively couple a second inductive power transfer device and transfer power therewith.

In a further embodiment according with the disclosure, a furniture assembly for transferring power wirelessly is provided. The furniture assembly comprises a support structure, and a working platform supported by the support structure and including a working surface opposite a non-working surface. The furniture assembly also comprises a plurality of inductive transmitters supported by the working platform and adapted to inductively power an electrical load positioned on the working surface, a power converter configured to receive power from a power source and to convert the power received from the power source to a converted power, and a plurality of conductors electrically coupling the power converter and the plurality of inductive transmitters to conduct the converted power to the plurality of inductive transmitters.

The features of this invention, and the manner of attaining them, will become more apparent and the invention itself will be better understood by reference to the following description of the disclosed embodiments taken in conjunction with the accompanying drawings.

BRIEF DESCRIPTION OF THE DRAWINGS

FIG. 1 is a perspective view of a conference table and an exemplary wireless power support.

FIGS. 2 to 7 are perspective, plan and elevation views of exemplary rectangular and square wireless power grommets and grommet accessories.

FIGS. 11 to 18 are perspective, plan and elevation views of housings for mounting wireless power sources to furniture components.

FIGS. 57 to 60 are perspective and elevation views of adjustable height wireless power transmitter housings and light emitters for indicating the locations of hot-spots.

FIGS. 61 to 72 are elevation and plan views of housings and illuminated markers.

FIGS. 93 to 95 are elevation views of inductive power distribution networks.

Figure 4:
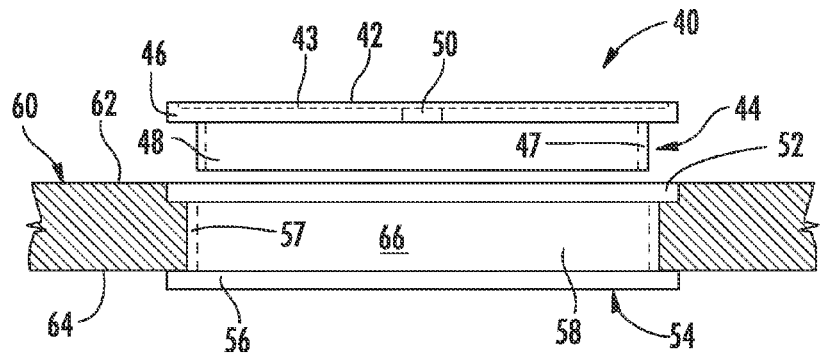

Corresponding reference characters indicate corresponding parts throughout the several views. Although the drawings represent embodiments of the present disclosure, the drawings are not necessarily to scale and certain features may be exaggerated to better illustrate and explain the embodiments. The exemplifications set out herein illustrate embodiments of the invention in several forms and such exemplification is not to be construed as limiting the scope of the invention in any manner.

DETAILED DESCRIPTION

The embodiments discussed below are not intended to be exhaustive or limit the invention to the precise forms disclosed in the following detailed description. Rather, the embodiments are chosen and described so that others skilled in the art may utilize their teachings.

Furniture components with integrated wireless technology are disclosed herein. Furniture includes, without limitation, office tables, work tables, office partition systems, chairs, lounges and other furniture. Many articles of office furniture include work surfaces, which are typically horizontal work surfaces, such as desktops and table tops. Herein, these work surfaces will be described as including working surfaces and non-working surfaces. Working surfaces include surfaces exposed to users in the normal course of the use for which the furniture was intended, such as the top surfaces of desks and tables, armrests, cubicle walls and the like. Non-working surfaces include surfaces which are normally not exposed to users such as the opposite sides of the top surfaces, i.e., the undersurfaces of the top surfaces, as well as hidden surfaces and the like.

Wireless technologies are those in which energy is transferred between components without wired connections such as sockets and plugs. These wireless technologies generally include radio frequency (RF) transfer, induction, conduction and acoustic energy transmission technology. Exemplary wireless energy sources are disclosed in U.S. Pat. Publ. Nos. 2007/0182367, 2009/0072782, 2008/0246215, 2007/0194526, and 2004/0195767, which are incorporated herein by reference.

In RF transfer technology, a source circuit generates an RF signal which is received by a second circuit. Energy is absorbed from the signal by the second circuit. RF energy can be transferred over a distance of several feet although the RF signal degrades rapidly as the distance from the source increases. Acoustic energy is similar to RF energy in that energy propagates multi-directionally.

In induction technology, an inductive transmitter, which may also be referred to herein as a source or primary coil, generates a magnetic field which induces current in an inductive receiver, which may be referred to herein as a target or secondary coil. The inductive transmitter and receiver may be referred to as an inductive coupling. The area in which inductive energy may be received, referred to as a "hot-spot," is fairly localized about the primary coil. Inductive transmitter and receiver devices include, respectively, an inductive transmitter and an inductive receiver. Inductive transmitter and receiver devices may also include additional electronic components adapted, for example, to indicate the location of the hot-spot, transmit load, charge or identification information between the devices, convert input power to a form suitable to the transmitter, or perform additional functions. Typically, in the embodiments disclosed herein, the primary coil will be integrated into an article of furniture. A wireless device including the secondary coil may receive power from the primary coil by induction of electrical current in the secondary coil when the secondary coil is brought into proximity with the primary coil. The current generated in the secondary coil may be used to power the electronic device, or charge batteries in the electronic device. A controller produces a signal to power the primary coil at a modulated frequency. Information may be transferred by the signal to the secondary coil and then extracted by the electronic device being charged. The electronic device may include passive circuits and/or wireless communication circuits to transmit information back to the controller, thus establishing hand-shakes or hand-shaking which the controller may use to modulate the signal.

The transmitter and receiver inductors (i.e. the primary and secondary coils) can be matched to form a resonant inductive coupling by tuning the inductors to the same natural frequency. Tuning increases the near-field inductive power transfer efficiency of the resonant inductive coupling and, thereby, the distance between the transmitter and receiver at which energy can be transferred. Of course, the transfer efficiency decreases as a function of the distance. Power transfer efficiency can also be improved by modifying the current driving the transmitter from a sinusoidal to a non-sinusoidal transient waveform. A pulsing waveform is an exemplary non-sinusoidal transient waveform. Power transfer distance can also be increased by increasing the driving frequency. Frequencies may range from the kilohertz range to the megahertz range. However, as frequencies increase so does electromagnetic interference (EMI). Resonant inductive transmitter and receiver devices include inductors, which may be flat coils, and capacitors (the inductors and capacitors forming LC circuits), where the selection of the coil length, resistance and other characteristics, jointly with the characteristics of the capacitors, such as capacitance, can be varied to tune the LC circuits.

RF and induction technologies transfer energy without a direct electrical path. The source of the energy, i.e., the location of the primary coil when integrated into an article of furniture, may not be visible; therefore, hot-spot indicators are desirable to assist in positioning electronic devices proximally to the hot-spots thereby maximizing power transfer efficiency. An in-laid marker may be provided to indicate the location of hot-spots. Hot-spots may also be provided on hangers, which may include shelves and pockets. Hot-spot indicators such as LEDs, i.e., illuminated markers, may be provided in the shelves, pockets and working surfaces. Hot-spot indicators may also be provided in accessories coupled to furniture components comprising hot-spots. Hangers may hang from armrests and office partitions, for example.

In conduction technology, a surface of an article of furniture with at least one pair of positive/negative contacts, which are exemplified by elongate, conductive contact pads in many of the embodiments disclosed herein, transfers energy to receiving contacts on an electronic device which, when the electronic device is placed on the pads, completes an electrical circuit between the pads. The receiver may be positioned in a plurality of orientations without causing a short-circuit. The pads are typically flat elongate rectangular-shaped plates disposed in parallel and sufficiently spaced apart so that contacts do not bridge adjacent pads. The polarity of each pad may be selected by a controller based in part on feedback from the contacts. Controllers typically include voltage and current regulators and features designed to protect the electronic devices and the controllers.

All the wireless technologies require communication between a source and a receiver of energy. The sources and receivers of energy may be embedded or otherwise integrated into furniture components in any number of ways. In one embodiment disclosed herein, the energy sources are placed inside housings which are embedded in furniture components or positioned in hangers supported by furniture components or other support structures such as walls. Wireless energy sources and receivers may also be encapsulated in polymers and then embedded as disclosed herein. Although various embodiments are described herein with reference to specific wireless energy transfer technologies, the embodiments may be configured for use with all the wireless technologies. For example, a modular support or a housing may comprise conductive pads and may, additionally or alternatively, comprise a cavity including a source or receiver of wireless energy. Exemplary housings, or grommets, may have any shape, e.g. rectangular, round, square, triangular, trapezoidal and the like. Grommets may be embedded partially or fully in furniture components. Hangers may also have contact pads instead of hot-spots. In some embodiments, cables are disposed within accessories which comprise both power receivers and transmitters, thereby enabling accessories to perform traditional functions as well as a power extension function.

The above description of exemplary embodiments will now be described with reference to the figures. FIG. 1 is a perspective view of a conference table and an exemplary wireless modular power grommet according to one embodiment of the invention denoted by numeral 20. Modular grommet 20 may be include a modular construction, described in detail below, to allow the length of grommet to be varied depending upon the design of article of furniture in which grommet 20 is incorporated. For example, the length of grommet is extendable by the addition of connectable modules, illustratively modules 20a, 20b, 20c and 20d. Modular grommet 20 is shown in FIG. 1 embedded in a table 10 so that its conductive surface, comprising elongate conductive pads 42, is flush with a working surface 12 of table 10. The surface of table 10 opposite to working surface 12 is denoted by numeral 14. An electronic device 30 is connected to, and supports, two or more exposed contacts 32 (shown in FIGS. 2A and 3) which contact pads 42 to draw power conductively therefrom. When device 30 is positioned on pads 42, the contacts are positioned between device 30 and pads 42. Modular grommet 20 may also be positioned above table 10 and may further extend therefrom by means of stand-offs. Another modular grommet, comprising a pair of elongate portions 94 serially connected to each other by a bridge 120, is described with reference to FIG. 10. One of modules 20a, 20b, 20c and 20d is electrically coupled to a converter 22 (shown in phantom) which is powered by a power source 24 and transfers converted power to the other of modules 20a, 20b, 20c and 20d. Pads 42 are coupled to positive and negative voltages provided by converter 22 in an alternating manner, e.g., positive-negative-positive. Pads 42 may be evenly distributed with enough space between them to prevent any one of the contacts on device 30 to bridge the gap formed by adjacent pads 42.

FIGS. 2 and 3 are perspective views of a grommet 40 comprising a first part 44 and a second part 54 configured to mate with each other forming a cavity in which electronic components such as converter 22 may be placed. FIGS. 2, 2A and 3 also show device 30 having a front face 31 and a back face 33 opposite front face 31. Extending from back face 33 are a plurality of connectors 32 which may be integrated with device 30 or may be part of an adapter which is detachably and electrically coupled to, and supported by, device 30. The adapter may include a mini or micro-USB plug receivable by a standard receptacle on device 30. Referring to FIGS. 2 and 3, first part 44 is similar to a module of modular grommet 20 except that it comprises flanges configured to support first part 44 on working surface 12 when it is embedded in table 10. First part 44 includes an upper portion 46 supporting pads 42 and a lower portion 48 configured to penetrate a through-hole in table 10. Upper portion 46 includes flanges 116. Referring to FIG. 3, first part 44 and second part 54 are shown embedded in table 10, i.e., the grommet is received within an opening in the table top. Second part 54 comprises a lower portion 56 forming flanges 117 and upper portion 58 extending therefrom (shown in FIG. 4). Flanges 117 are configured to contact non-working surface 14 and secure grommet 40 in table 10. For example, first part 44 may be press-fit with second part 54 such that flanges 116 and 117 press against working surface 12 and non-working surface 14. Alternatively or additionally, screws, pins or nails may pass through holes (not shown) provided in flanges 117 to secure second part 54 to non-working surface 14. First and second parts 44, 54 may also be secured to each other with adhesives, interlocking tabs, and any other known means for securing two parts to each other. In the position shown, pads 42 are elevated above working surface 12 by at least the thickness of elongate flanges 116. Alternatively, as shown with reference to FIG. 4, table 10 may include a cavity 52 adapted to receive flanges 116 so first part 44 is embedded deeper into table 10 and pads 42 may then be flush with working surface 12. The depth of cavity 52 may be adjusted to raise or lower pads 42 relative to working surface 12.

Figure 5:
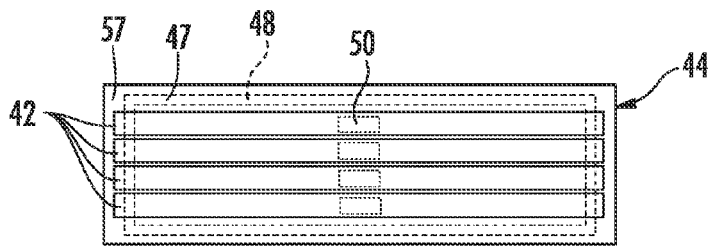

Additional configurations for integrating grommet 40 into furniture components are described with reference to FIGS. 4 to 7. FIGS. 4 and 5 are a plan and elevation views of grommet 40 illustrating second part 54 positioned within an opening in a furniture component 60 and first part 44 ready to be inserted into the opening in furniture component 60. Furniture component 60 has a working surface 62, an opposite surface 64 and a cavity 52 into which upper portion 46 fits so that the conductive surface comprising pads 42 is flush with working surface 62. Lower portion 48 comprises a plurality of walls 47 extending perpendicularly from upper portion 46 and upper portion 58 comprises a plurality of walls 57 extending perpendicularly from lower portion 56. Lower portion 48 is sized to fit inside upper portion 58 of second part 54 to form a cavity 66 therewith. In another embodiment, upper portion 58 is sized to fit inside lower portion 48. Upper portion 46 has a plurality of optional elongate cavities 43 configured to receive pads 42 and also has a plurality of apertures 50 (shown in phantom) to enable electrical contact between the underside of pads 42 and a power source disposed in cavity 66. The power source may be converter 22 or a connection from converter 22.

Figure 6:
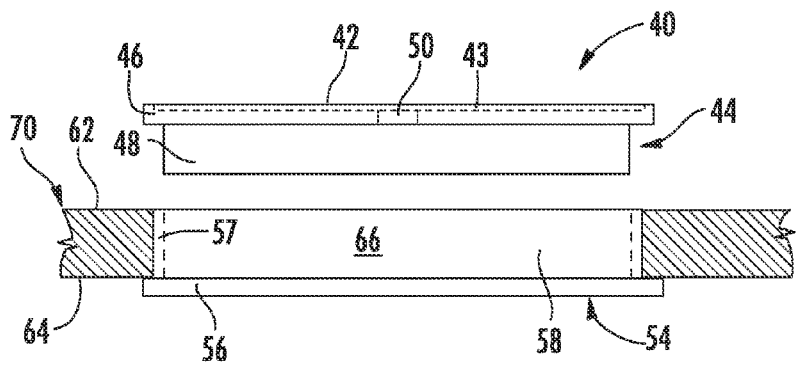
Figure 7:
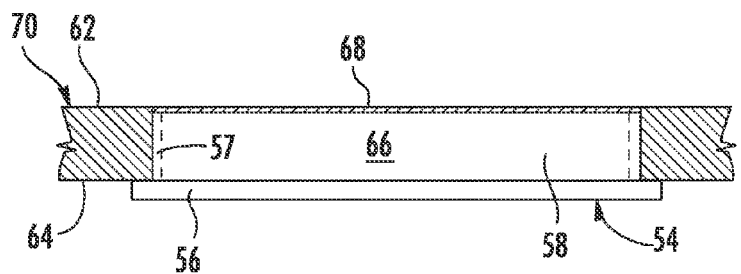

Referring to FIG. 6, a furniture component 70 is shown which is similar to table 10 and differs from furniture component 60 in that it does not include a cavity 52. Grommet 40 is shown as in FIG. 5 with second part 54 positioned within an opening in furniture component 60 and first part 44 ready to be inserted into the opening. As discussed with reference to FIG. 3, upper part 46, when positioned within the opening in working surface 62, contacts working surface 62 and is therefore not flush with it. FIG. 7 illustrates an alternative configuration for integrating a wireless energy source in a furniture component. As in FIGS. 3 to 6, second part 54 is positioned within an opening in a furniture component, in the present embodiment shown as furniture component 70. Additionally, a first part 68 is shown which is a planar component supported by upper portion 58. First part 68 has a thickness sufficiently thin and is constructed of a material having a dielectric coefficient sufficiently conductive to enable a primary coil of an inductive coupling placed in cavity 66 to transmit a wireless signal through it thereby creating a hot-spot. In this embodiment, device 30 (shown in FIG. 2) supports a secondary coil (instead of contacts) which forms an inductive coupling with the primary coil and thereby receives power from it. In an alternative embodiment, first portion 68 has a plurality of pads 42 on its upper surface. First portion 68 may be secured to second portion 54 after second portion 54 is positioned within the opening in working surface 62. For example, a bead of adhesive may be placed on walls 57 to bond them to first portion 68.

Figure 8:
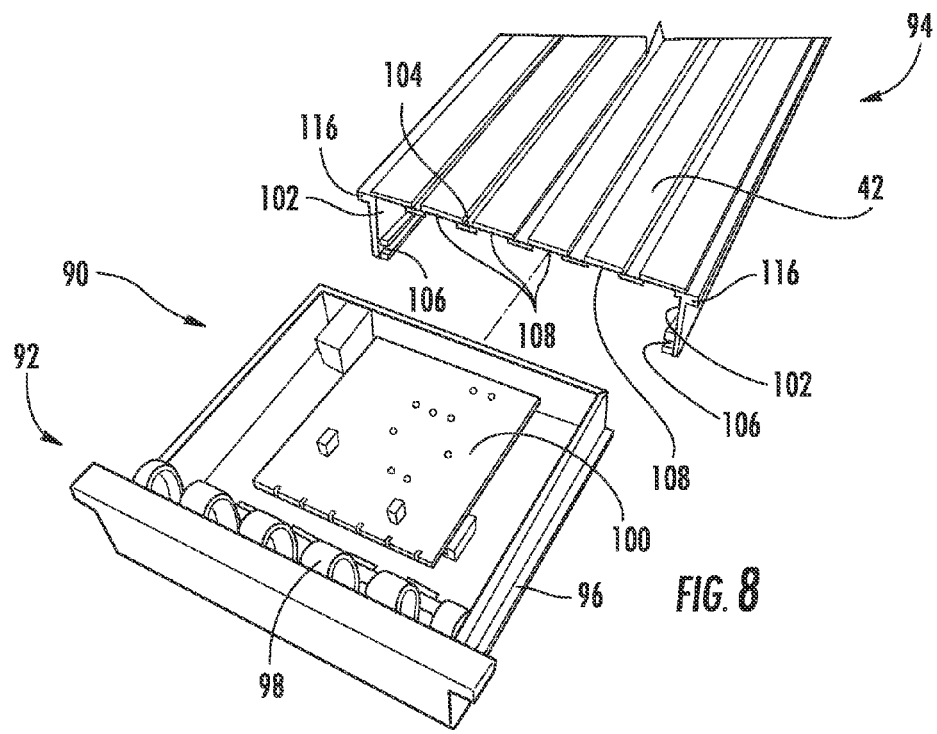
FIGS. 8 to 10 are perspective views of extendable grommet systems.
Figure 9:
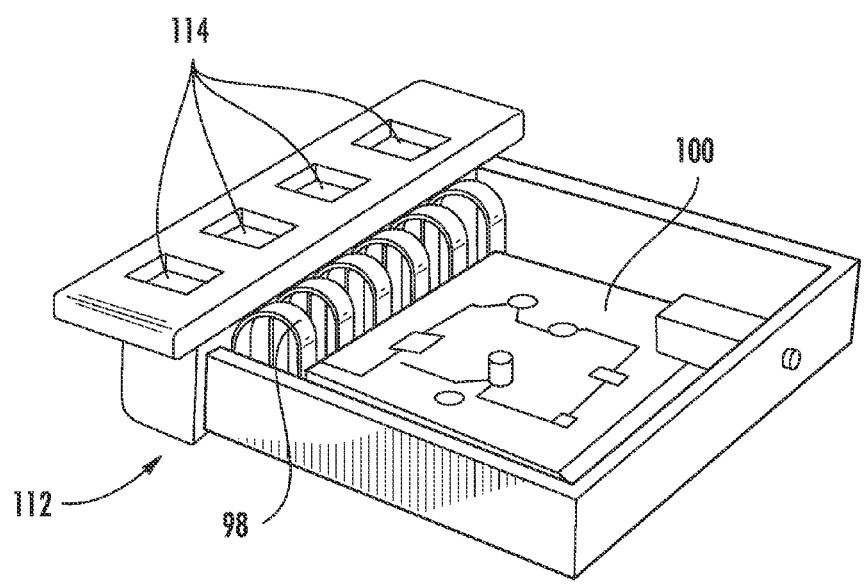
Figure 10:
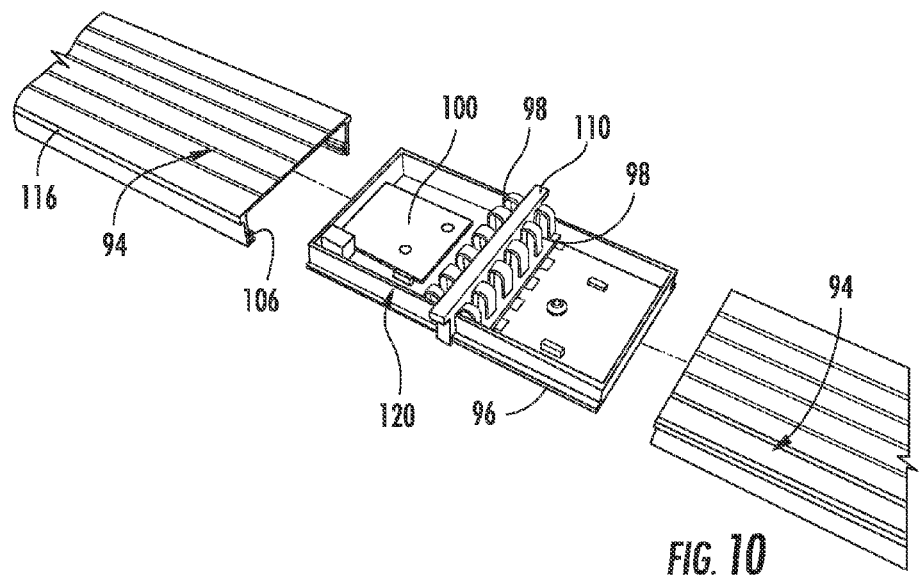

Referring now to FIGS. 8 to 10, portions of modular grommets are disclosed therein which may be used as described in FIG. 1 or further below. FIG. 8 is a perspective view of a modular first part 90 comprising an end portion 92 configured to be inserted into elongate portion 94 and including a plurality of connectors 98, optionally a electronic circuit 100, and lateral rails 96. Except for its modularity, first part 90 is similar to first part 44 since it includes flanges 116 and supports pads 42. Optionally, end portion 92 receives power and provides it to elongate portion 94 through connectors 98. Elongate portion 94 includes elongate lateral channels (or slots) 106 extending from surfaces 102 and adapted to slidably receive rails 96. Inner upper surface 104 has a plurality of cavities 108 disposed beneath pads 42 and adapted to establish an electrical connection between the underside of pads 42 and connectors 98 when end portion 92 is inserted into elongate portion 94. Electronic circuit 100 may comprise a power adapter or converter. Alternatively, end portion 92 may be devoid of electronic components and just form another wall similar to wall 47 of first part 46. Modular first part 90 may be coupled to second part 54 in the manner described with reference to FIGS. 3 to 7. FIG. 9 illustrates an alternative end portion, denoted by numeral 112, which includes connectors 114 providing hard-wired connections for alternative purposes, e.g. internet and phone access. Connectors 114 may be in the form of electrical plug outlets, USB outlets, etc. In an alternative embodiment, an electrical contact may be provided beneath or between pads 42, or in cavity 66, for extending connections between connectors 114 disposed in one end portion 92 to an end portion 92 positioned at the opposite end of elongate portion 94.

FIG. 10 illustrates bridge 120 which was previously described with reference to FIG. 1. Bridge 120 comprises back-to-back end portions 92 adapted to connect a pair of elongate portions 94 thereby extending the conductive surfaces available to users in a manner similar to that shown in FIG. 1. End portions 92 may cap the ends of the modular grommet so formed. Connectors 98 on one side of a divider 110 are electrically coupled to corresponding connectors 98 on the opposite side of divider 110. As in FIG. 1, modular conductive grommets may be powered by converter 22 and might not use a second part 54 to form cavity 66. Instead, a cavity sized to receive the modular grommet may be formed on the working surface of a furniture component. A hole in the non-working surface suffices to pass a power cable from converter 22 into the cavity in the furniture component. The power cable is connected to electronic circuit 100 in end portion 92 or bridge 120 to power the modular grommet. Similarly, a cavity in the furniture component may be formed to receive first part 44 of grommet 40.

Figure 11:
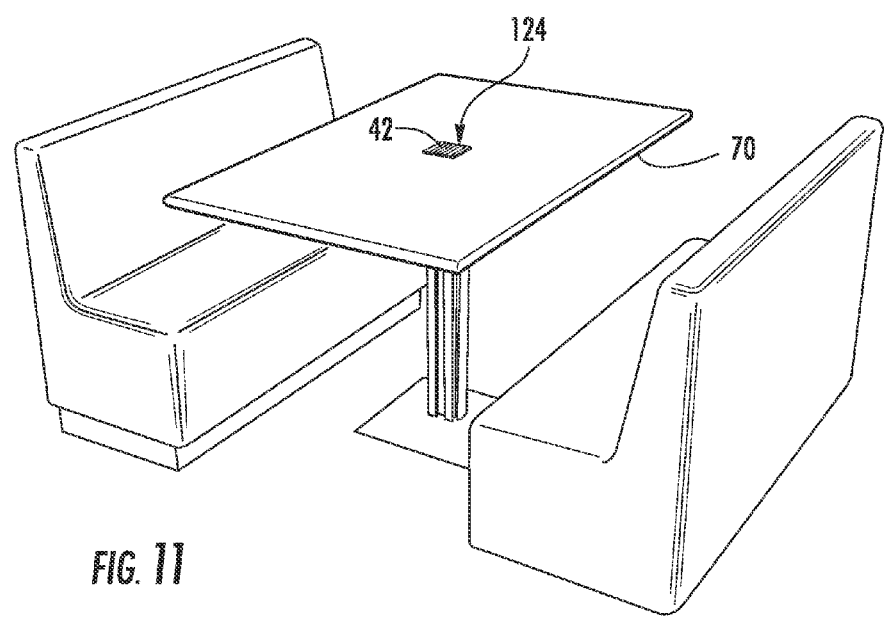
Figure 12:
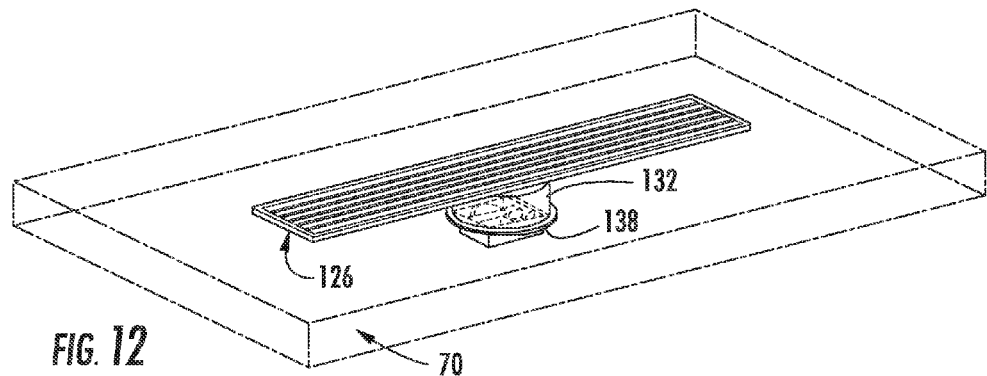
Figure 13:
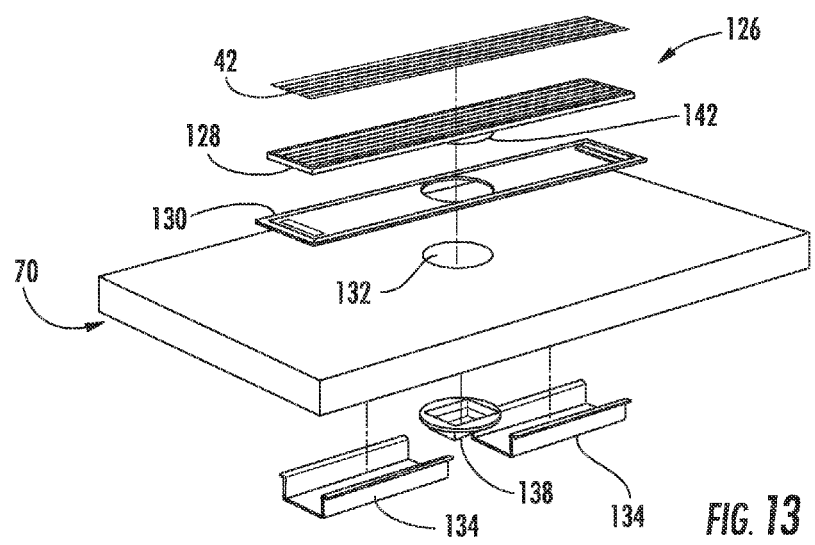

FIGS. 11 to 13 show additional embodiments of grommets integrated into furniture components to provide wireless powering surfaces. FIG. 11 shows a conductive powering surface 124 centered on furniture component 70, illustratively shown in a booth arrangement. Although shown as having a square shape, powering surface 124 can comprise any shape including, for example, rectangular, round and trapezoidal shapes, as well as the elongated shape shown in the embodiment of FIGS. 1-3 and 8-10. Conductive powering surface 124 may be supported by grommets as disclosed above or further below. FIGS. 12 and 13 illustrate a conductive assembly 126 mounted on the work surface of furniture component 70 and powered by an electronics assembly (not shown) located in housing 138 that in turn is received within an opening in the work surface of furniture component 70. Conductive assembly 126 comprises a support 128 having apertures on its surface (not shown) through which contacts from the electronics assembly electronically couple to pads 42. Optionally, a gasket 130 may be provided between the work surface of furniture component 70 and assembly 126. Either or both of support 128 and gasket 130 electrically insulate pads 42 from furniture component 70. A through-hole 132 is provided in furniture component 70 to enable electronic coupling of the electronics assembly and pads 42. Optionally, one or more cable trays 134 may be provided to support cables from surface 64 of furniture component 70. The electronics assembly receives power and converts it to a modality suitable for pads 42. Power may be low voltage AC or DC, and AC power may be modulated at suitable frequencies. DC power is preferred, e.g., 5 V DC, since it standard for powering cellular phones, personal data or communication assistance, and other devices with micro-USB connectors. Pads 42 may comprise a receptacle or plug on their surfaces facing the work surface to which the electronics assembly provides power. Contact may also be made by permanently affixing power conductors to pads 42, e.g., by soldering or adhesively bonding with electrically conductive adhesives. Additionally, the electronics assembly may comprise resilient conductors, e.g. springs, which press against the underside of pads 42. In one embodiment, the electronics assembly receives AC voltage, converts the AC voltage to DC voltage, and regulates the DC voltage current so as to not charge devices on conductive assembly 126 too quickly, as this might cause them to overheat or become damaged. In another embodiment, the conductive assembly receives and distributes DC power.

FIGS. 14 to 18 are perspective, plan and elevation views of a square grommet 136 configured to provide a wireless powering surface on a furniture component. As shown in FIG. 14, grommet 136 includes conductive pads 42 supported by a first part 139 having an upper portion 140 and a lower portion 142. Similarly to the embodiment described in FIGS. 3 to 6, lower portion 142 is configured to be positioned within throughhole 132 of furniture component 70. First part 140 comprises a flange 141, shown in FIG. 17 adjacent to working surface 62. Second part 138 comprises an upper portion 144 having a flange 143, shown in FIG. 17 adjacent to opposite surface 64, and a lower portion 145 which, unlike the lower portions shown in FIGS. 3 to 6, extends below opposite surface 64. Upper portion 144 includes a plurality of holes 146 provided to secure second part 138 to opposite surface 64 by screws, nails or pins. Second part 138 may also be adhesively bonded to opposite surface 64. Second part 138 also includes a plurality of holes 147. Screws are screwed through holes 147 and into lower portion 142 to secure first part 139 to second part 138 and thereby to secure first part 139 to furniture component 70. Although the wireless powering surface has been described as a conductive surface, a primary coil may be supported by lower portion 142 to thereby provide an inductive wireless powering surface, i.e., a hot-spot.

In FIGS. 19, 20, 38 and 39, perspective views of embodiments of a furniture component for transferring power wirelessly are provided. The furniture component comprises a support structure, a seating device supported by the support structure and configured to seat a person thereon, a pivot mechanism supported by the support structure, and a working platform supported by the pivot mechanism and configured to pivot relative to the support structure. The furniture component also comprises a wireless power transfer device supported by the working platform. The wireless power transfer device is adapted to transfer power wirelessly to an electrical load. A power conductor is supported by the support structure and adapted to receive electrical power at one end thereof and to provide the electrical power to the wireless power transfer device. The working platform may be referred to hereafter as a "tablet". The electrical load may comprise a mobile or portable device. The wireless power transfer device may be a conductive device, described below with reference to FIGS. 19 and 20, or an inductive device, described below with reference to FIGS. 38 and 39. Exemplary furniture components as described hereinabove include lounge and wheeled chairs. In one variation, an inductive wireless power transfer device is supported by the working platform and configured to transfer power wirelessly through at least a portion of the thickness of the working platform. In one example, a portion of the working platform has a thickness of about 0.0625 inch ($1/16^{th}$ inch) or more, and the inductive wireless power transfer device is configured to transfer power wirelessly through the thickness of the portion of the working platform. In another example, the portion of the working platform has a thickness of about 0.2500 inch ($1/4^{th}$ inch). In a further example, the portion of the working platform has a thickness of at least 20 millimeters. In the preceding examples, the portion through which the inductive wireless power transfer device transfers power may be thinner, thicker, or may have the same thickness as, the working platform. In another variation, the working platform has a working surface and a non-working surface opposite the working surface, and the furniture component further comprises an indicator element configured to indicate the location of the wireless power transfer device, which may be an inductive power transmitter. In a further variation, at least a portion of the working platform comprises a translucent material, and the indicator element is configured and positioned to emit light through the translucent material to indicate the location of the inductive power transmitter.

Figure 19:
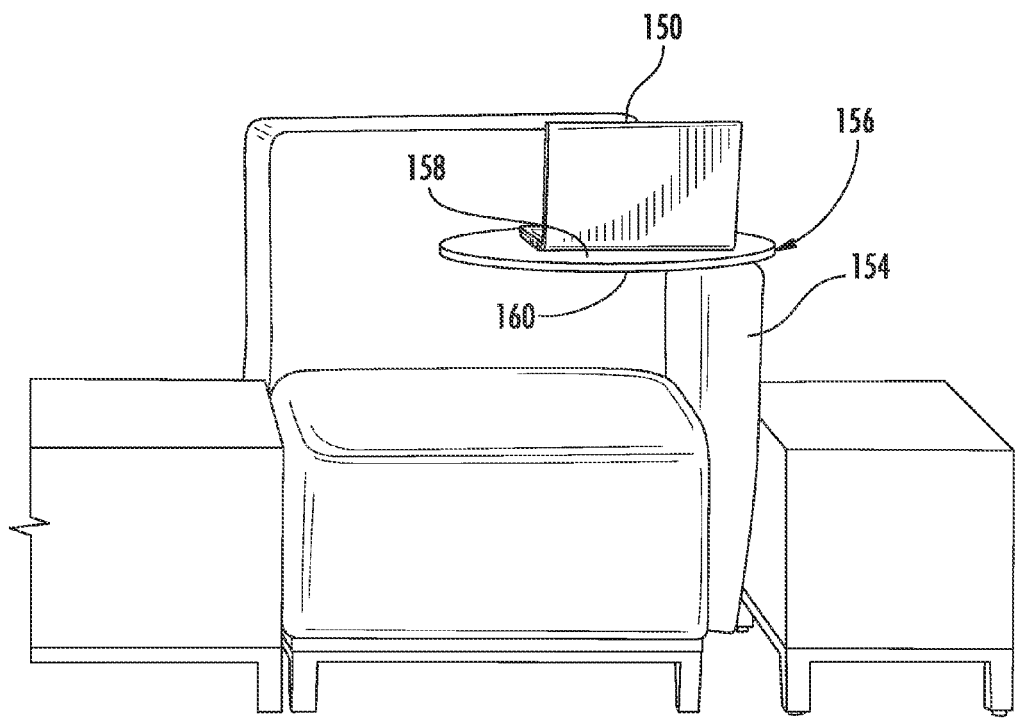
FIGS. 19 and 20 are a perspective views of furniture components including tablets with wireless power sources.
Figure 20:
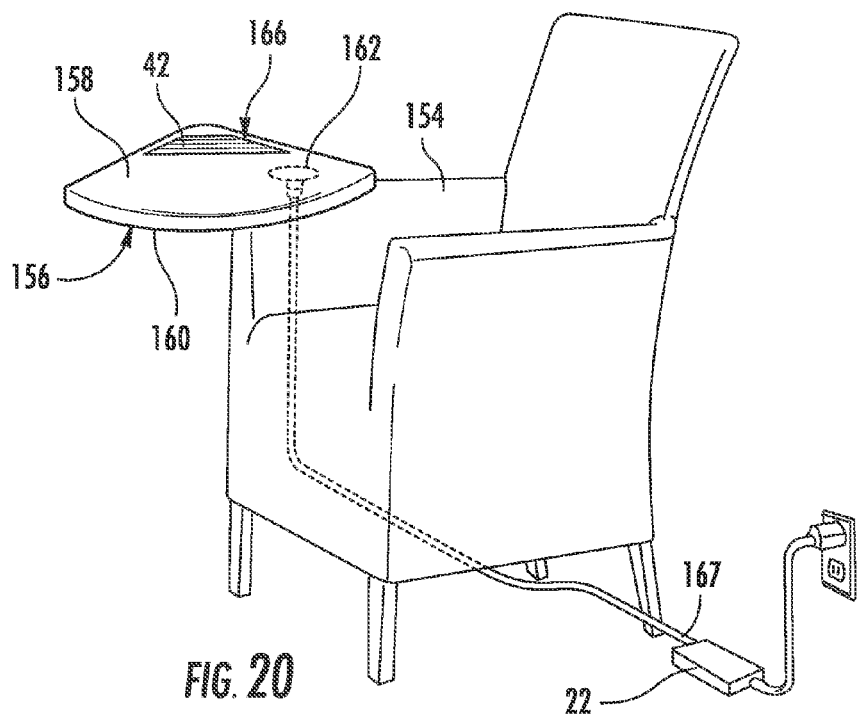
Figure 21:
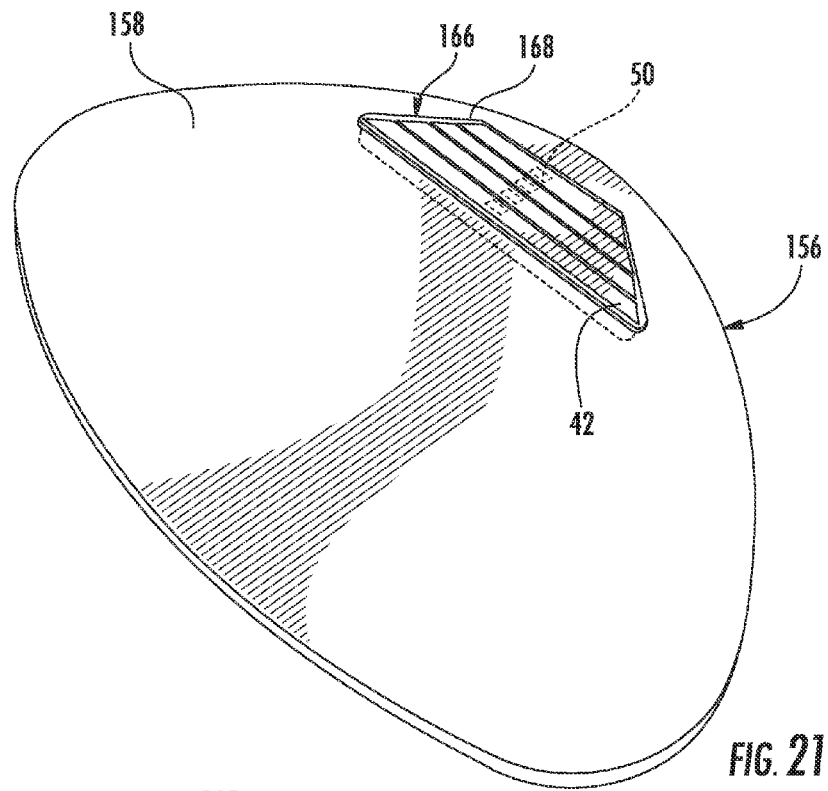
FIGS. 21 to 24 are perspective views of an exemplary trapezoidal grommet.
Figure 22:
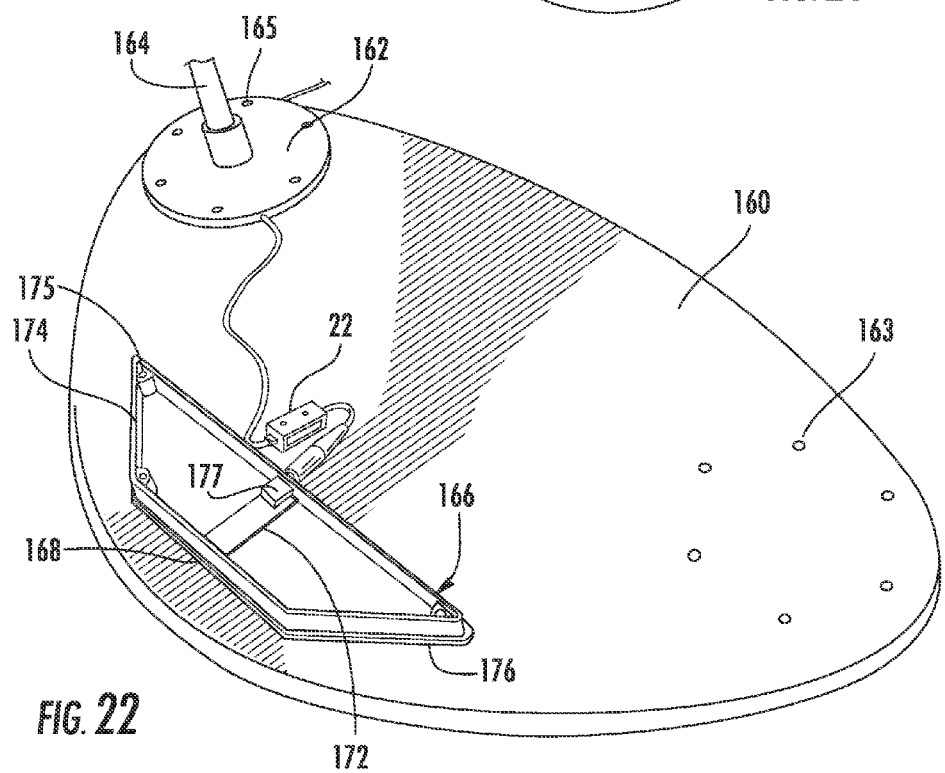
Figure 23:
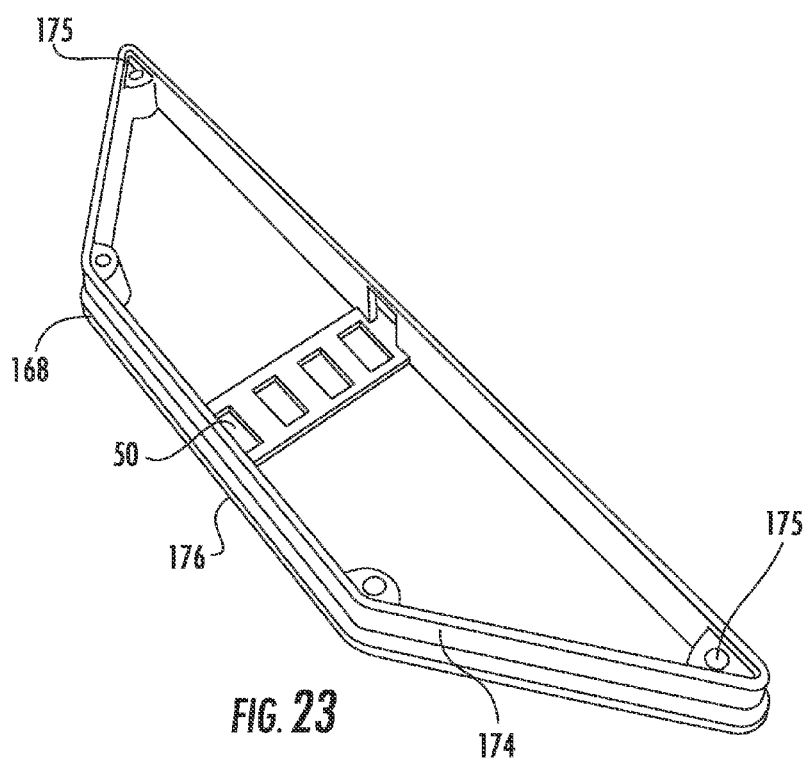
Figure 24:
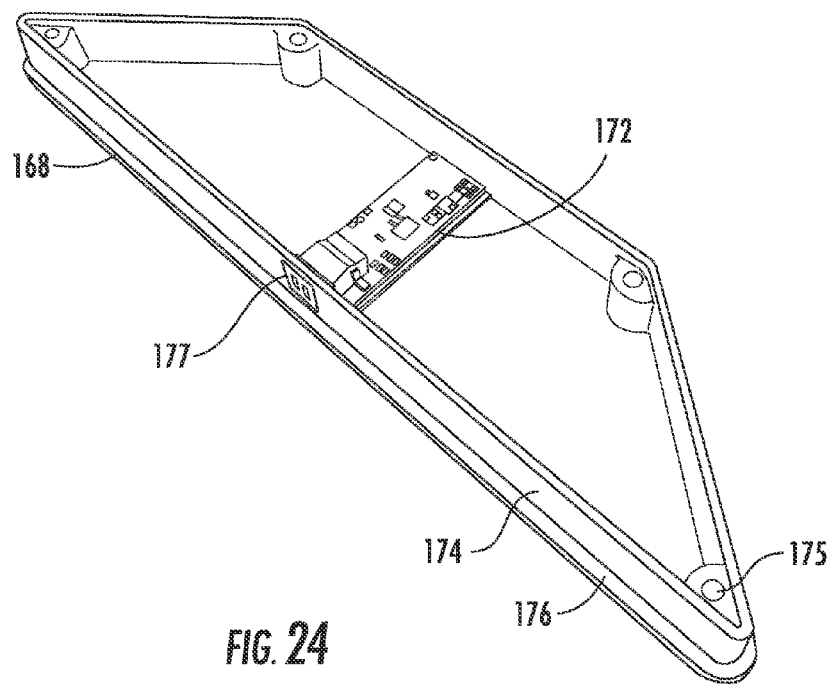

Grommets may have different sizes and shapes to suit specific design requirements. FIGS. 19 to 24 illustrate a first part 166 of a trapezoidal grommet which is suitable for use in a tablet 156 pivotably mounted on a furniture component and may also be embedded in other furniture components. Except for its shape, first part 166 is similar to first part 139 described with reference to FIG. 17 and first part 46 described with reference to FIGS. 3 to 6. FIG. 19 is a perspective view of a lounge chair comprising an armrest 154 and tablet 156 which is adapted to pivot horizontally relative to armrest 154. Tablet 156 has a working surface 158 opposite a surface 160. A computer 150 is shown on tablet 156 for receiving power therefrom. Similarly, FIG. 20 shows a chair with tablet 156 and further illustrates a pivot support 162 (shown in phantom) having a cable 167 therethrough connected to converter 22. As described with reference to device 30, computer 150 includes a plurality of electrical connectors disposed on its bottom surface adapted to electrically couple pads 42 to power computer 150. FIG. 21 is an elevation view showing working surface 158 and FIG. 22 is an elevation view showing opposite surface 160. FIG. 22 shows first portion 166 resting on opposite surface 160 so that the interior of first portion 166 is shown as it would be seen after first portion 166 is inserted into a hole in the work surface. First part 166 has an upper portion 168 and a lower portion 174. A flange 176 extends outwardly from first portion 168. An electronic circuit 172 is shown in FIG. 22 covering apertures 50. On the working surface side, electronic circuit 172 electrically couples the underside of pads 42. As shown in FIG. 22, a cable with a male plug connects an optional converter 22 to a female receptacle 177 coupled to electronic circuit 172 and supported by first part 166. Converter 22 may also be provided as shown in FIG. 20 rather than below tablet 156. FIG. 22 also shows pivot support 162 and post 164 which, at its opposite end, is pivotally supported by armrest 154. A plurality of holes 163 and 165 are provided to secure pivot support 162 to tablet 156 with screws. FIGS. 22 to 24 show a plurality of holes 175 provided to secure a second part (not shown), such as second part 54 with a trapezoidal shape, to first part 166 to thereby secure both to tablet 156. Alternatively, as described with reference to FIGS. 8 to 10, a cavity may be provided in working surface 158 for embedding first part 166, and screws may be threaded through opposite surface 160 to secure first part 166 to tablet 156.

Figure 25:
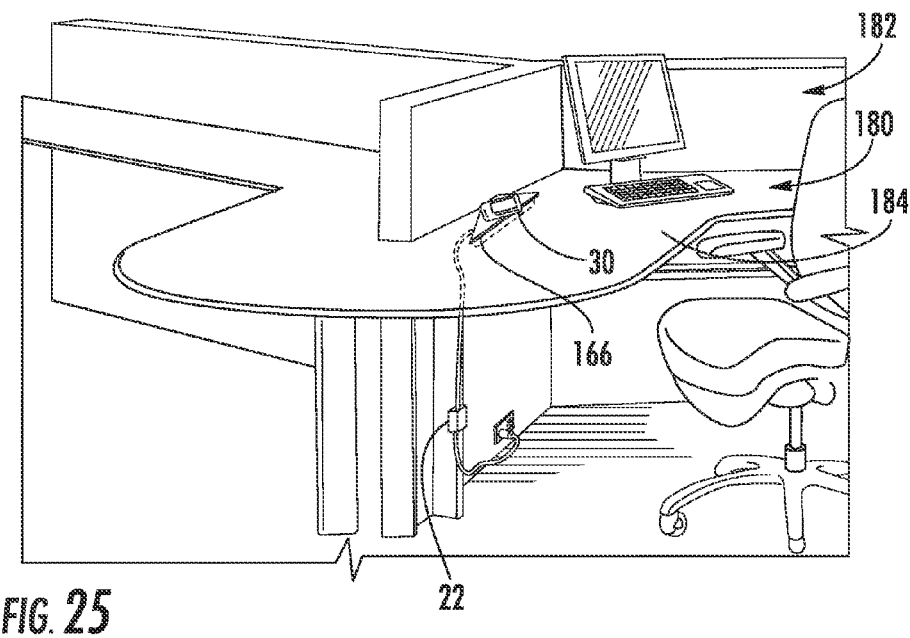
FIGS. 25 to 26 are perspective views of office environments including grommets wirelessly powering electronic devices.
Figure 26:
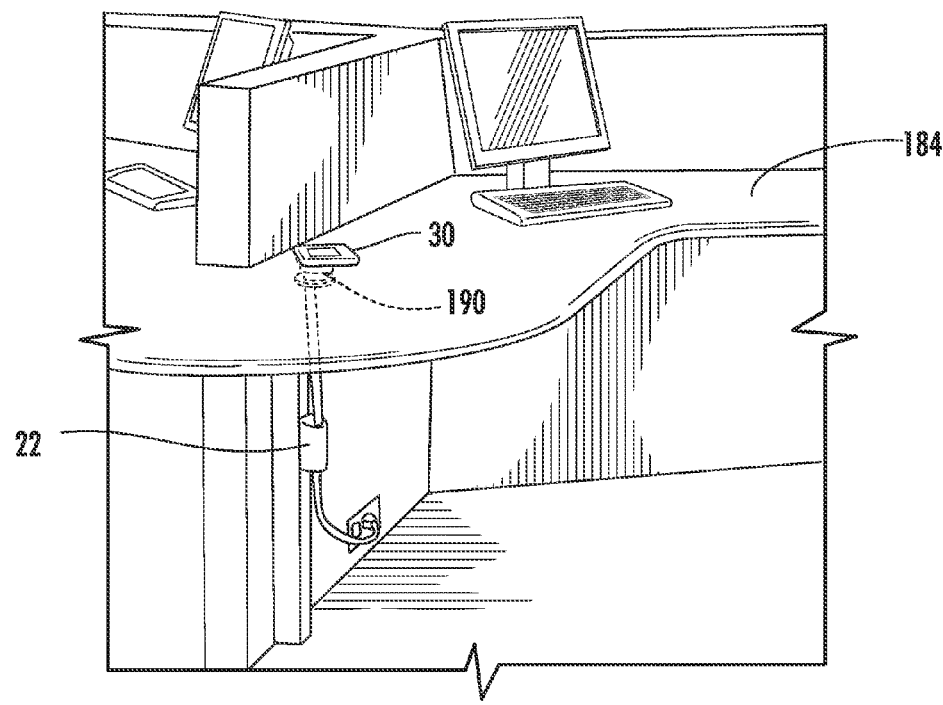

FIGS. 25 and 26 are perspective views of a work environment comprising an upright divider 182 and a table 180 with a working surface 184. Upright divider 182 may be a partition of a cubicle, a wall or any other vertical space divider. The cavity may be a through-hole. Alternatively, the cavity may partially extend from working surface 184. A small hole may then be provided on the bottom of the cavity surface to route a power cord therethrough. In FIG. 25, trapezoidal grommet 166 is shown disposed above a cut-out in working surface 184 where it is to be inserted as described previously, for example, with reference to FIGS. 12 and 17. FIG. 26 is a perspective view of the work environment showing a round grommet 190 (in phantom, and described with reference to FIGS. 27 and 28) inside table 180.

Figure 27:
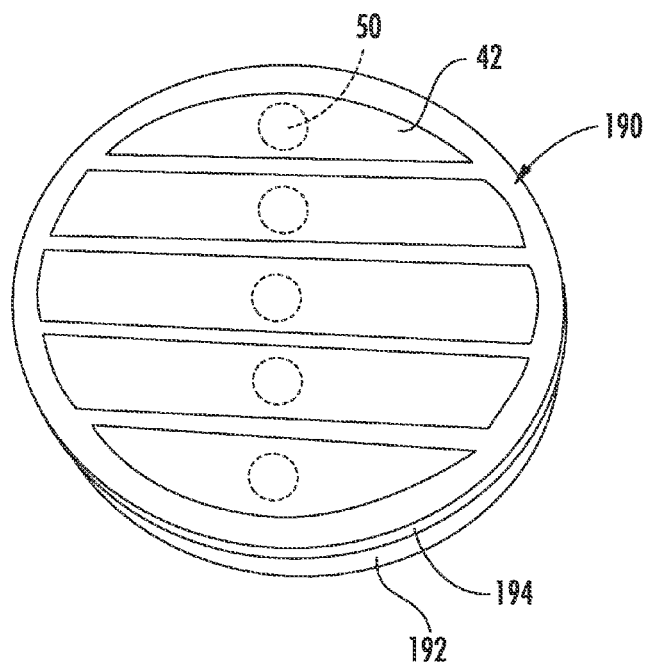
FIGS. 27 and 28 are plan and cross-sectional elevation views of a round wireless power grommet.
Figure 28:
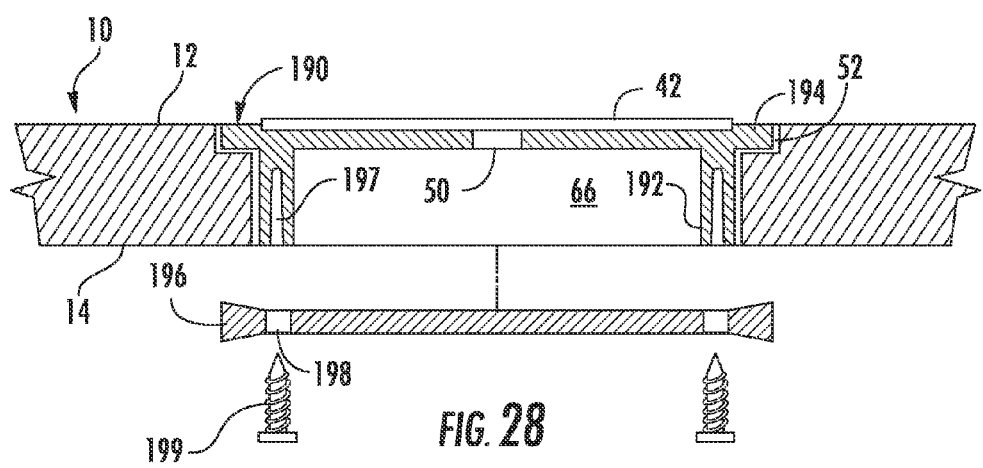

FIGS. 27 and 28 show round grommet 190 having a bottom part 192 and a top part 194. Top part 194 has a plurality of apertures 50 disposed on its surface for enabling a connection between connectors provided in cavity 66 to pads 42 positioned on its surface in the same manner as in the similar embodiments described above. Bottom part 192 includes a plurality of holes 197 adapted to receive screws passing through one or more holes 198 in a backing plate 196. Top part 194 extends laterally beyond the contour of bottom part 192 forming a radially extending lip whose bottom surface can rest on the working surface of furniture component 70, with the working surface of furniture component 70 captured between the lip of top part and backing plate 196.

Figure 29:
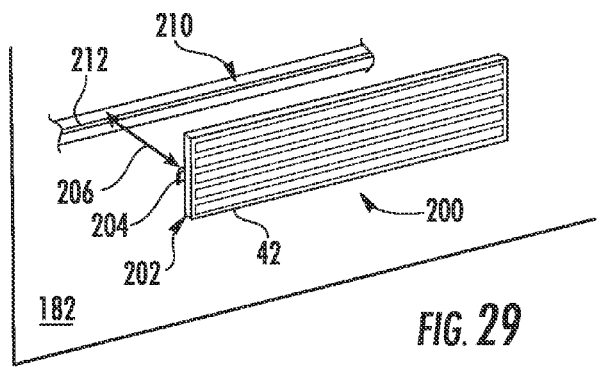
FIGS. 29 to 32 are partial perspective views of exemplary embodiments of wireless power housings and hangers.
Figure 30:
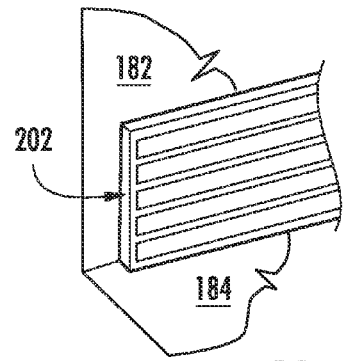
Figure 31:
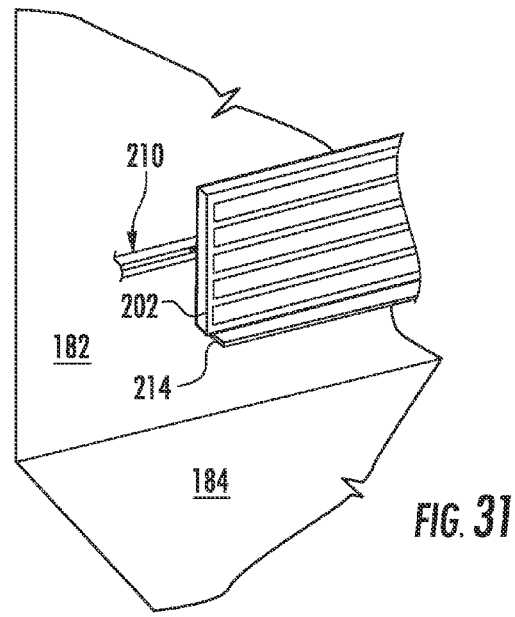

FIGS. 29, 30 and 31 are partial perspective views of exemplary embodiments of wireless power source hanger 200 shown in an environment having an upright divider or office partition panel. Hanger 200 comprises enclosure 202 similar to rectangular grommet 40 except that it is designed for mounting on the surface of an upright divider 182, e.g., an office partition panel, rather than between its working and opposite surfaces. Alternative upright dividers include structural walls, cabinet walls, and the like. In alternative embodiments, grommet 40 may be positioned within upright divider 182. Enclosure 202 may have pads 42 on its surface and may also comprise a magnetic source for retaining electronic device 30 next to pads 42. Alternatively or additionally, inductive coils may be provided inside enclosure 202. Hanger 200 also includes an elongate hook 204 coupled to enclosure 202 for supporting enclosure 202 from track member 210. Track member 210 has an elongate channel adapted to receive elongate hook 204 thereby supporting vertically enclosure 202. Arrow 206 indicates where elongate hook 204 penetrates channel 212. FIG. 30 shows an alternative mounting option wherein enclosure 202 may be affixed by any known means to upright divider 182 such that working surface 184 supports electronic device 30. FIG. 31 shows another alternative design of enclosure 202 in which a shelf 214 is provided to support electronic device 30.

Figure 32:
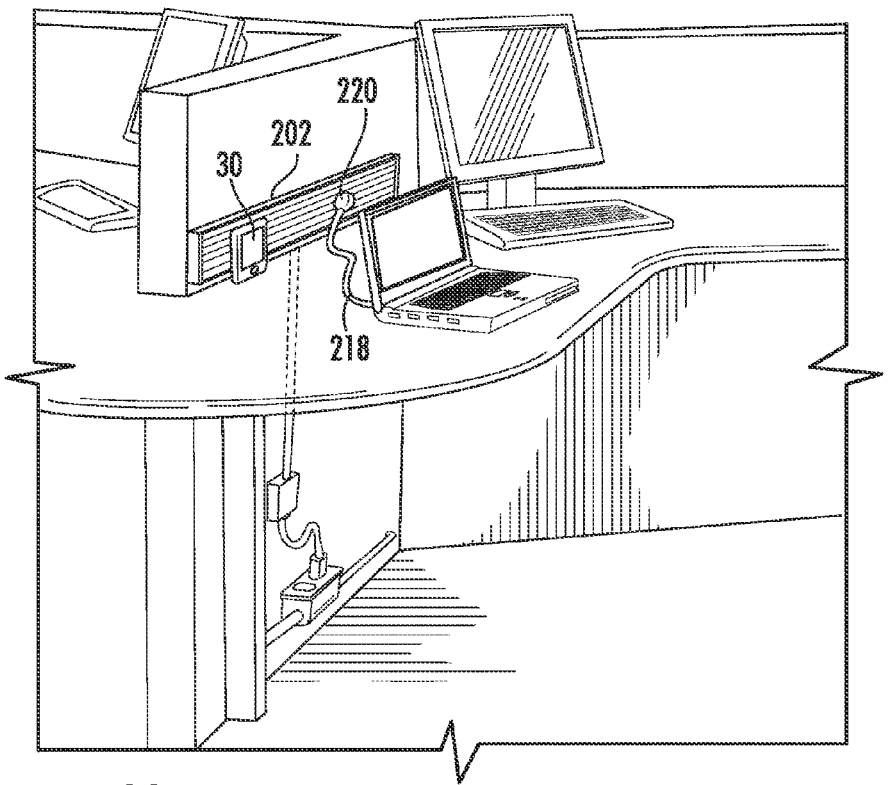

FIG. 32 is a perspective view of enclosure 202 in a work environment. Also shown is a dongle 218 which comprises a coupling portion 220 having a power receptor and further comprising a cable and a connector for transferring power received by the power receptor to a load device, illustratively a computer. Coupling portion 220 may couple to enclosure 202 magnetically, adhesively, with hook-and-loop fasteners, or by any other known means.

Figure 33:
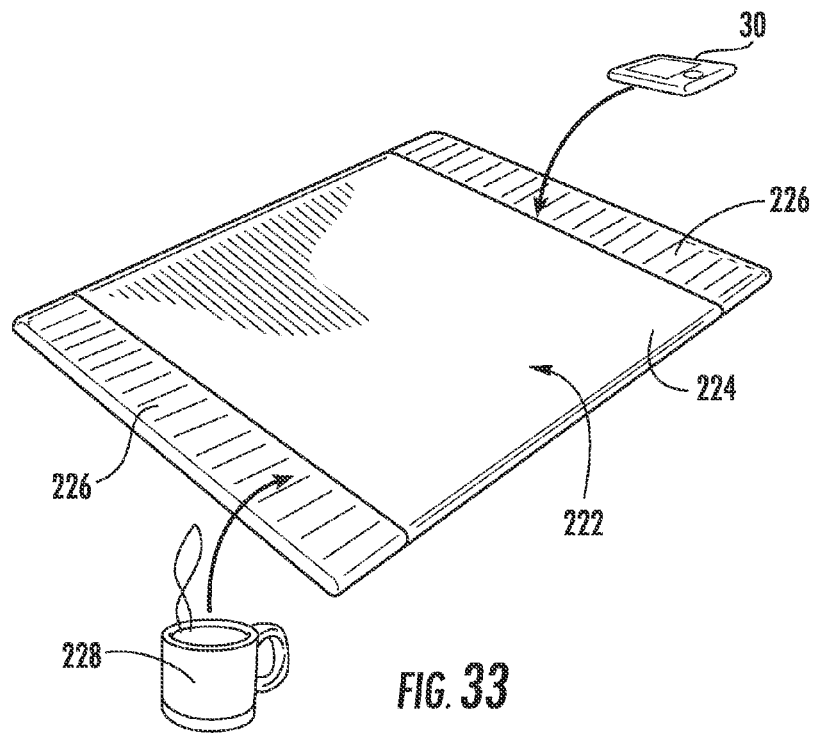
FIG. 33 is a perspective view of a wireless power pad.

FIG. 33 is a perspective view of working pad 222 comprising pad 224 and power strips 226 comprising pluralities of pads 42 provided on the edges of working pad 222. Power strips 226 may power wirelessly electronic device 30 or, alternatively or additionally, a load, e.g. powered container 228.

Figure 34:
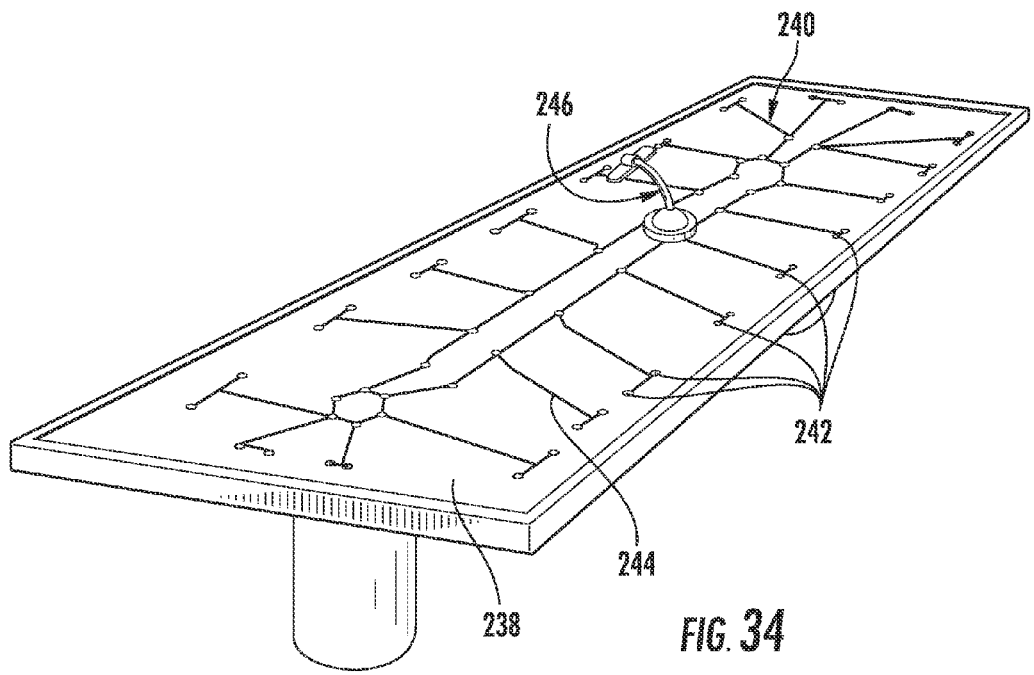
FIG. 34 is a perspective view of a conference table with a network of primary induction coils defining hot-spots on the working surface of the table.

FIG. 34 is a perspective view of table 238 illustrating wireless circuit 240 comprising a plurality of wireless energy sources 242 electrically coupled by a plurality of connectors 244. Wireless circuit 240 may be referred to as a power transfer network and an inductive transmission network. Additional power transfer networks are described with reference to FIGS. 93 to 95. A load, illustratively lamp 246, receives power from wireless energy sources 242. Advantageously, the energy sources 242 may comprise primary coils to power secondary coils coupled to lamp 246 or device 30 (not shown). The primary coils are powered by a power source which may power all the primary coils or may detect the location of device 30 and lamp 246 and then selectively power primary coils near to device 30 and lamp 246. The power source may include a controller for selectively energizing the primary coils at a first frequency to detect the devices on the working surface, and a second frequency to power them. Lamp 246 and device 30 may include a passive electronic circuit which, when powered based on the first frequency, respond by transmitting a signal which is received by the primary coils and the controller. The controller then selectively powers the devices at the second frequency. The controller may scan the wireless power network at predetermined intervals to detect movement of the devices. For example, the controller may switch from the second frequency to the first (detecting mode) every few seconds or every few minutes, e.g. 30 seconds, 1 minute, 10 minutes etc. Furthermore, the wireless power network may include illumination markers described herein and the controller may then illuminate markers corresponding to the selectively powered primary coils to enable a user to relocate the devices if they were moved away from the hot-spots generated by the selectively powered primary coils. The devices may require different amounts of power and the passive circuit may be configured to indicate the optimal power transfer rate for the device, which optimal rate is configured to prevent overloading or overheating the device. The controller then detects the optimal power transfer rate based on the signal transmitted from the passive circuit and modulates the second frequency to provide power at the desired power rate. Advantageously, the controller may thus selectively tailor the amount of power transmitted over time to each device in addition to conserving energy by not powering primary coils when not needed.

Figure 35:
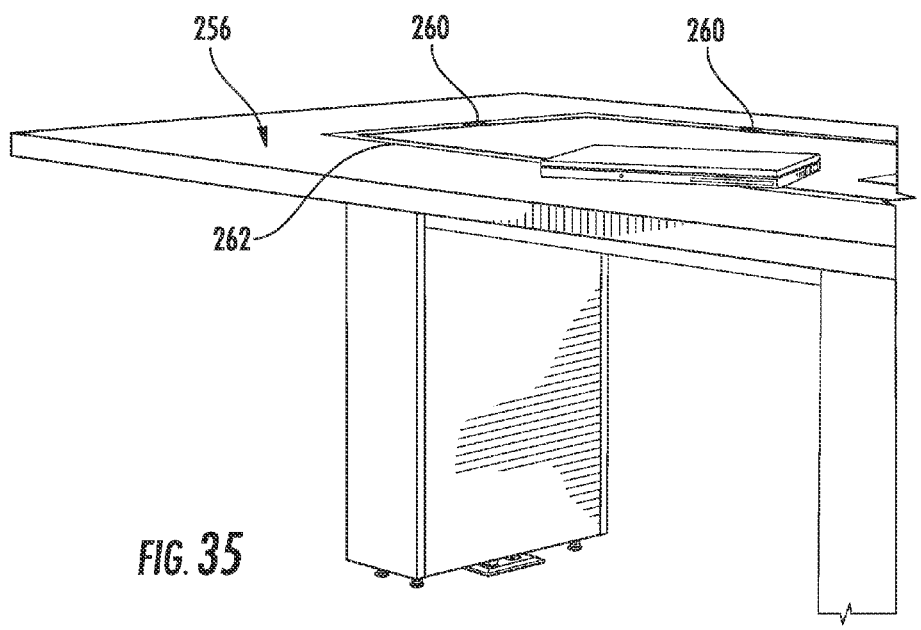
FIG. 35 is a perspective views of a desk with an inlaid pattern including markers identifying the locations of hot-spots.
Figure 36:
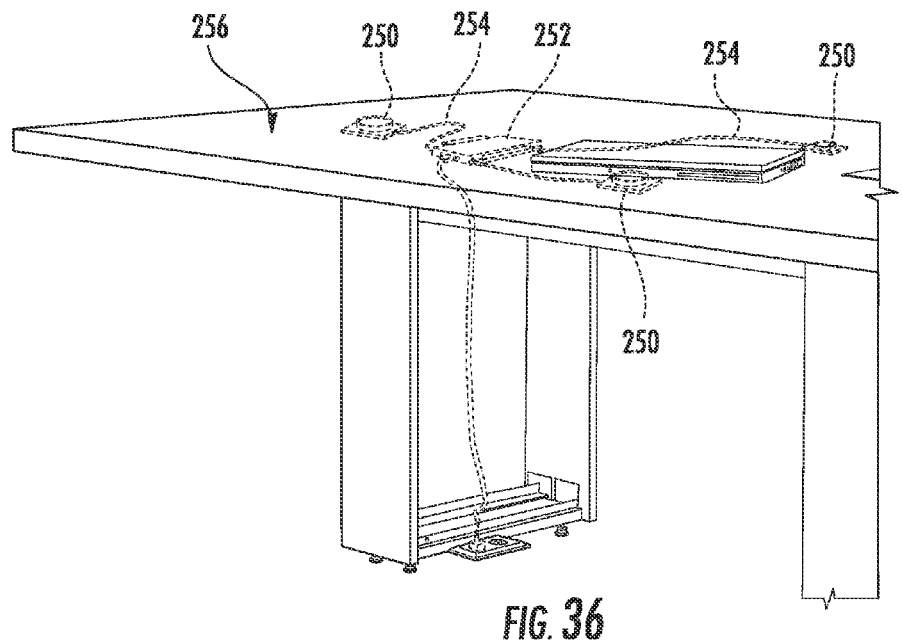
FIGS. 36 and 37 are perspective views of a wiring system for creating hot-spots in the desk of FIG. 35.
Figure 37:
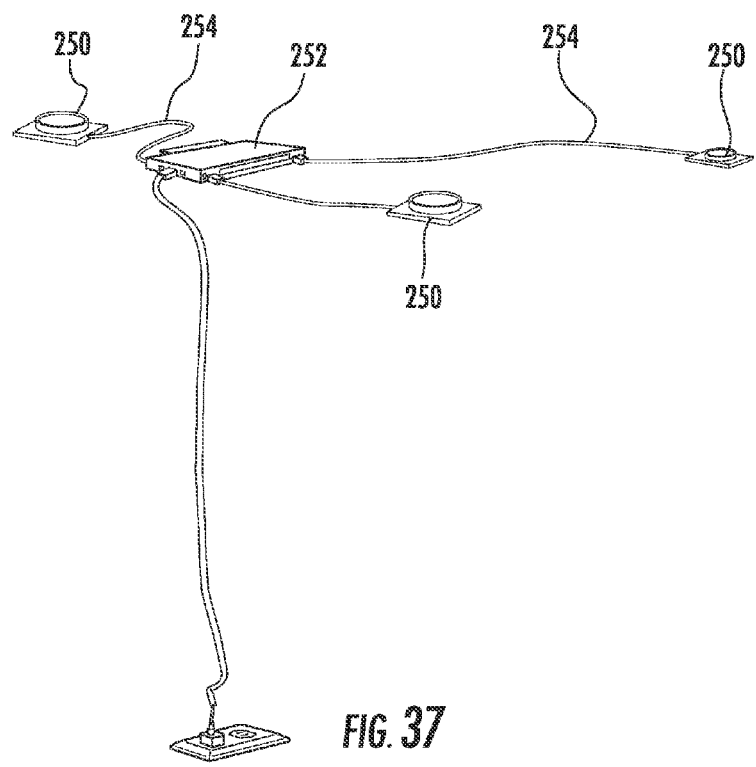
Figure 38:
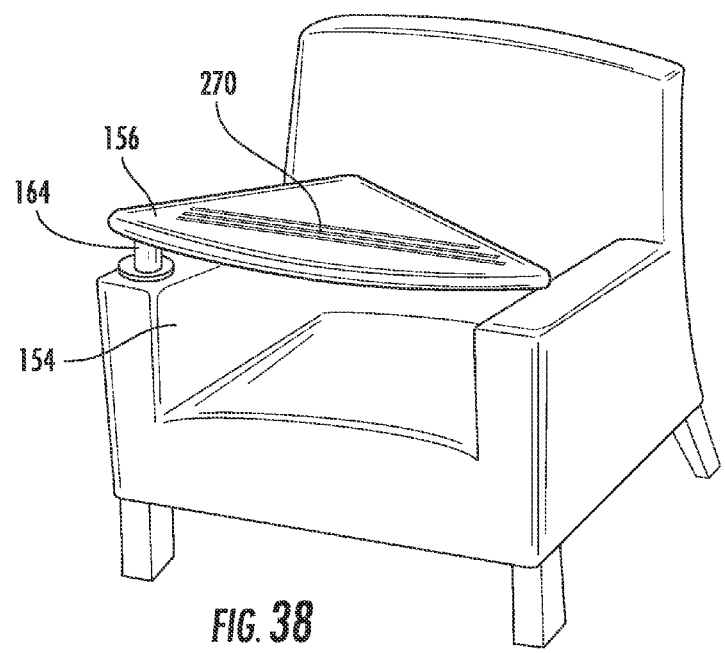
FIGS. 38 and 39 are perspective views of furniture components with tablets and markers on the tablets.
Figure 39:
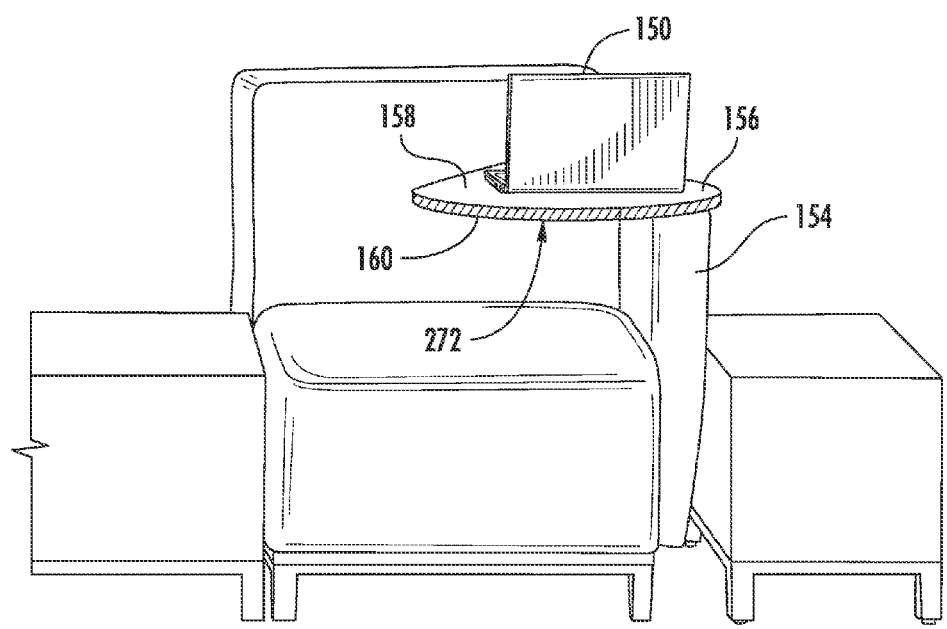

FIGS. 35 to 38 exemplify illumination marker configurations integrated along with primary induction coils (or simply primary coils) in housings embedded in furniture components. Exemplary housings embedded in furniture components are described fully with reference to FIGS. 53 to 72. Referring to FIG. 35, a table 256 is shown having markers 260 in an inlaid design 262 for illustrating the location of primary coils (not shown) in housings 250 and corresponding hot-spots. Markers 260 may be light-emitting-diodes (LEDs), incandescent lights, buzzers and any device available for indicating the location of hot-spots, either continuously or responsive to a signal indicative of the proximal presence of a device emitting a recognizable signal. Responsive markers may be provided for aesthetic reasons or to conserve power. FIGS. 36 and 37 illustrate an alternative connectivity design comprising a power converter 252 coupled by cables 254 to housings 250. The arrangement, in which converter 252 may be placed in a central or convenient location and housings 250 may be placed in a plurality of satellite locations, advantageously provides design flexibility and enables reduction of the size of housings 250. Converter 252 may also include a controller comprising an oscillator and other electronic components configured to modulate a carrier wave which powers the primary inductive coils at selected frequencies as described above. FIG. 38 illustrates an alternative lighting design which includes a pair or more strips of inlaid lighting. Inlaid lighting may comprise a plurality of illumination devices embedded in a cavity in the working surface of the furniture component. The illumination devices may also housed together in a housing made of translucent material, e.g., a transparent polymer, and the housing may then be embedded in the furniture component as disclosed in this disclosure with reference to embedded wireless power housings. FIG. 39 is a perspective view of a lounge chair illustrating tablet 156 and further illustrating an edge lighting 272. Tablet 156 comprises wireless energy sources positioned between working surface 158 and opposite surface 160 or otherwise placed in a housing mounted or imbedded between working surface 158 and opposite surface 160. Edge lighting 272 indicates the location of hot-spots and, when activated, may indicate that the hot-spots are enabled. As described above, edge lighting 272 may comprise illumination devices housed in a translucent housing embedded in the edge of tablet 156.

Figure 40:
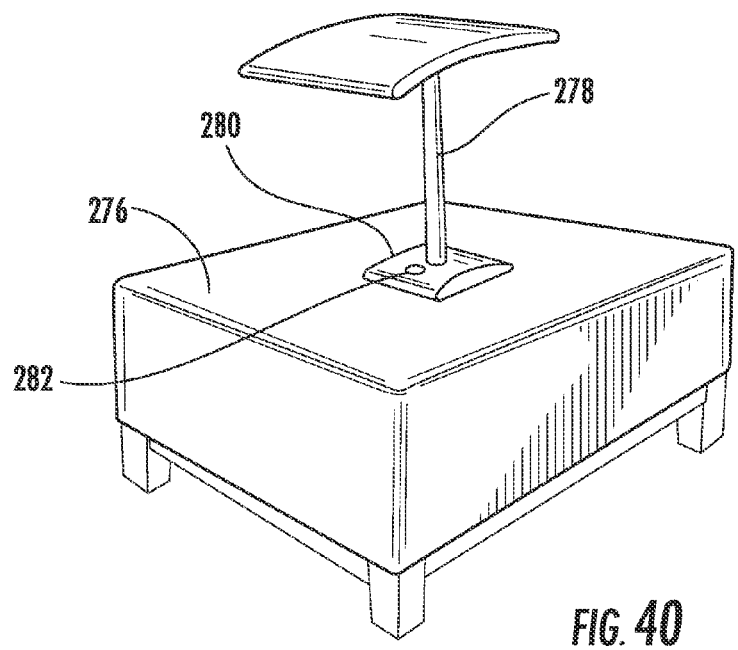
FIGS. 40 to 45 are perspective views of alternative embodiments of furniture components, accessories and hot-spot markers.
Figure 41:
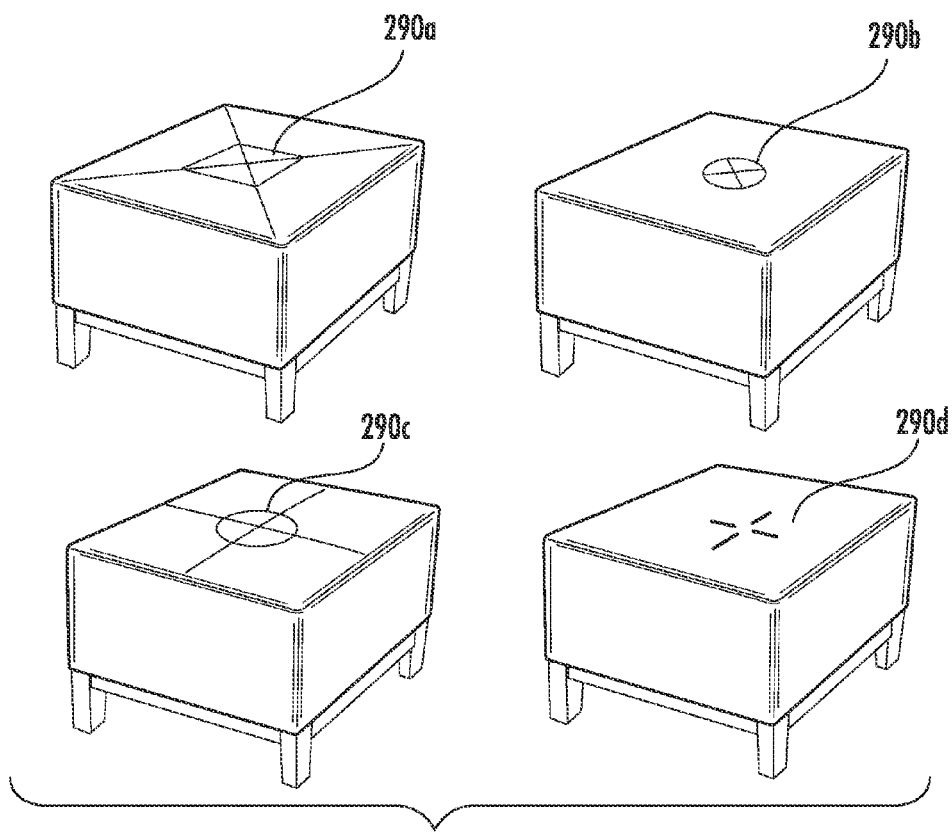
Figure 42:
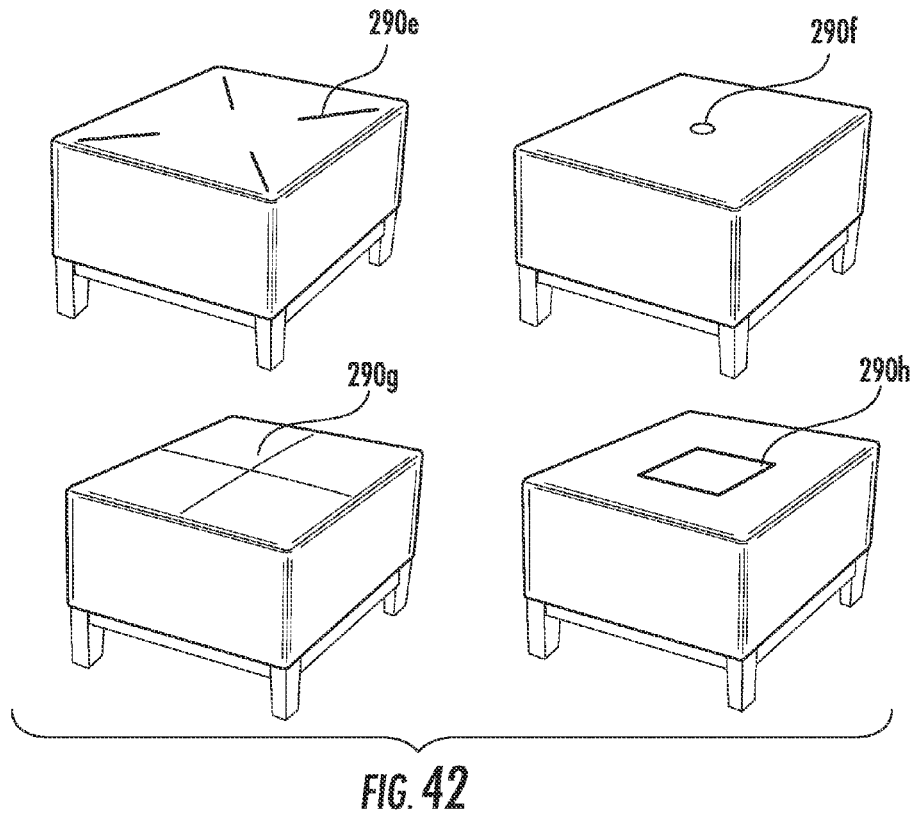

FIGS. 40 to 42 are perspective views of side tables with wirelessly powered load devices. Referring to FIG. 40, a side table 276 includes a wiring system within it including a wireless energy transmitter. A load device 278 includes a base 280 having a marker 282 which indicates load device 278 is receiving wireless power. FIGS. 41 and 42 are perspective views of tables illustrating alternative embodiments of lighting patterns 290*a-h* to indicate the presence of hot-spots.

Figure 43:
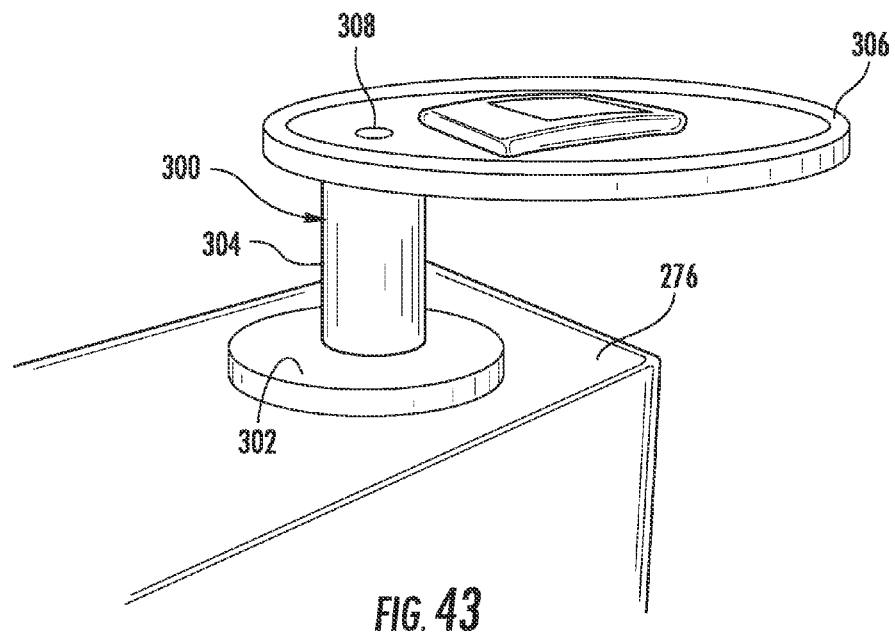
Figure 44:
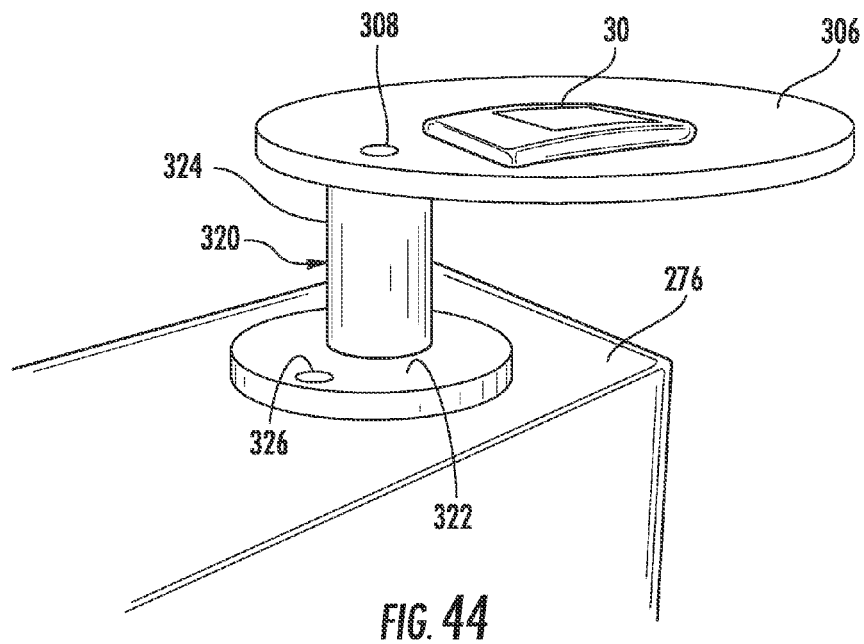

FIGS. 43 and 44 are perspective views of side table 276 with a wirelessly powered electronic device. Side table 276 includes a wiring system within it for powering platform 306 of load device 300. Load device 300 includes base 302 having elongate extension 304 coupling base 302 to platform 306. Platform 306 comprises marker 308 indicating that load device 300 is powered. FIG. 44 is a perspective view of side table 276 which includes a wireless wiring system and a wireless power grommet or conductive pad. Load device 320 includes base 322 having elongate extension 324 coupling base 322 to platform 306. Platform 306 comprises marker 308 indicating the location of a hot-spot. Marker 326 in base 322 indicates that load device 320 is powered.

Figure 45:
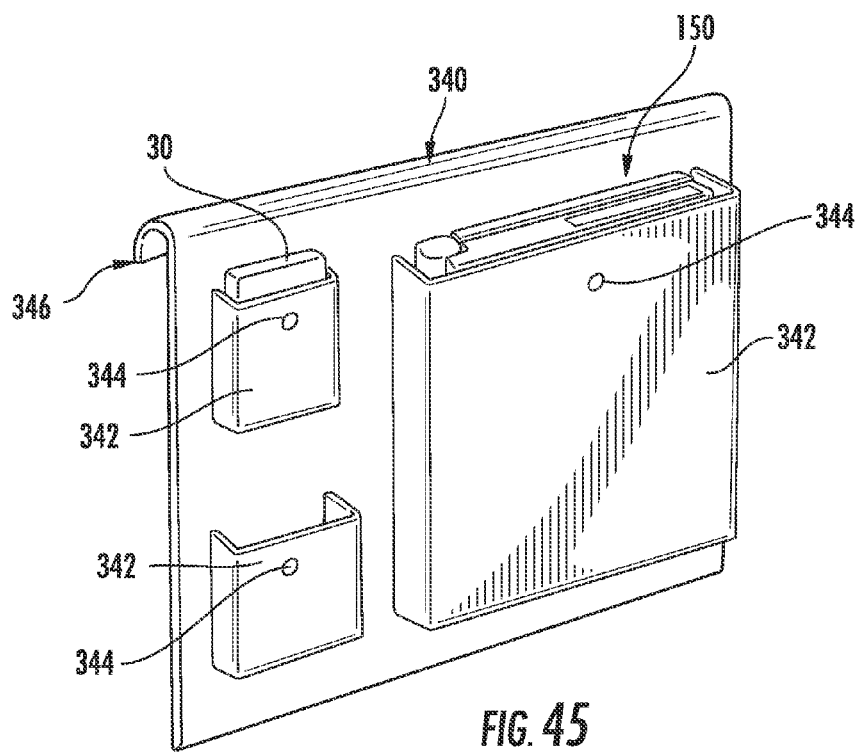

FIG. 45 is a perspective view of an alternative hanger similar to the hanger described with reference to FIGS. 29 to 31. Hanger 340 includes a flat surface and a plurality of pockets 342 extending therefrom for supporting electronic devices such as device 30 and computer 150, and elongate hook 346 exemplified as an integral portion of hanger 340 extending from the upper edge of the flat surface. Pockets 342 include markers 344 which indicate the presence of a hot-spot and which may also indicate whether the electronic devices are being charged. Markers 344 are similar in design and function to marker 308. In alternative embodiments, hanger 340 may comprise conductive pads 42 disposed in an internal surface of pockets 342 and operably connected to the electronic devices to conductively and wirelessly transfer power to the devices.

Figure 46:
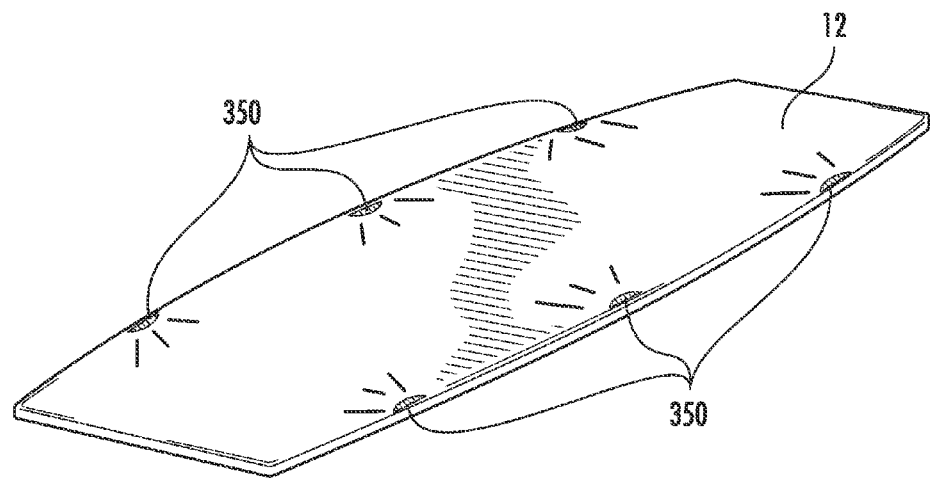
FIGS. 46 to 52 are perspective, cross-sectional, and elevation views of light emitters for indicating the locations of hot-spots.
Figure 47:
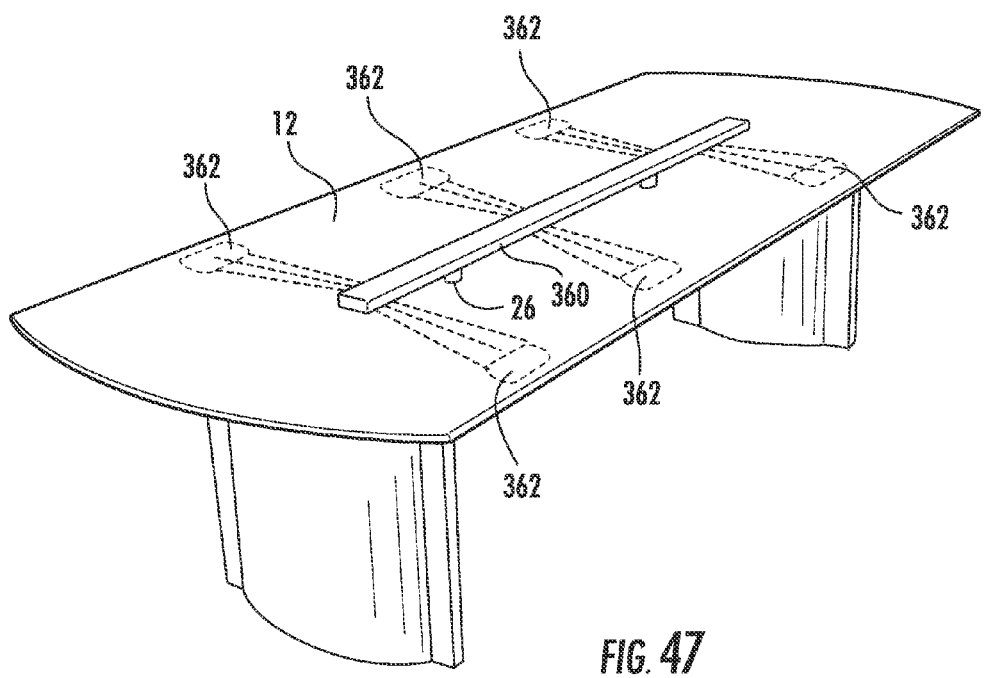
Figure 48:
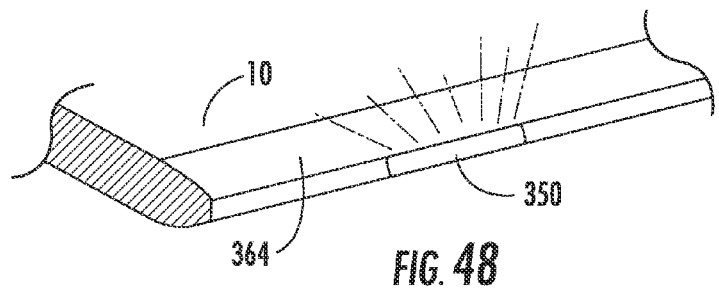
Figure 49:
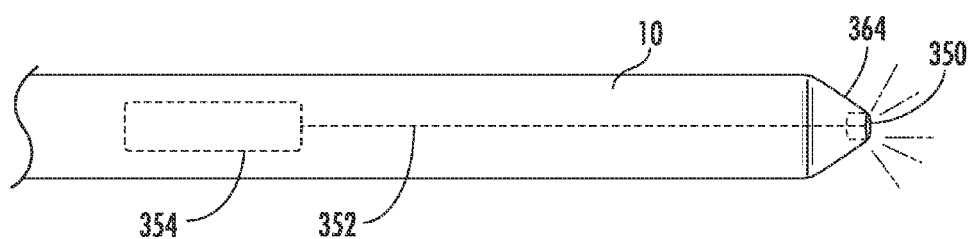

A plurality of embodiments of devices for indicating the location of energy sources which create hot-spots are disclosed in FIGS. 46 to 52. FIG. 46 is a perspective view of working surface 12 illustrating six edge-mounted markers 350 provided to indicate the position of hot-spots disposed in table 10. FIG. 47 is a perspective view of table 10 having a divider 360 supported by, and extending from, working surface 12. A plurality of illumination markers (not shown) are disposed above surface 12, which may be positioned anywhere such as on the sides of, above, or below divider 360, and which project light projections 362 onto working surface 12 to indicate the location of hot-spots corresponding to primary coils positioned below surface 12. An exemplary illumination marker comprises an LED light and may comprise a barrel supporting the LED light and a mask to produce patterned beams which may be patterned by the mask. FIGS. 48 and 49 illustrate markers 350 extending from, and supported by, an edge of table 10, electrically coupled by cable 352 to energy source 354 which provides a hot-spot above surface 12. Marker 350 may be an illumination device and energy source 354 may comprise a primary inductive coil to generate a hot-spot and may also comprise a source of wired power to energize the illumination device when the hot-spot is active. If the charged device is capable of communicating characteristics such as charging level, energy source 354 may indicate the charging level to a user by signalling with the illumination device. For example, a steady beam may indicate location of the hot-spot, flashing may indicate that a device is charging, and a different flashing pattern may indicate that the device is charged. Yet another pattern may indicate that the device is not charging and is not charged. Marker 350 may also be embedded on a contoured side 364 of furniture component 10.

Figure 50:
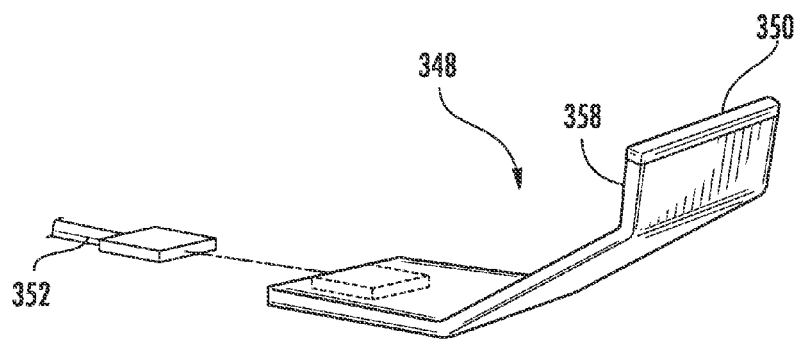
Figure 51:
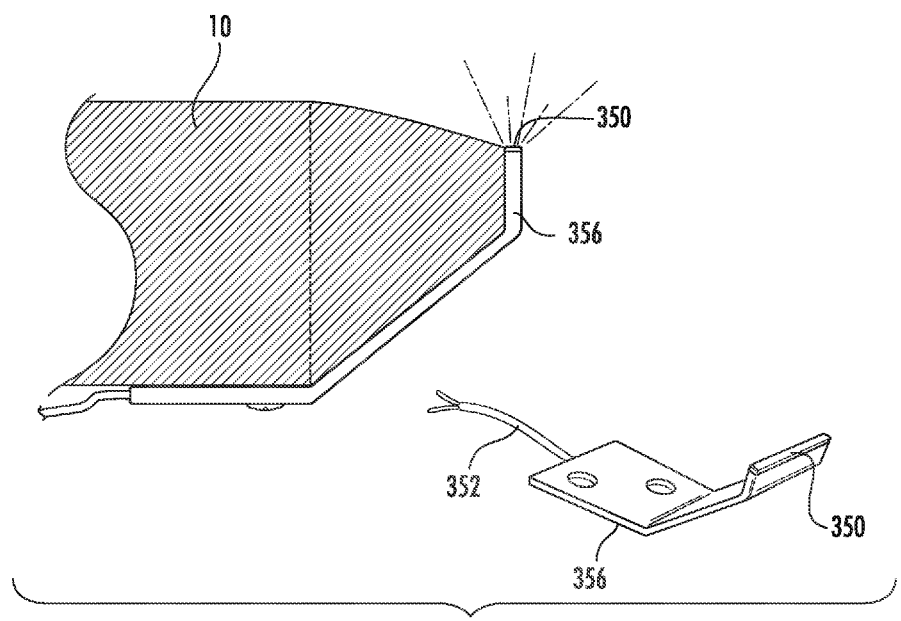

FIGS. 50 and 51 illustrate brackets designed to support markers on furniture components. A bracket 348 is shaped to conform to contoured side 364, support marker 350 on a top edge, and house a female receptacle on the opposite edge. The receptacle receives a connector coupled to cable 352 which energizes marker 350. Bracket 356 is similar to bracket 348 except that it does not include a connector for selectively connecting cable 352 to marker 350. Instead, cable 352 extends from marker 350 to a power source.

Figure 52:
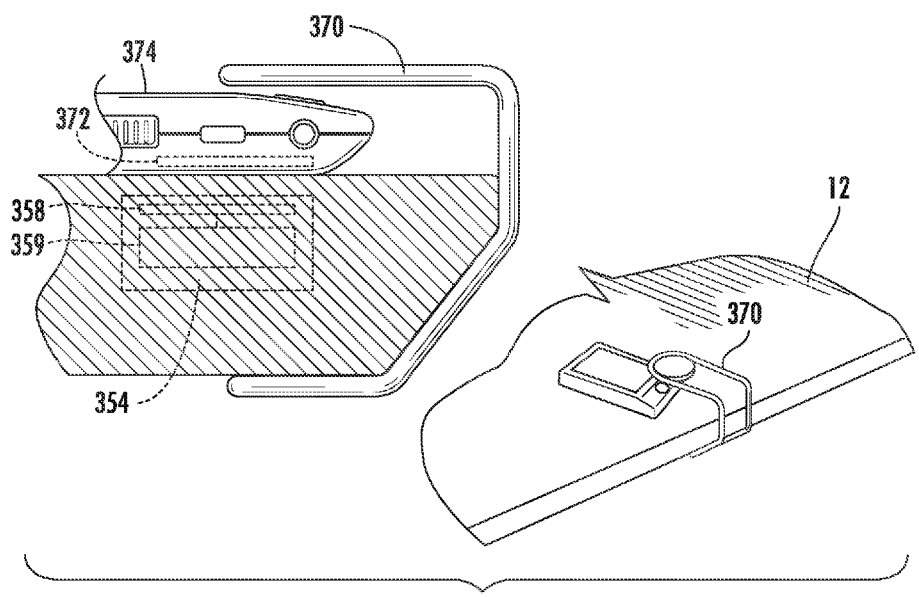
Figure 53:
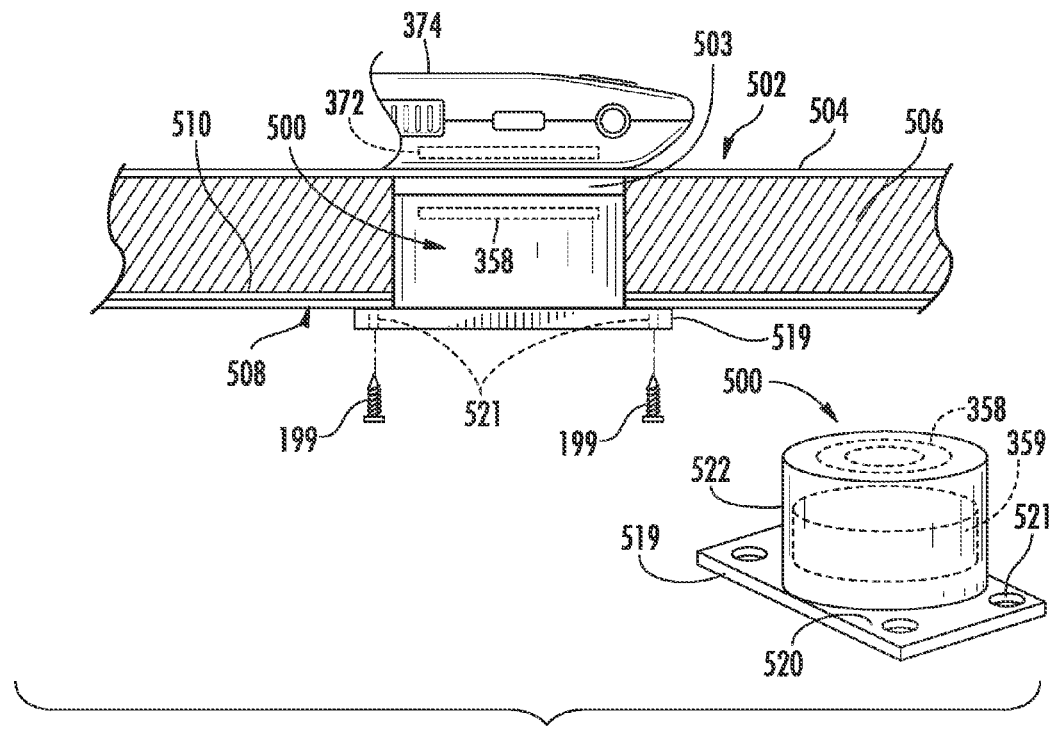
FIGS. 53 to 56 are elevation, plan and perspective views of wireless power transmitter housings and light emitters for indicating the locations of hot-spots.

FIG. 52 is a plan cross-sectional view of a furniture component with an embedded housing 354 comprising therein a primary coil 358 and an electronics circuit 359. On the working surface of the furniture component is an electronic device 374 including a secondary coil 372. Primary coil 358 and secondary coil 372 form an inductive coupling. As described with reference to FIG. 2A, electronic devices 30 and 372 may be electrically coupled to adapters which contain connectors 32. The adapters may also contain secondary coil 372. Alternatively, as shown in FIGS. 52 and 53, secondary coil 372 is housed within electronic device 374. FIG. 52 also illustrates a bracket 370 which illuminates a hot-spot by projecting light down into surface 12. Of course the light may also project away from surface 12 or laterally thereon.

A plurality of embodiments of furniture components integrating housings supporting primary coils and hot-spot markers are disclosed in FIGS. 53 to 56 and 58 to 72. As described above, inductive couplings comprise primary coils driven at a frequency designed to efficiently induce a current on a secondary coil which is electrically coupled to an electronic device to power the electronic device. When primary coils are integrated in furniture components it is advantageous to locate the primary coils as close to the working surface as possible to allow the secondary coils of the electronic devices to be positioned closely proximate the primary coils in order to maximize the transfer of power from the primary to the secondary coils. At the same time, it may be desirable to not interrupt the aesthetics of the working surface of the furniture component by providing openings, holes, etc. in the work surface. The working surface may comprise a polyurethane protective coating or an ultraviolet (UV) coating. The working surface may also comprise a decorative veneer, such as a wood veneer. The coatings and veneers are sufficiently thin to allow the secondary coils of electronic device, when the electronic devices are resting on the work surface, to be positioned sufficiently close to the primary coils integrated into the work surface to in turn enable electromagnetic energy emitted from the primary coils to pass through the coatings and veneers and reach the secondary coils. The embodiments depicted in FIGS. 53 to 56 and 58 to 72 show, generally, a housing positioned within a cavity formed in the non-working surface of a furniture component which does not penetrate a top layer of the furniture component such as a veneer, overlay and the like. The housing includes a primary coil and electronic circuits to provide a driving signal to the primary coil. The housing may also include a second electronic circuit to power illumination markers. The two circuits may be combined on a circuit board supported by the housing. A first cable may run from the housing to the illumination markers to power the illumination markers. Conveniently, as will be apparent from the embodiments described below, the housing, cable and illumination markers may be integrated in the furniture component in a manner in which the aesthetics of the work surface are preserved, i.e., the work surface may have an uninterrupted, continuous surface. Alternatively, the first cable may be supported from the non-working surface of the furniture component. Then, a second cable may be electrically coupled to the housing providing power and control signals to control illumination and power transfer. Also, as previously discussed, a central power converter such as power converter 252 shown in FIGS. 36 and 37 may be provided to power multiple housings and may also power illumination markers.

Referring now to FIG. 53, an energy source housing 500 integrated within a furniture component 502 is shown. Furniture component 502 includes a surface veneer 504 and a backer 508. Housing 500 includes a base 520 having a flange 519 with a plurality of holes 521 and a body 522 in which primary coil 358 is located. Housing 500 is integrated or embedded within a cavity 503 of furniture component 502. A cable 510 may be positioned between intermediate portion 506 and backer 508 to hide cable 510 from view. Cable 510 may energize an electronic circuit inside housing 500 for powering the primary coil. Base 520 is affixed to intermediate portion 506 by any fixation means, e.g. screws, nails, adhesive, tacks, and the like, illustratively screws 199 passing through holes 521. Body 522 may be integrally formed with base 520 by overmolding, for example, or may be separable therefrom. In a preferred embodiment, housing 500 is positioned closely adjacent to veneer 504 and may optionally provide physical support thereto. In a further embodiment, described with reference to FIGS. 69 and 70, a portion of veneer 504 is cut, rotated and restored within the plane of the work surface of furniture component 502 so that the pattern or grain of veneer 504 is misaligned with the surrounding pattern or grain of the work surface, thereby indicating the location of primary coil 358 and corresponding hot-spot. The cut portion may be supported by housing 500. An aperture (not shown) may be provided in backing 508 and, optionally, intermediate portion 506, to receive base 520 and bring body 522 closer to veneer 504. Also shown in FIG. 53 are device 374 and secondary coil 372 which forms an inductive coupling with primary coil 358 as described previously in FIG. 52.

Figure 54:
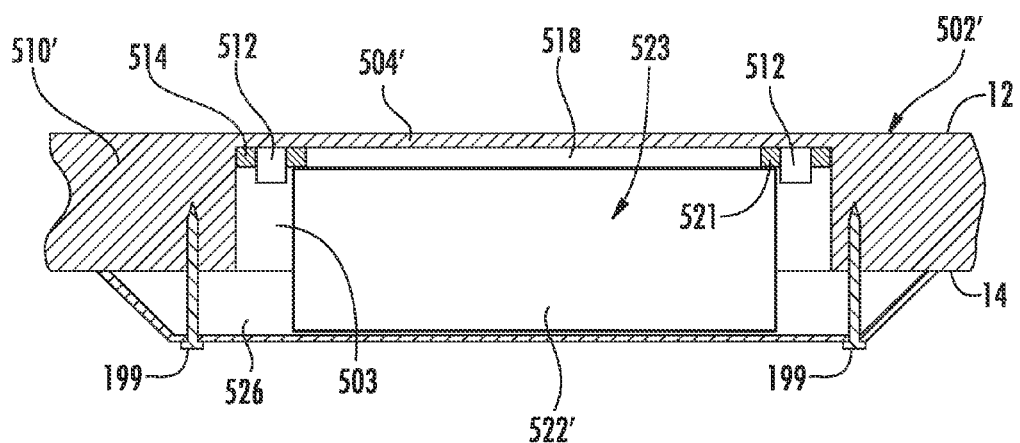
Figure 55:
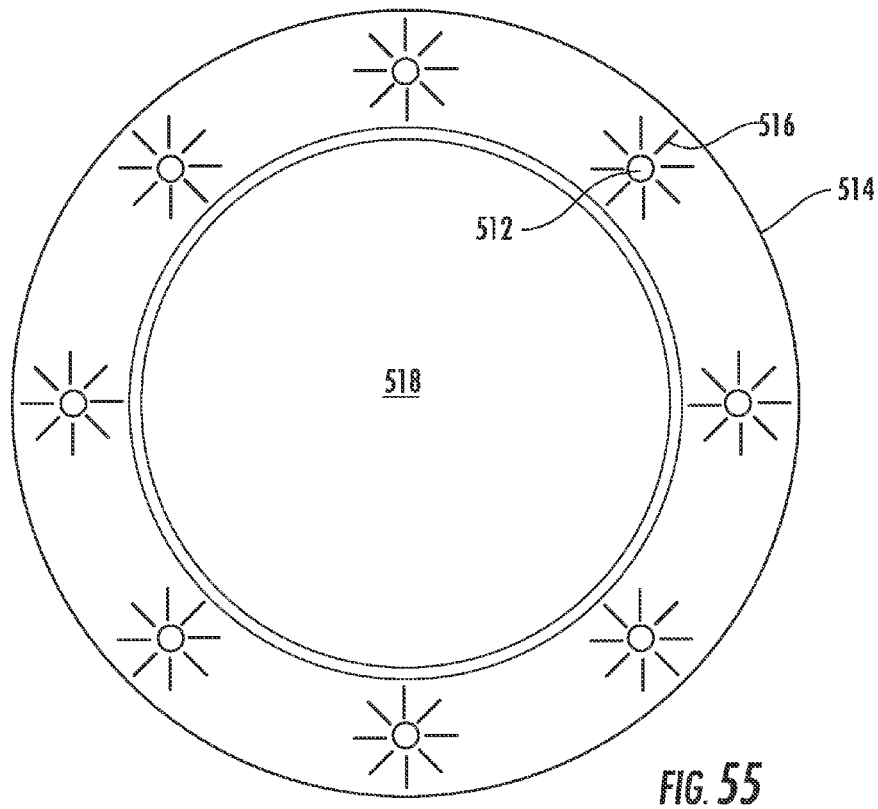

FIG. 54 illustrates a housing 523 integrated within a furniture component 502'. Also shown are a plurality of illumination markers 512 supported by an illumination support 514. FIG. 55 illustrates a housing similar housing 523 except that in FIG. 55 illumination support 514 is integrated with the housing. Referring to FIG. 54, a cross-sectional plan view of furniture component 502' is shown including a cavity 503 in which housing 523 is positioned. Cavity 503 is sized to leave a portion 504' of furniture component 502' between cavity 503 and working surface 12. Portion 504' is sufficiently thin to enable electromagnetic energy produced by a primary coil 518 to pass therethrough. Housing 523 includes primary coil 518, a body 522' and a base 526. Base 526 includes holes through which screws 199 may pass to secure housing 523 to furniture component 502'. As shown, body 522' has a larger diameter than primary coil 518 and includes a ledge 521 on which illumination support 514 is supported. Furniture component 502' comprises a thermoplastic material, e.g. acrylic, polypropylene, and the like, configured to permit illumination provided by markers 512 to pass through portion 504' thereby extending illumination effects 516 (shown in FIG. 55) to working surface 12. The same materials may be used to form veneer 504 and veneers described further below. Thermoplastic materials may be transparent and may comprise particulate matter which may or may not be transparent. An exemplary embodiment of a suitable thermoplastic material is CORIAN™ which is distributed by DuPont, Inc. CORIAN™ comprises an acrylic polymer and alumina trihydrate. Veneer 504 may be manufactured in different thicknesses selected for enabling light from markers 512 to pass therethrough. The maximum thickness is determined by the characteristics of the lighting. More powerful lighting permits use of thicker veneers than less powerful lighting. In a preferred embodiment, veneer 504 is more than six and up to twelve millimeters thick. In a more preferred embodiment veneer 504 is about six milimeters thick, and in another preferred embodiment veneer 504 is between less than six milimeters thick and more than three millimeters thick. Another suitable material is named GIBRALTAR™ and is distributed by Wilson-Art, Inc. Similar thickness ranges are applicable to portion 504'.

FIG. 55 is an elevation view showing primary coil 518, illumination support 514, and a plurality of illumination effects 516 surrounding markers 512. Markers 512 may illuminate through portion 504' shown in FIG. 54. Markers 512 may also be positioned on a furniture component proximal to the working surface in an unobstructed manner to provide illumination effects 516 directly on the working surface. Illumination support 514 may comprise a plate with an opening configured to receive a primary coil 518 which is shown having a circular shape but which may also comprise other shapes such as square, arcuate, rectangular, etc. As discussed previously, markers may comprise any illumination device including diodes, incandescent, reflective other illumination technologies.

Figure 56:
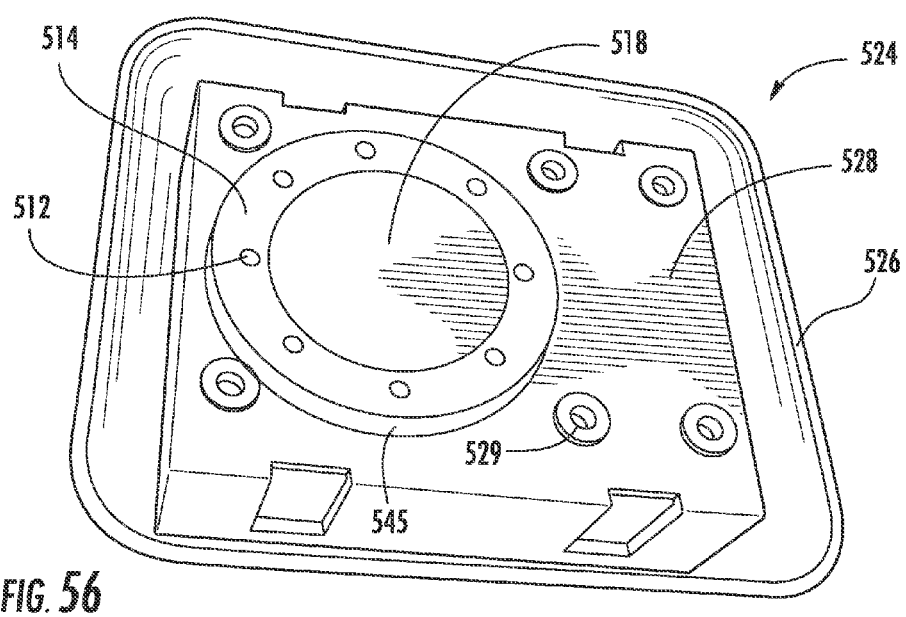

FIG. 56 is a perspective view of an energy source housing 524 which is similar to housing 523 and may be attached to a furniture component in a similar manner as shown in FIG. 54. Housing 524 comprises a body 528, a shell portion 526, and a plurality of holes 529 configured to attach housing 524 to a furniture component. Shell portion 526 supports primary coil 518, body 528 and illumination support 514. Body 528 houses electronic circuits (not shown), e.g. circuits 100, for powering primary coil 518 and illumination markers 512. Body 528 may support illumination support 514 and primary coil 518. Primary coil 518 extends from body 528 by a distance 545 configured to put primary coil 518 near the working surface of the furniture component. Similarly to grommet assembly 126 shown in FIG. 13 and grommet 190 shown in FIG. 15, the electronic circuits may extend below the non-working surface of the furniture component which facilitates embedding of wireless power sources in furniture components without sufficient thickness to embed the electronic circuits.

Figure 57:
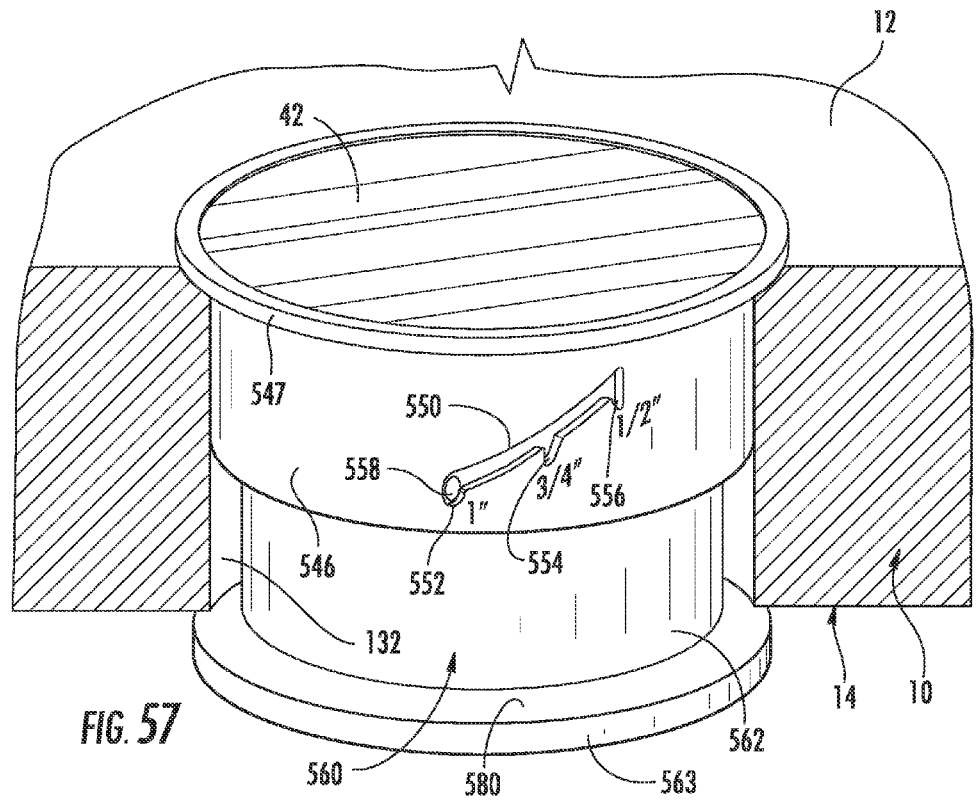

FIGS. 57 to 60 illustrate embodiments of adjustable height housings which, advantageously, enable positioning of the adjustable height housings in furniture components having work surfaces of different thicknesses. FIG. 57 illustrates a housing 560 received within through-hole 132 of furniture component 10. Housing 560 includes a single piece base portion 562 which is adjustably coupled to a support portion 546. A pair of flanges 547 and 563 of support portion 546 and base portion 562 engage working surface 12 and non-working surface 14 to secure adjustable height housing to furniture component 10 in the manner described with reference to FIGS. 3 to 6 and 17. An engagement surface 580 of flange 563 is also shown. Support portion 546 is shown supporting pads 42 representing a conductive transmitter. In other embodiments, support portion 546 may support other wireless power sources such as primary coils. Support portion 546 and base portion 562 are cylindrically shaped and engaged in a telescoping relationship to adjust the height of energy source housing 560. Base portion 562 and support portion 546 are slidably coupled by a longitudinal aperture, groove, or slot, 550, apertures, or notches, 552, 554 and 556 extending from one longitudinal edge of slot 550, and a protrusion 558 adapted to adjust the height. Notches 552, 554 and 556 define three heights of housing 560. The three heights may correspond to industry standard tabletop thicknesses, for example, advantageously facilitating adaptation of housing 560 to industry standards or structures of various thicknesses. Additional notches may be provided. As defined herein, height refers to an axial distance measured from flange 547 to flange 563.

While slot 550 is shown in a slanted orientation relative to the working surface of the furniture component, in another embodiment slot 550 may be disposed perpendicularly to the working surface and may also comprise only one aperture extending from the longitudinal edge proximally to the end of slot 550 closest to the working surface. In this embodiment, a first height is defined when protrusion 558 is in the aperture and a second height is defined when protrusion 558 rests on the opposite end of the longitudinal aperture. Of course, additional apertures may be provided to define additional heights. It should also be understood that the apertures or notches which define the heights may be through-holes or cavities which do not pass through the cylindrical walls, and protrusion 558 may be fixedly attached or may comprise a detent ball which is externally biased but which may retreat inside the cylindrical wall. The longitudinal aperture may also comprise a longitudinal cavity cooperating with the detent ball. For instance, when the housing base and housing support are rotated to adjust the height of the housing, the detent ball partially retreats and rides on the longitudinal cavity until it reaches a height-defining cavity or aperture, at which time it extends outwardly to "set" the height.

Figure 58:
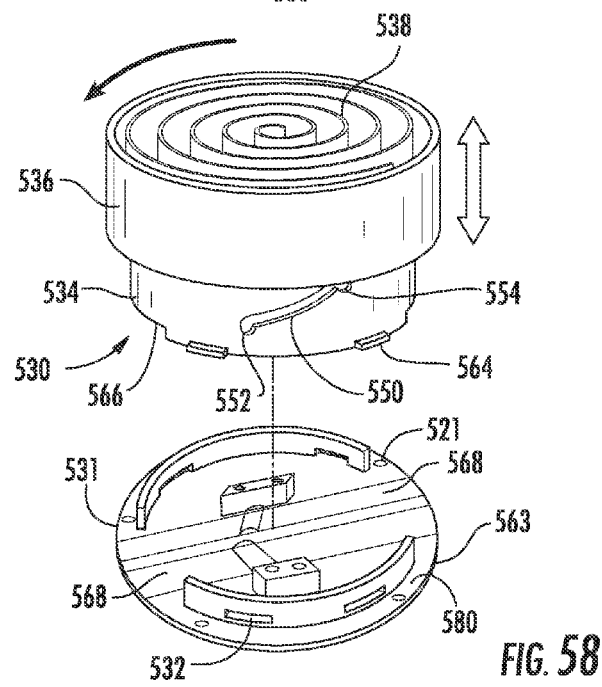

FIG. 58 illustrates an embodiment of an adjustable housing 530 which is otherwise identical to housing 560 except that housing 530 further comprises a two-part base instead of a single-part base and is shown supporting a primary coil 538 instead of pads 42. The adjustment mechanism comprises a groove, or slot, as described with reference to FIG. 57. Adjustable housing 530 includes a base portion 531 separably affixed to an intermediate portion 534 which is adjustably coupled to a support portion 536. Support portion 536 supports primary coil 538. Support portion 536 rotates about intermediate portion 534 guided by movement of protrusion 558 in groove 550. Protrusion 558 may rest in one of notches 552, 554 and 556 (only notches 552 and 554 are shown) which predetermine three heights. Alternatively, intermediate portion 536 may be provided in a single part with base portion 531. Base portion 531 includes flange 563, holes 521 provided to secure housing 530 to a furniture component, and a couple of arcuate walls having slots 532 therein. Intermediate portion 534 includes a plurality of protrusions 564 configured to engage slots 532 thereby detachably coupling intermediate portion 534 and base portion 531. The arcuate walls form a pair of openings 568 through which a flat cable may be disposed in the manner shown in FIG. 80 with reference to housing 922.

FIGS. 59 and 60 illustrate an embodiment of an adjustable height otherwise identical to adjustable housing 530 except the housing of FIGS. 59 and 60 includes a different mechanism for securing the intermediate and base portions of the housing. Adjustable housing 530 includes a support portion 546, an intermediate portion 544 and a base portion 542. Support portion 546 is shown similar to support portion 536 except that primary coil 538 is not shown for clarity to illustrate a pair of slots 550 with notches 552, 554 and 556. Intermediate portion 544 is similar to intermediate portion 534 except that it includes a plurality of slots 576 instead of protrusions 564. Base portion 542 is similar to base portion 531 except that the arcuate walls and slots 532 are replaced by tabs 578 which are configured to engage slots 576 and removably secure intermediate portion 544 to base portion 542.

FIGS. 61 to 72 illustrate various configurations of wireless power housings and light emitters integrated with furniture components. Various configurations of translucent layers, veneers, and surface patterns are provided to enable light emitted from the light emitters to pass through the working surface to indicate the presence of a nearby hot-spot corresponding to the location of the inductive coil that is integrated within the furniture component. FIGS. 61 and 62 are plan cross-sectional views of a furniture component 700 having an intermediate portion 705, a veneer 706 and translucent layer 704. Positioned within furniture component 700 is a housing 707 similar to housing 500 described with reference to FIG. 53. Housing 707 includes a primary coil 708 inside body portion 522. Adjustable height housings such as those described in FIGS. 58 to 60 may also be used in a similar manner. Also positioned within furniture component 700 is an Illumination block 716 disposed adjacent to translucent layer 704 and through veneer 706. Illumination block 716 comprises a plurality of through-holes 718 configured to allow light provided by a light emitter 714 to illuminate a spot on translucent layer 704 denoting the presence nearby of a hot-spot, e.g., above primary coil 708. Illumination block 716, as shown, is embedded in a cavity extending from the surface of intermediate portion 705 proximal to working surface 12. Thus, illumination block 716 is inserted into the cavity before adding translucent layer 704 to furniture component 700. In an alternative embodiment, illumination block 716 is sized to fit, and may be inserted into, cavity 702. In a further embodiment, illumination block 716 and light emitter 714 are combined in a single piece and are inserted together into cavity 702. Illumination block 716 may be provided with a base portion similar to base portion 520 to secure illumination block 716 to non-working surface 14. Body portion 522 comprises an electronic circuit (not shown) to drive primary coil 708. Cable 712 extends from housing 707 to light emitter 714, which is positioned within a cavity 702 in furniture component 700, to power light emitter 714. Light emitter 714 may comprise one or more LEDs, fluorescent lamps and incandescent bulbs. Light emitter 714 may be driven by a controller to provide different illumination patterns when a device is located on the working surface over primary coil 708. For example, light emitter 714 may illuminate in a blinking pattern if the device is charging. Other illumination patterns may be provided to communicate different messages. Translucent layer 704 may comprise any surface capable of transmitting light therethrough. Exemplary translucent layers include UV clear coat, plastic film, and glass. Veneer 706 may comprise any decorative surface such as, for example, laminate, veneer, thermoform, and core cover.

FIGS. 63 and 64 are plan cross-sectional views of furniture component 700 with light emitter 714 positioned within a cavity of furniture component 700. The embodiment depicted in FIG. 63 is similar to the embodiment depicted in FIG. 61 except that illumination block 716 has been removed and a first surface pattern 726 comprising a plurality of holes through veneer 706 has been provided to distribute light from light emitter 714. Light emitter 714 may be positioned within cavity 702 adjacent to the underside of veneer 706 to provide structural support to veneer 706. Light emitter 714 may be press-fit into cavity 702. Alternatively, light emitter 714 may be provided with a base portion similar to base portion 520 to secure light emitter 714 to non-working surface 14. First surface pattern 726, as well as second surface pattern 746, illustrated in FIG. 71, may be provided by laser etching or perforating, laser cutting, engraving and other known methods of providing patterns in surface materials. In another embodiment, first surface pattern 726 comprises cavities that thin veneer 706 without making through-holes. The thinned portions enable light to pass through. FIG. 64 illustrates an embodiment in which a veneer 706' is sufficiently thin and porous to enable light from light emitter 714 to pass therethrough without first surface pattern 726. In one embodiment, the thickness of veneer 706' is less than 0.100 inches. In another embodiment, the thickness of veneer 706' is less than 0.050 inches. In a still further embodiment, the thickness of veneer 706' is less than 0.030 inches. As described previously, the surface may be porous and may also include transparent fillers, e.g. glass or translucent polymeric particles, which enable light to pass through.

Figure 65:
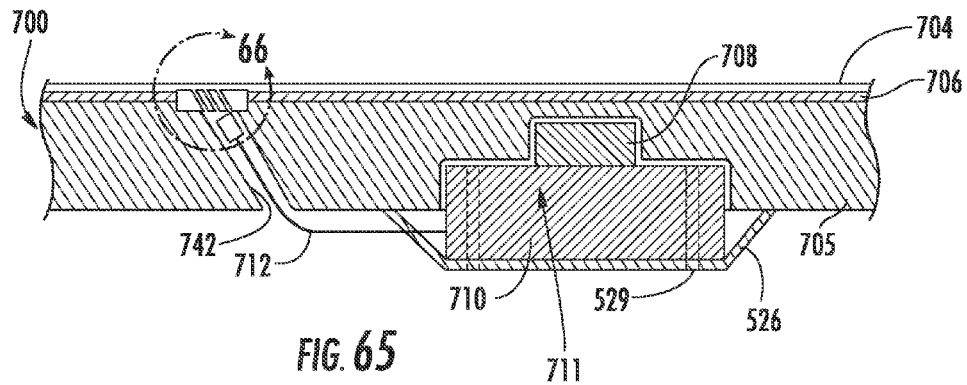
Figure 66:
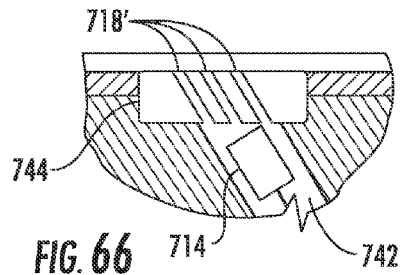
Figure 67:
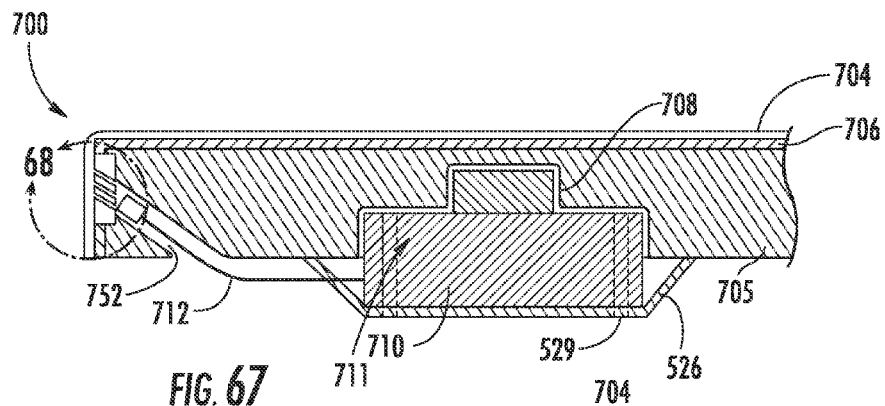
Figure 68:
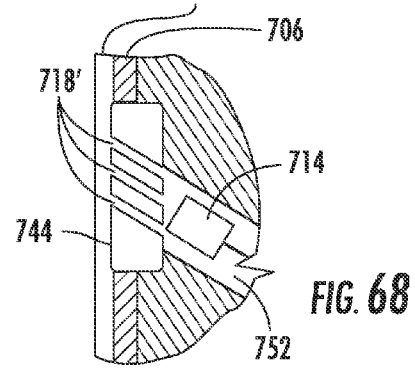

FIGS. 65 to 68 are plan cross-sectional views, similar to FIG. 61, of further embodiments of furniture components integrating illumination blocks provided with slanted through-holes to generate directional illumination effects. Referring to FIG. 65, an illumination block 744 is shown comprising slanted holes 718' and positioned within a cavity 742 in furniture component 700. Unlike the illumination block described in FIG. 61, which projects light perpendicularly to working surface 12, illumination block 744 projects light at a slanted, non-perpendicular, direction. Advantageously, the slanted holes may be oriented towards an edge of working surface 12, for example an edge proximal to seating, to assist a person sitting on the seating to discern the light. Light emitter 714 fits inside a slanted cavity 742 to illuminate a spot on working surface 12. Light emitter 714 may also fit in slanted cavity 752, shown in FIGS. 67 and 68, to illuminate a lateral or edge surface of furniture component 700. Advantageously, directional illumination indicates the status of a charging device to individuals whose line of sight is proximal to the illuminated spot without distracting others. Through-holes may also be filled with translucent materials including tinted and colored polymers and glass to generate additional illumination effects. Also shown in FIGS. 65 and 67 are housings 711 having shell portions 526 supporting support portions 710 and primary coils 708. Housing 711 is similar to housing 524 described with reference to FIG. 56.

Figure 71:
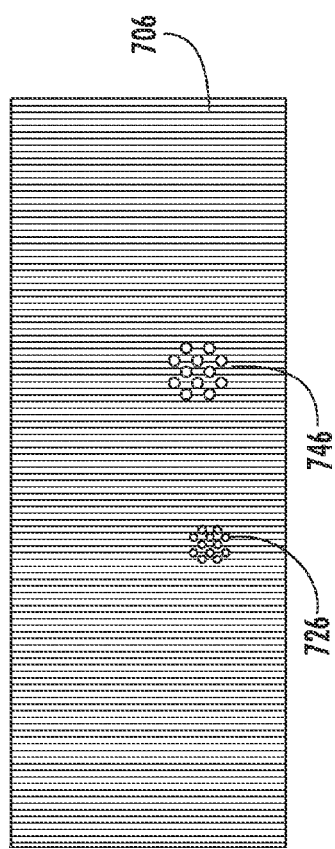
Figure 72:
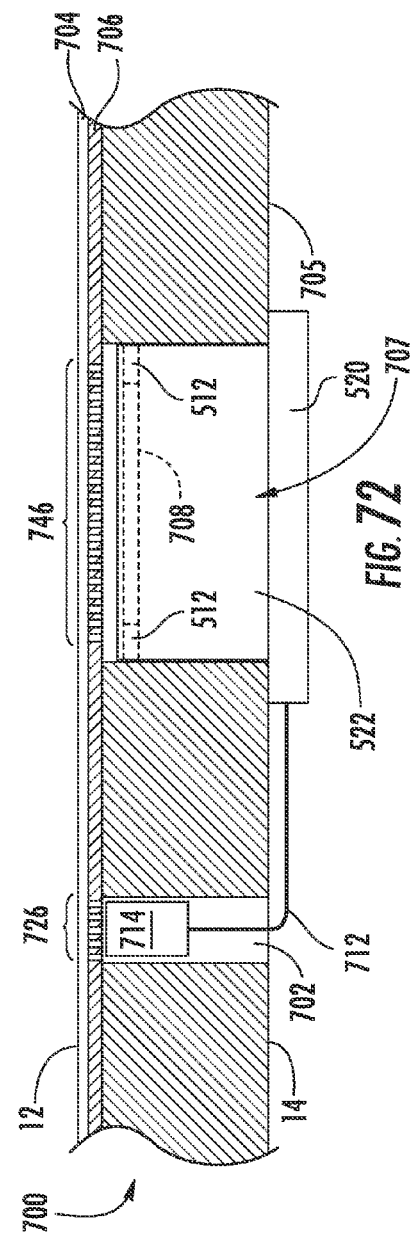

FIGS. 69 to 72 are elevation and plan cross-sectional views of additional embodiments of furniture components integrating illumination features. The embodiment depicted in FIGS. 69 and 70 is similar to the embodiment depicted FIG. 63 with addition of a veneer plug 740 and an intermediate portion plug 742. Veneer plug 740 may be cut from surrounding veneer and surface material of furniture component 707 and subsequently repositioned within the resulting opening in the furniture component. Intermediate portion plug 742 may be fitted within the hole in the work surface via a press-fit or other manner, and veneer plug 740 is placed inside the hole and supported on intermediate portion plug 741 with the grain of veneer plug 740 rotated relative to the grain of the surrounding veneer 706, thereby providing an indication of the location of emitter 708. Of course, veneer plug 740 may be provided without intermediate portion plug 742 being present, such as when veneer plug 740 is supported directly on emitter 708, for example. The embodiment depicted in FIGS. 71 and 72 is similar to the embodiment depicted FIG. 63 with addition of a second surface pattern 746 provided to indicate the exact location of emitter 708. A plurality of illumination markers 512 are provided, shown surrounding primary coil 708 such that light may pass through apertures in pattern 746 to mark the hot-spot. The features described in FIGS. 69 to 72 may be combined with slanted-hole lighting blocks to create additional illumination effects.

Figure 73:
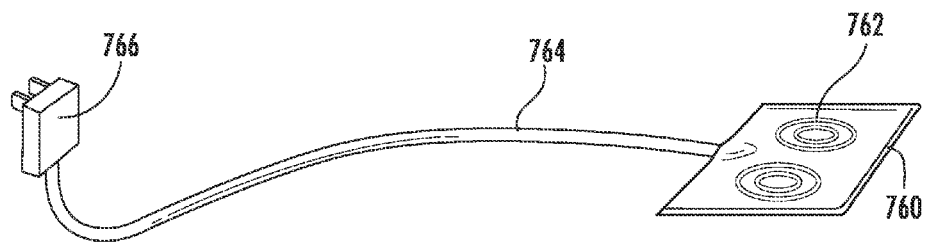
FIGS. 73 to 76 are perspective and elevation views of wireless power systems to interconnect multiple furniture components.
Figure 74:
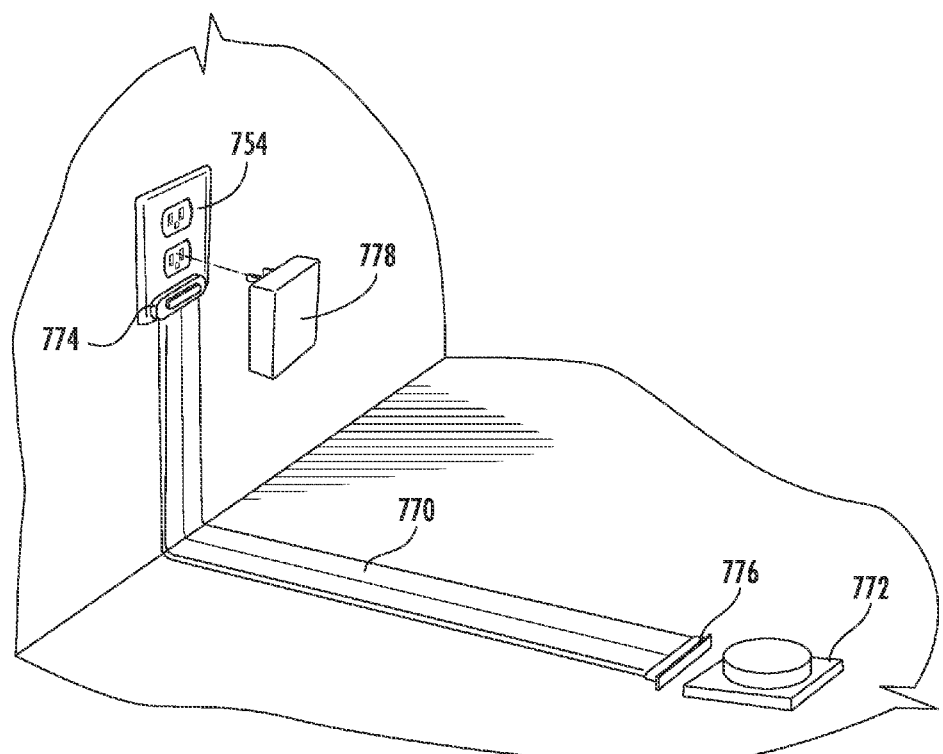
Figure 75:
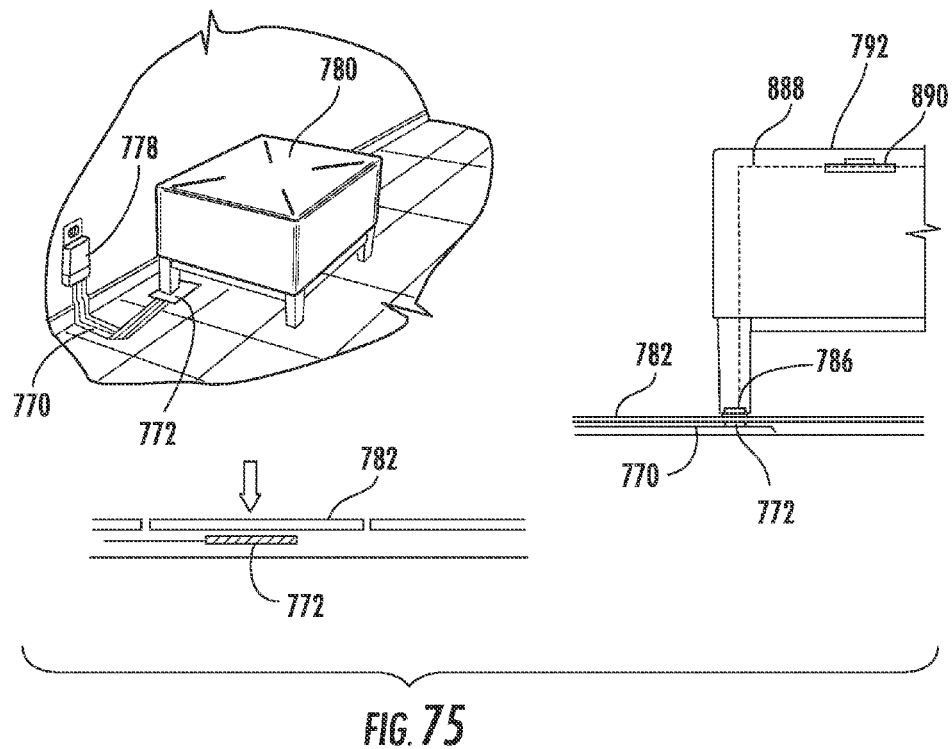
Figure 76:
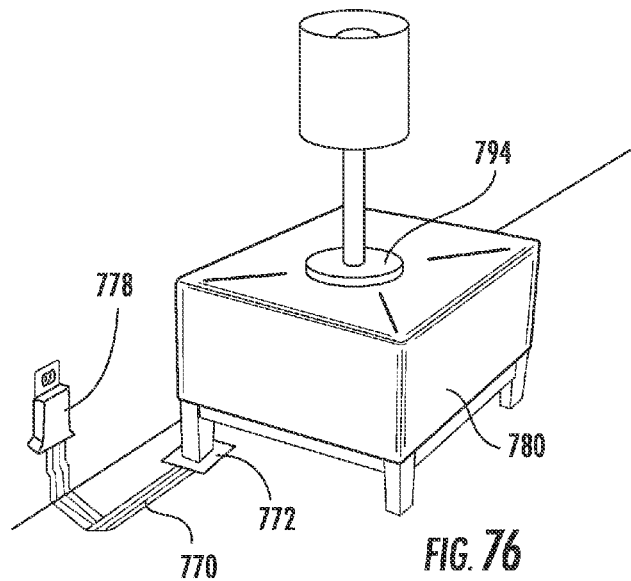

A plurality of embodiments of energy source connectors comprising energy sources and adapted powering a furniture component are disclosed in FIGS. 73 to 76. FIG. 73 illustrates an energy source housing 760 comprising energy sources 762, illustratively inductive coils, powered by converter 766 through a cable 764. A converter 766 adapts AC power to the power and transmission requirements of energy source 762. FIG. 74 illustrates a harness 770, illustratively a flat multi-conductor cable, having a connector 776 at one end for electrically coupling to an energy source housing 772 and being electrically coupled to a connector 774 at the opposite end. A converter 778 plugs into an AC receptacle and is provided with a connector which couples electrically to connector 774. Housing 772 comprises a primary coil of an inductive coupling. FIGS. 75 and 76 illustrate an installation of the system disclosed in FIG. 74 wherein harness 770 and housing 772 are positioned beneath flooring 782, illustratively carpeting, such that component 780 may be placed on top of housing 772 to receive energy therefrom through receiver 786 located in one of its legs and electrically coupled to housing 890 through cable 888. Housing 890 comprises a primary coil for providing a hot-spot on working surface 792 to power load 794, illustratively a lamp.

Figure 77:
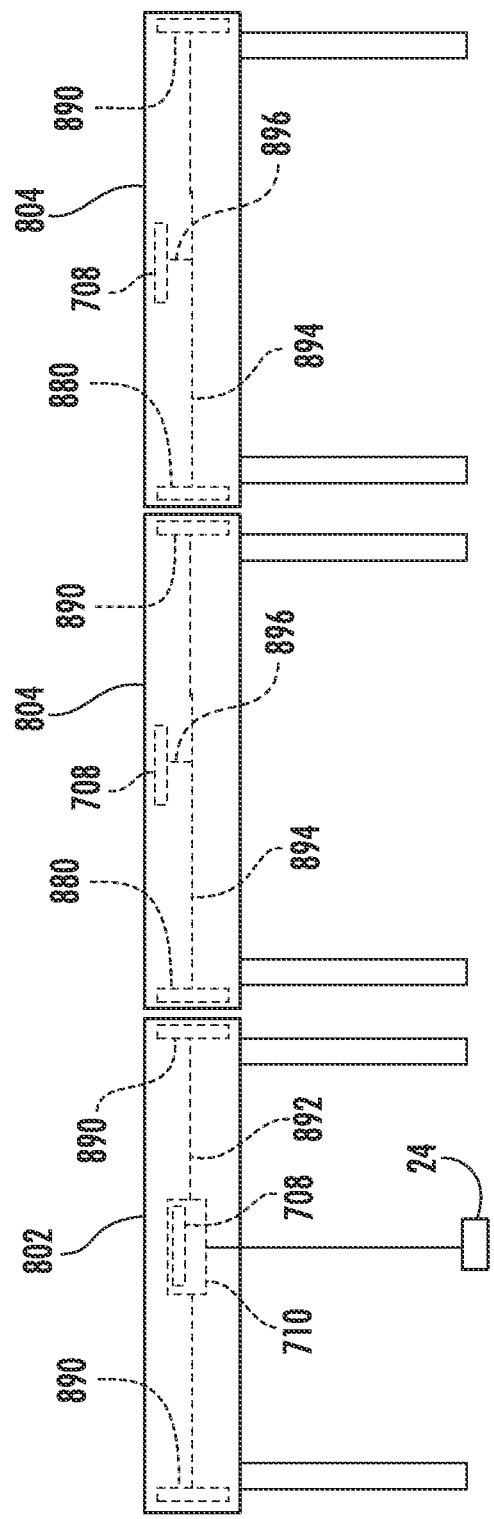
FIGS. 77 and 78 are schematic elevation and perspective views of systems to connect multiple furniture components to wirelessly power one from the other.

FIG. 77 illustrates an embodiment of the invention in which energy emitters and receivers in furniture components which advantageously provide flexibility in the design of large arrangements made from sectional components. FIG. 77 illustrates diagrammatically how various sections may be connected. First table 802 comprises emitters 890, energy source housing 710, and emitter 708 electrically coupled to emitters 890 through conductor 892. Energy is provided from power source 24, which in one exemplary embodiment is a receptacle sourcing 110 volts AC, to electronic components in energy source housing 710. Power is thus provided to emitters 890 and 708. Second table 804 comprises receiver 880 and emitter 890 coupled to receiver 880 with or through conductor 894. Conductor 896 sources emitter 708 as well. An electronic assembly, not shown, may also be provided to split or distribute energy among various emitters. A plurality of second table 804 may be provided to receive power from a plurality of emitters 890 from first table 802. Receiver 880 and emitter 890 may also comprise electronic circuitry necessary to split the inductive power received through receiver 880 into power provided to emitter 708 and/or emitter 890. In one embodiment, a 1 KW connection may support 10 ganged tables, each table having two 5 W energy emitters, e.g. charging stations, used simultaneously. Monitoring connections may be provided on energy source housing to monitor loading and prevent overloading the circuit in the event charging stations are not used as directed or by faulty charging devices. As used herein the terms emitter and receiver include not only inductive power transfer components such as primary and secondary coils but also primary and secondary antennas for transferring RF power.

Figure 78:
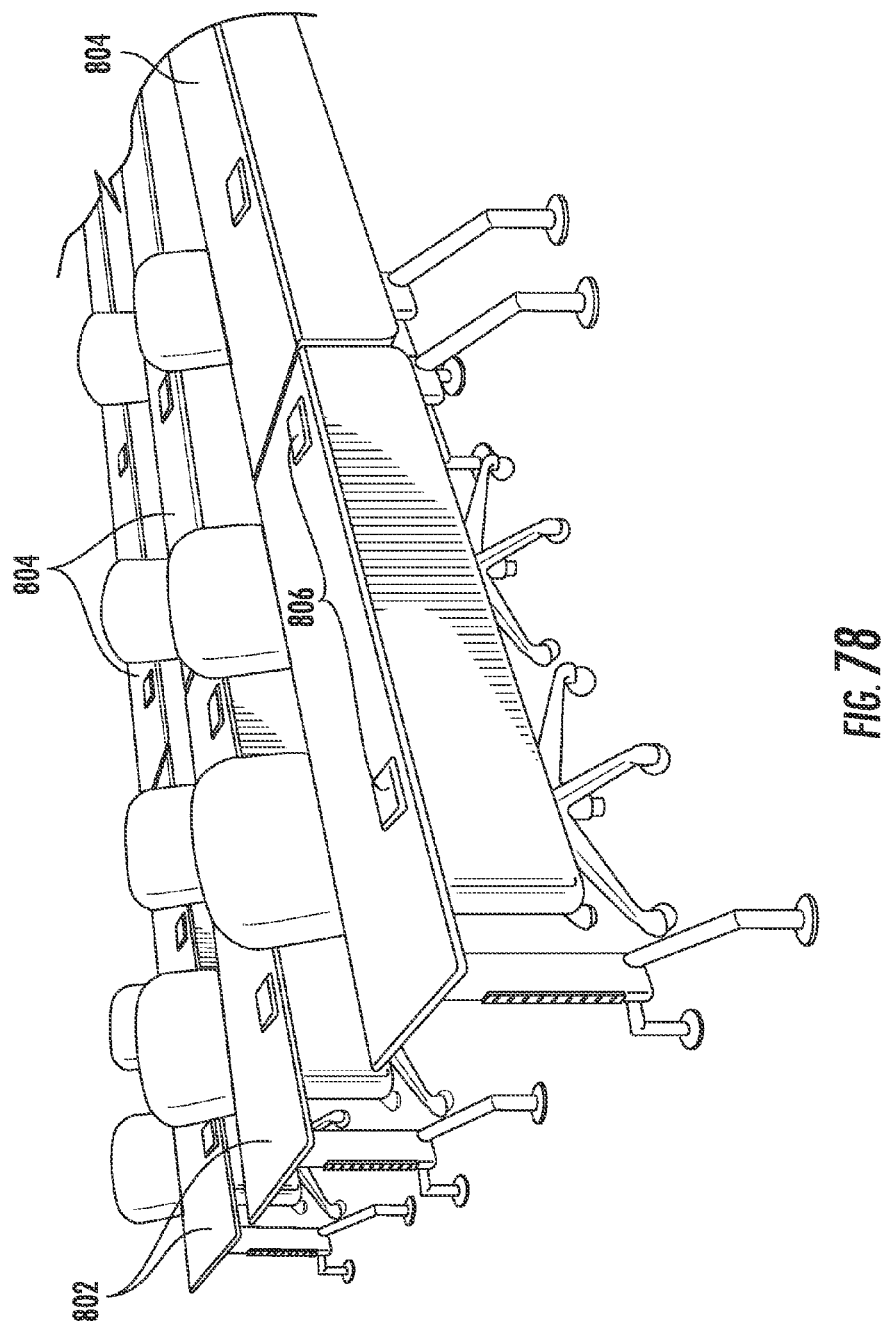

FIG. 78 shows a conference or educational setting comprising a plurality of rows of interconnected table sections comprising first tables 802 and second tables 804. First tables 802 and second tables 804 are inductively coupled in the manner shown in FIG. 77. However, instead of inductive primary coils, conductive surfaces are provided on the working surfaces such as those comprising pads 42 and shown in FIGS. 12 and 14. Power to conductive surfaces 806 is provided by conductors 896 as described above.

Figure 79:
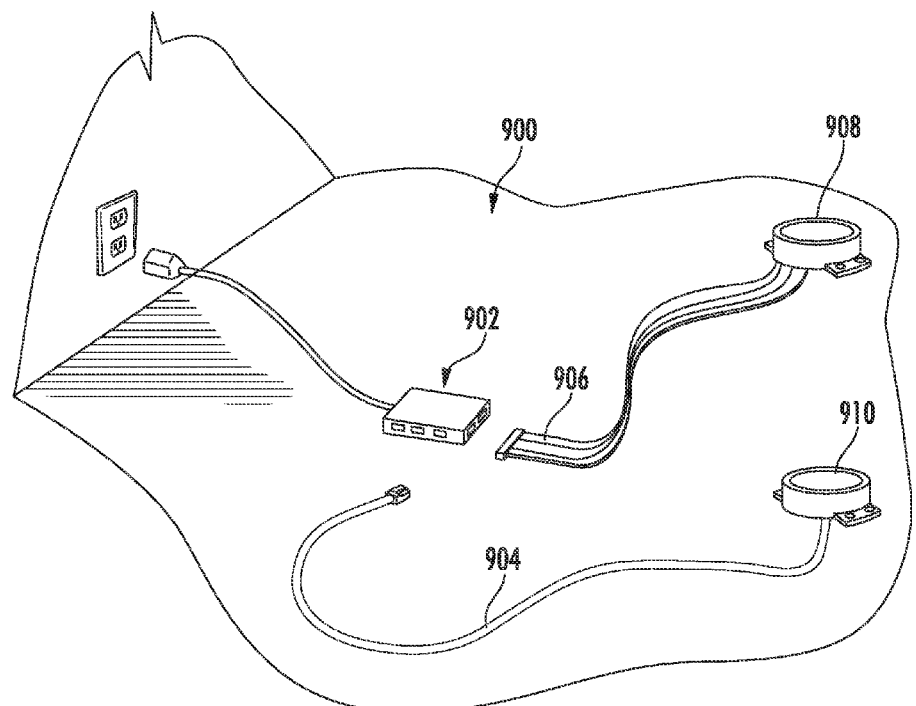
FIGS. 79 to 82 are perspective views of wireless power cabling systems.

FIG. 79 illustrates a system 900 operable to power a pair of housings 908 and 910 from a converter 902 through a pair of cables 906 and 904. Housings 908 and 910 include power sources which may be the same or may be different, e.g. inductive coil, acoustic transmitter, RF transmitter and the like. Cables 904 and 906 are shown illustrating different connectors and configurations, e.g. flat cable and non-flat cable.

Figure 80:
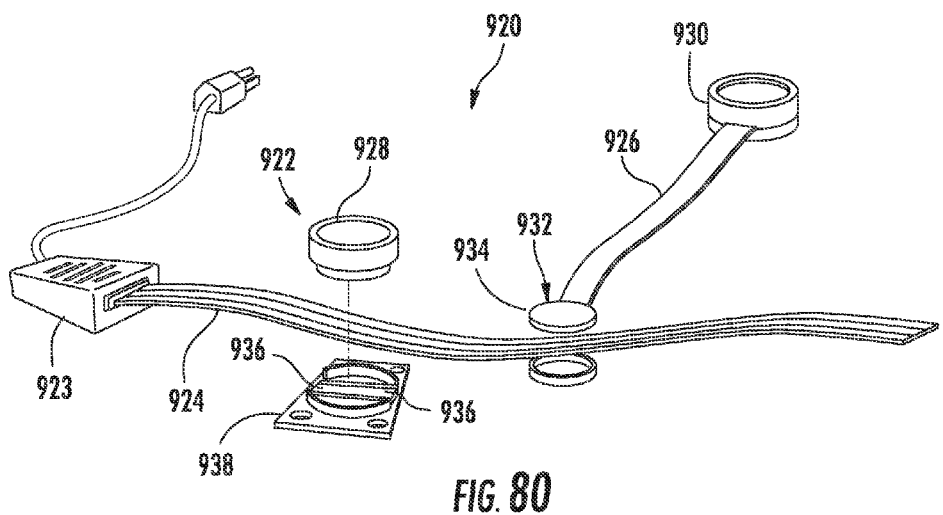

FIG. 80 illustrates a system 920 operable to power a pair of housings 922 and 930 from a converter 923 through a pair of cables 924 and 926. Cable 924 may include connectors or may be adapted to receive connectors from housing 928 and housing 932. Housing 922 comprises a base portion 938 and a top 928, base portion 938 positioned beneath cable 924 and top 928 positioned above and interlocking with base portion 938 securing housing 922 on cable 924. Base portion 938 comprises a pair of walls which receive top 928 while forming two openings 936 therebetween enabling cable 924 to pass therethrough. One of top 928 and base portion 938 includes connectors, e.g. pins, which electrically couple housing 922 to cable 924. The pins may be received by female receptacles in cable 924 (not shown) or may penetrate a casing of cable 924 to contact wires disposed within the casing. Housing 932 is similar except that housing 928 includes an energy source while housing 932 couples to cable 926 to power an energy source inside housing 930.

Figure 81:
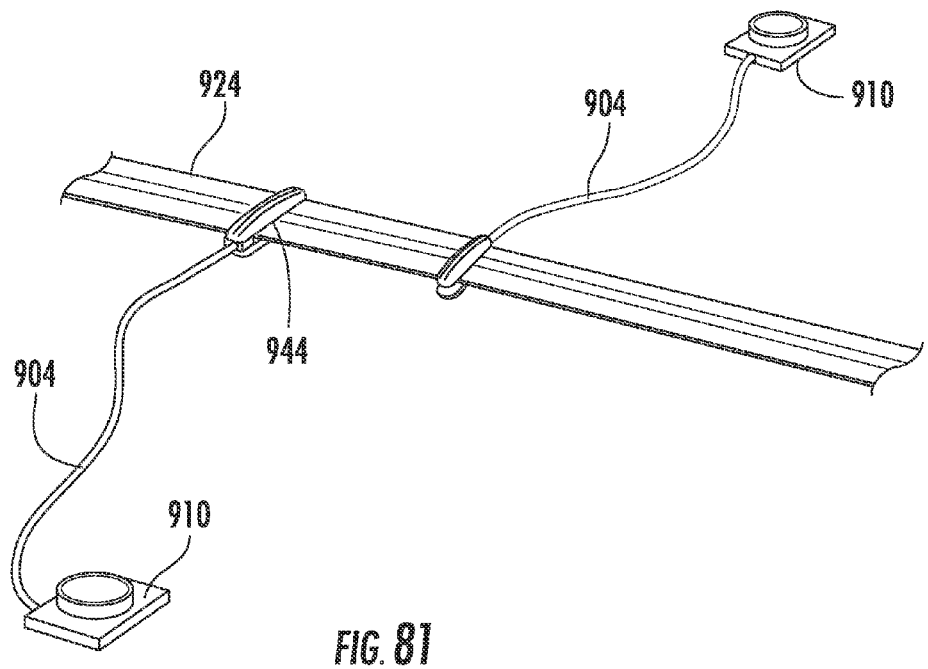

FIG. 81 illustrates a connector 944 comprising two portions forming a gap designed to snugly receive cable 924. Connector 944 may be formed as a single-piece construction adapted to slide from one side of cable 924 to establish an electrical connection therewith. Connector 944 may also comprise a top portion hinged to a bottom portion on one side of connector 944 and a retainer, e.g. snap finger, ring and the like, adapted to hold the unhinged sides of the top and bottom portions together to press the top and bottom portions against cable 924. As in housing 922, connector 944 includes pins configured to penetrate into cable 924 to make electrical contact with conductors therein.

Figure 82:
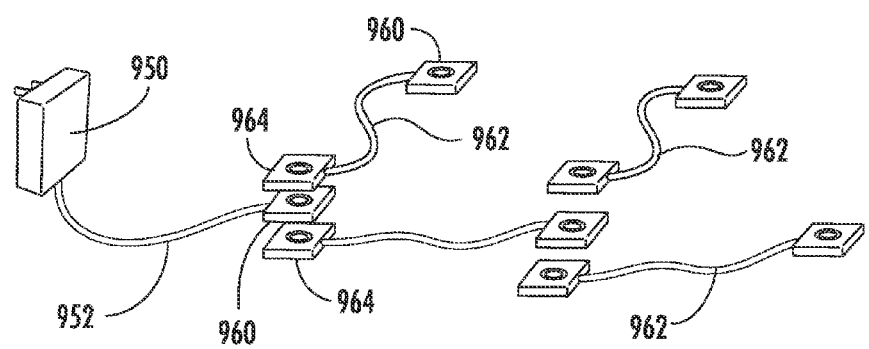

FIG. 82 illustrates a distribution system comprising a plurality of power extensions having stackable housings. The distribution system comprises a power converter 950 adapted to receive AC power and convert the AC power to a suitable power signal transmitted over a cable 952 to a housing 960 comprising a primary inductive coil. Each stackable extension includes a cable 963 connecting a secondary housing 964 having a secondary inductive coil. Housings 964 may be stacked with a housing 960 to transmit power from housing 960 to housings 964 and from there, power is transferred through cables 962 to housings 960 from where power may be further transmitted as described above.

Figure 83:
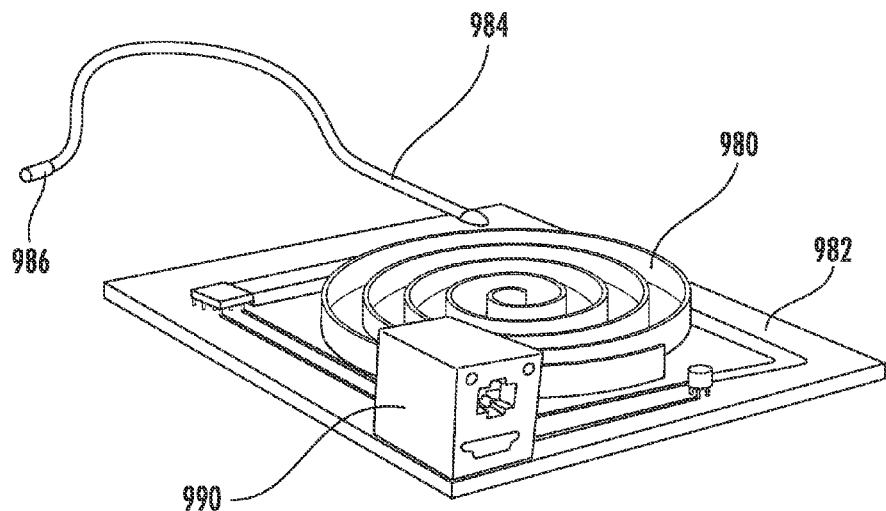
FIGS. 83 and 84 are perspective views of wireless power components with multi-signal features.

FIG. 83 illustrates a component suitable for incorporation in the housings described above. The component includes electronic circuit 982 operably coupled to a wireless energy source, e.g. coil 980, cable 984 and auxiliary output 990. Cable 984 may be any cable including an optical cable for energizing marker 986. Auxiliary output 990 may transmit signals, e.g. USB, internet, phone and the like.

Figure 84:
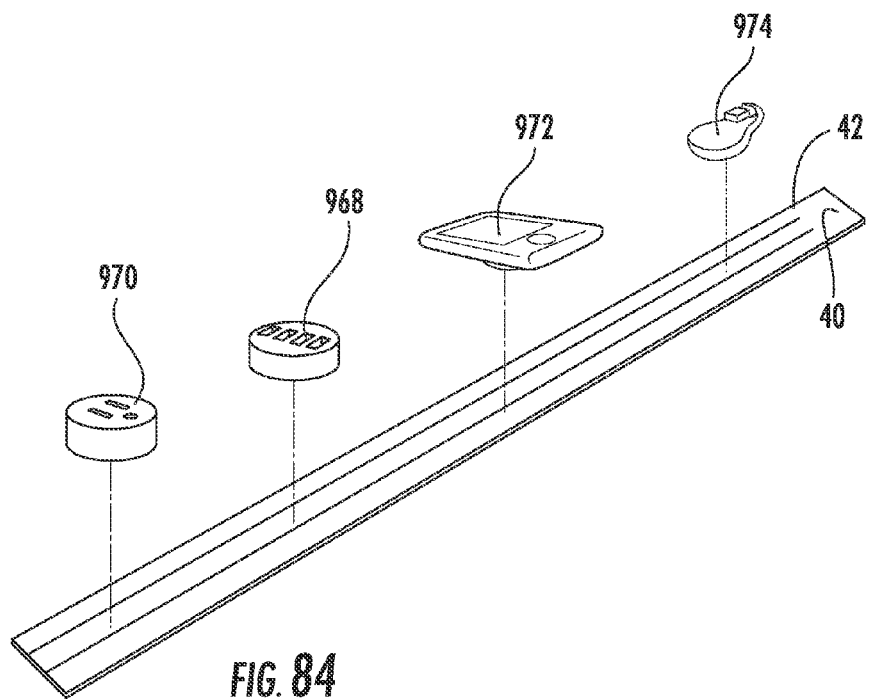

FIG. 84 illustrates grommet 40 having pads 42. Power provided to pads 42 is received by each of a device adapter 974 having a male plug configured to plug into a female receptacle of device 30, a device 972 which includes contacts adapted to electrically couple with pads 42, a converter 968 having USB or micro-USB female receptacles and circuits therein to convert power received from pads 42 to a DC power signal compatible with devices powered by USB or micro-USB standard male plugs, and a converter 970 having 110 VAC female receptacle and circuits therein to convert power received from pads 42 to a 110 VAC signal for the 110 VAC female receptacle. Advantageously, such converters expand the utility of grommet 40 by powering multiple devices having disparate power requirements from a common power signal.

Figure 85:
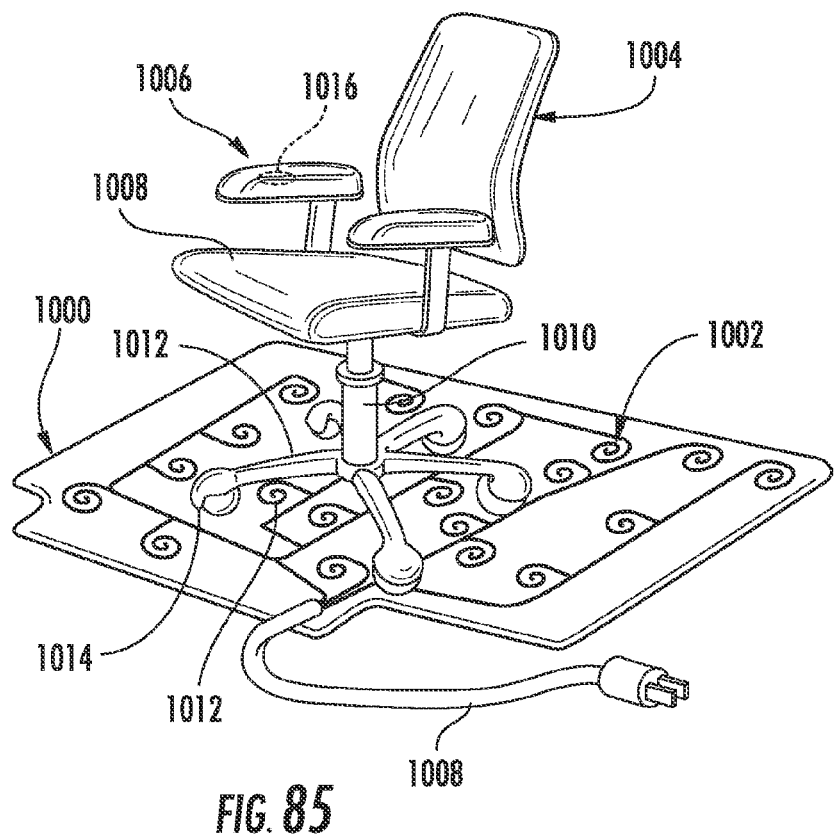
FIGS. 85 to 87 are perspective and elevation views of a wireless power mat powering devices on a seating furniture component.
Figure 86:
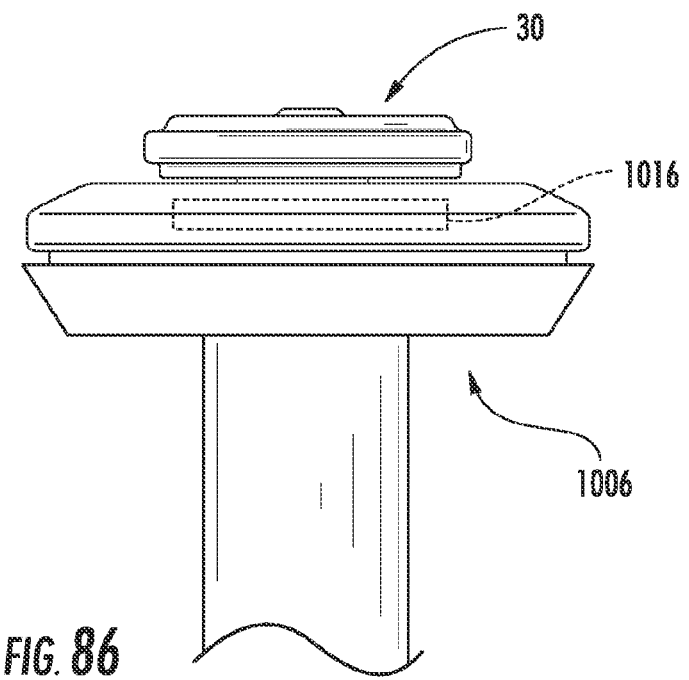
Figure 87:
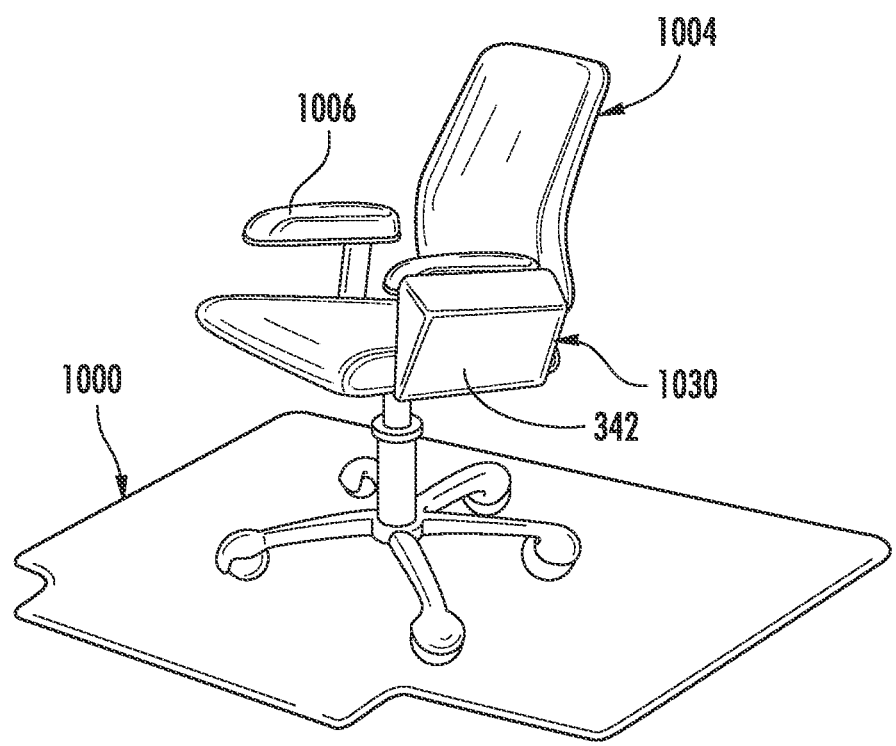
Figure 88:
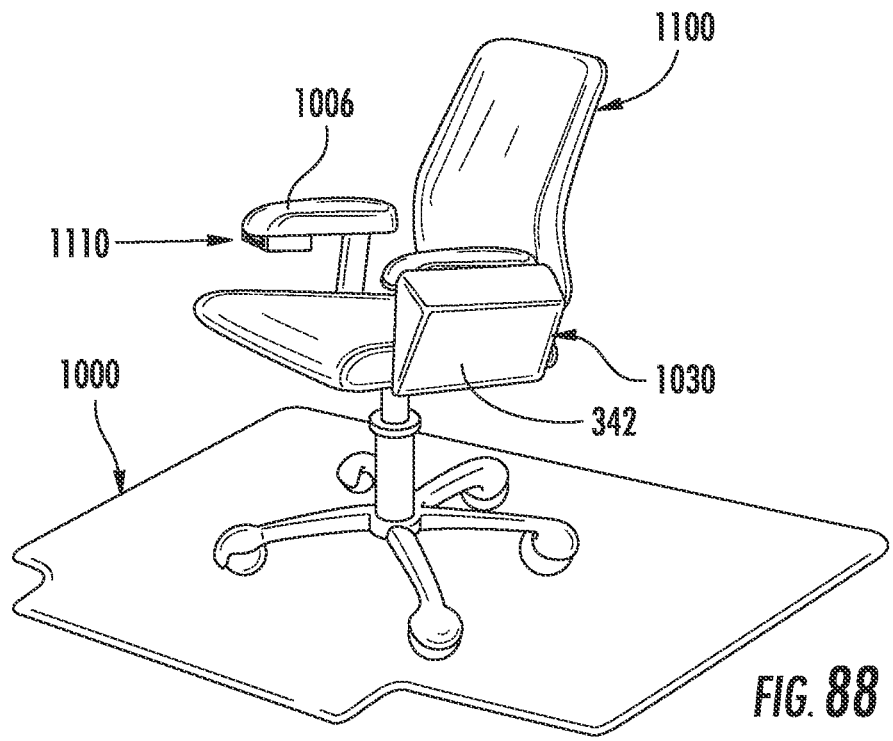
FIGS. 88 to 92 are perspective and elevation views of a seating furniture component including an inductive power transfer device.
Figure 89:
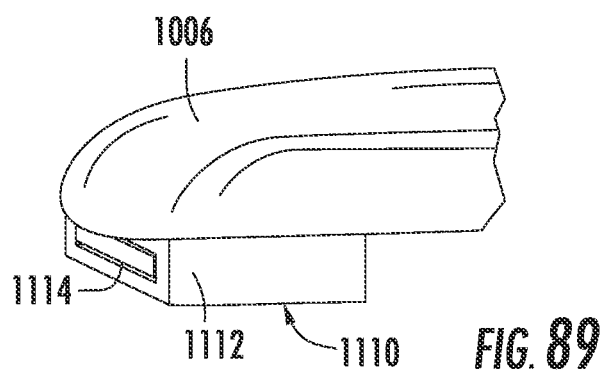
Figure 90:
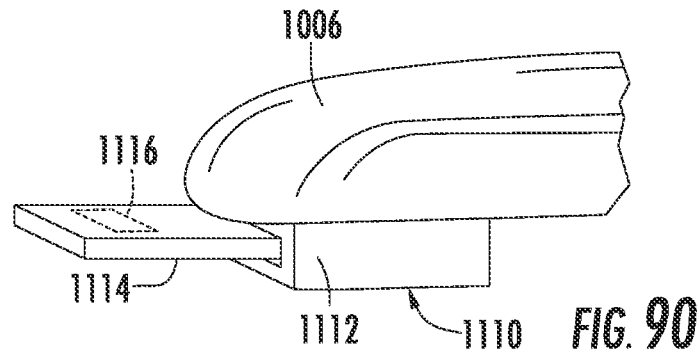

FIGS. 85 to 87 are perspective and elevation views of a powering mat and a seating furniture component adapted to receive power from the mat and to provide power to devices in or attached to the seating furniture component. Generally, a seating furniture component includes a support structure and a seating device configured to seat a person thereon. The support structure may, but does not have to, comprise wheels to provide mobility.

FIG. 85 illustrates a mat 1000 comprising a network of energy sources 1002 which are powered by a cable 1008. A seating furniture component, illustratively chair 1004, includes a pair of armrests 1006. In the present embodiment, an armrest 1006 comprises an energy source 1016. Chair 1004 further includes a plurality of energy receivers (not shown) supported by a plurality of legs 1012 and positioned sufficiently near mat 1000 to receive energy from energy sources 1002. A receiver may comprise a housing and an energy receiver, e.g. inductive coils, RF receivers, contacts, acoustic receivers, and the like. Receivers may have a receiving surface positioned parallel to mat 1000 and in proximity therewith. Legs 1012 are supported by casters 1014 at one end and connected to support 1010 at the other. Support 1010 supports seating 1008 and armrests 1006. The energy receivers receive energy from energy sources 1002 and provide it to energy sources 1016 with a cable (not shown). In another embodiment, a plurality of casters 1014 supporting legs 1012 comprise a portion of the receivers which are adapted to receive energy conductively from mat 1000. In the present embodiment, energy sources 1002 comprise conductive pads such as pads 42. Device 30 is shown supported by armrest 1006 for charging. In the present embodiment, device 30 comprises a receiving, or secondary, coil. FIG. 87 illustrates a hook-on case 1030 which is similar to hanger 340 except that it only has one pocket 342. Hook-on case 1030 may be electrically coupled to chair 1004 wirelessly or it may be wired.

In another embodiment, a seating furniture component comprises an extension assembly configured to extend and retract an inductive coil to transmit or receive power wirelessly. Exemplary seating furniture components include chairs. Referring to FIGS. 88 to 91, a chair 1100 is shown having an armrest 1006 and an extension assembly 1110.

Extension assembly 1110 comprises a housing 1112 having a cavity therein (not shown) adapted to receive an extendable support 1114 supporting an inductive coil 1116. As stated previously, the term coil refers to either an inductive transmitter or receiver inductor. An inductive device comprises an inductor and may include a capacitor, forming an LC circuit with the inductor, and additional electronic devices configured to, for example, modify the form of the power. Extendable support 1114 may retract into housing 1112, as shown on FIG. 89, or may extend to expose coil 1116, as shown on FIG. 90. In one variation, extension assembly 1110 includes an extension mechanism (not shown) configured to extend extendable support 1114 and to hold extendable support 1114 in its retracted position when extendable support 1114 is retracted into the cavity. In one example, the extension mechanism includes a retention feature which is engaged when a user pushes extendable support 1114 into housing 1112, a biasing feature, such as a spring, and a release feature, such as a tab. When the release feature is engaged by the user, the release feature releases the retention feature causing the biasing feature to exert a biasing force against extendable support 1114, thereby causing extendable support 1114, and coil 1116, to extend out of the cavity. Known extension assemblies are commercially used in compact disc and digital video disc players to enable users to insert discs into the players. In one example, the retention feature comprises a protrusion and a mating cavity, one of the protrusion and the mating cavity positioned on a surface of extendable support 1114 and the other positioned in a flexible tab (not shown) attached to housing 1112. In its normal position, the flexible tab causes the protrusion and the cavity to mate. When the flexible tab is engaged, the protrusion and the cavity become decoupled, enabling the biasing feature to extend extendable support 1114.

Figure 91:
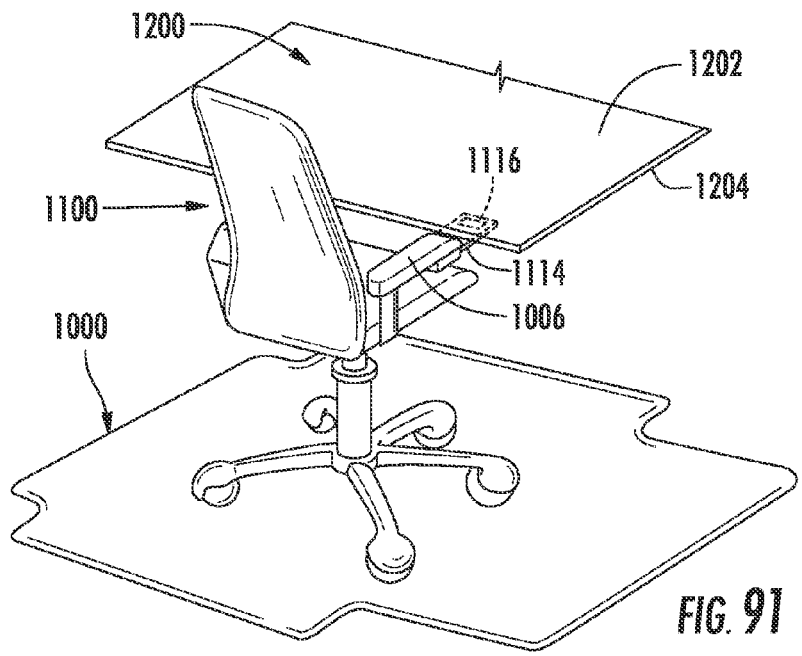

Referring to FIG. 91, chair 1100 is shown adjacent a furniture component 1200 having a working, or top, surface 1202, and a non-working, or bottom, surface 1204. When extendable support 1114 is extended and chair 1100 is positioned adjacent furniture component 1200, power may be transferred wirelessly to or from chair 1100 through coil 1116 to a second inductive device supported by furniture component 1200. In one variation, the inductive devices are tuned to their resonant frequency. In one example, the inductive devices are driven at a frequency range in the megahertz range to increase the transfer efficiency through furniture component 1200. In one example, a portion of furniture component 1200 has a thickness of about 0.0625 inch ($\frac{1}{16}^{th}$ inch) or more, and the inductive wireless power transfer device is configured to transfer power wirelessly through the thickness of the portion of furniture component 1200. In another example, the portion of furniture component 1200 through which power is transferred wirelessly has a thickness of about 0.2500 inch ($\frac{1}{4}^{th}$ inch). In yet another example, a portion of furniture component 1200 through which power is transferred wirelessly has a thickness equal to or greater than about 20 millimeters. In a yet further example, a portion of furniture component 1200 through which power is transferred wirelessly has a thickness equal to or greater than about 30 millimeters. In the preceding examples, the portion through which the inductive transmitter device transfers power may be thinner, thicker, or may have the same thickness as, the working platform. Exemplary arrangements forming inductive couplings through furniture component 1200 are shown on FIGS. 92A to 92C.

In the embodiments described with reference to FIGS. 85 to 91, power is received by a furniture component wirelessly from a mat positioned on the floor supporting the furniture component. The mat includes inductive transmitter devices and the furniture component includes inductive receiver devices. In further embodiments, the inductive transmitter devices are supported by the floor without a mat. In one example, described with reference to FIGS. 75 and 76, housing 772, comprising a primary coil of an inductive coupling, is positioned beneath flooring 782. Exemplary flooring 782 includes materials such woven carpet, laminate, wood, vinyl, linoleum, bamboo, cork, foam, stone and slate, in any shape or form.

In one variation, housing 772 or any other inductive transmitter device as described herein is supported by a raised floor tile. A raised floor comprises a horizontal frame supporting a plurality of floor tiles and supported by a plurality of vertical supports. A raised floor enables management of cables and air conditioning ducts under the tiles. In one example, a plurality of inductive transmitter devices is positioned beneath and adjacent the floor tiles. In another example, a transmitter network is laid on the tiles, on either of the tiles' surfaces, or intermediate the surfaces. The transmitter network may comprise a network of printed coils. The transmitter network may also comprise networks as described with reference to FIGS. 34 to 37.

Figure 92A:
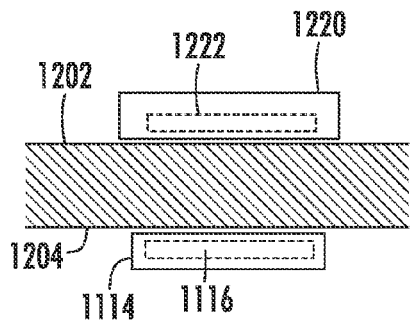

In another variation of the present embodiment, an inductive receiver coupled to a mobile device is positioned on the working surface and receives power wirelessly through the furniture component. Referring to FIG. 92A, a mobile device 1220 including an inductive receiver 1222 is shown positioned on surface 1202. Beneath furniture component 1200, extendable support 1114 supports coil 1116, which in this embodiment functions as an inductive transmitter. Power is transferred by chair 1100 through coil 1116, furniture component 1200 and inductive receiver 1222 to mobile device 1220. The position of chair 1100 determines the location of a hotspot on surface 1202 of furniture component 1200. Chair 1100 may be powered by mat 1000 or by an energy storage device, e.g. a battery, supported by chair 1100.

Figure 92B:
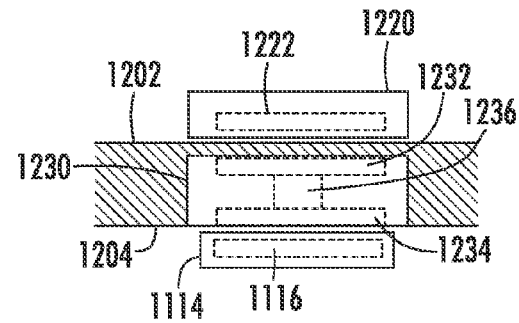

In a further variation of the present embodiment, an intermediate inductive receiver and an intermediate inductive transmitter are interposed between the inductive receiver coupled to the mobile device and the inductive transmitter supported by the seating furniture component. The intermediate inductive receiver and transmitter enable an increased wireless transfer distance between the mobile device and the seating furniture component. A control device converts the power received through the intermediate receiver into power which is then transmitted by the intermediate transmitter to the mobile device. Referring to FIG. 92B, a grommet 1230, housing therein an inductive transmitter 1232, a control device 1236 and an inductive receiver 1234, is shown embedded in furniture component 1200. In the present variation, power is transferred by chair 1100 through coil 1116 to inductive receiver 1234. A magnetic core is an exemplary control device 1236. The current induced in inductive receiver 1234 by coil 1116 is magnetically transmitted to inductive transmitter 1232 and, therethrough, to inductive receiver 1222. Thus, the currents induced in the intermediate devices have the same frequency. In part due to the ease with which the magnetic coupling can be extended or contracted by changing the length of the magnetic core, the distances between the inductive devices can be optimized to maximize power transfer with or without forming a resonant coupling.

Figure 92C:
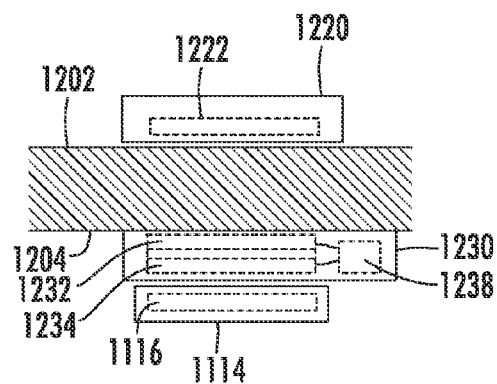

In a yet further variation of the present embodiment, the control device is a control circuit. The control circuit may change the form of the power induced in the intermediate receiver to drive the intermediate transmitter. For example, the frequency of induced power can be increased or decreased to drive the intermediate transmitter coil. Referring to FIG. 92C, a control device 1238 is shown electrically connected to intermediate devices 1232 and 1234. Grommet 1230 is shown adjacent non-working surface 1204. The inductive coupling between intermediate inductive transmitter 1232 and inductive receiver 1222 may be a resonant inductive coupling, particularly if the thickness of furniture component 1200 exceeds about 20 milimeters. In one example, a plurality of intermediate inductive transmitters form an inductive transmission network driven by the intermediate inductive receiver. Exemplary inductive transmitter networks have been described with reference to FIGS. 34 to 37. In another example, a plurality of intermediate inductive receivers form an inductive reception network similar to the exemplary inductive transmitter networks described with reference to FIGS. 34 to 37. The inductive reception network, when positioned beneath the working surface, enables the seating furniture component to pair with any of the plurality of intermediate inductive receivers.

The intermediate inductive devices form inductive couplings with the inductive device of the seating furniture component and with the inductive device coupled to the electrical load. Advantageously, the two inductive couplings can be arranged in different configurations to suit different purposes. One or both conductive couplings can be resonant inductive couplings. Alternative, only the first or the second conductive coupling may be resonant, depending on design considerations such as the position of the intermediate inductive devices in relation to the working surface, and the size, thickness, materials and type of furniture component 1200.

The embodiments described hereinabove in connection with a seating furniture component supporting an inductive device have been described in the context of power transmitted from the seating furniture component to a mobile device. In further variations, power is transferred wirelessly from furniture component 1200 to the seating furniture component. In one example, intermediate device 1232 is powered and configured to form an inductive coupling with coil 1116. In the present example, intermediate device 1232 functions as a wireless transmitter device. Intermediate device 1232 may be powered by an energy storage device supported by furniture component 1200 or by another power source, such as an AC source, powering intermediate device 123 through a suitable power converter. In another example, furniture component 1200 comprises an inductive transmission network on its non-working surface adapted to transfer power wirelessly to the seating furniture component. The inductive transmission network may comprise grommets as shown with reference to FIGS. 92B and 92C, albeit with the direction of transmission reversed. In another example, an inductive transmitter is positioned on working surface 1202 of furniture component 1200 to transfer power through furniture component 1200 to coil 1116, which in this example functions as an inductive receiver, without intermediate inductive devices.

Additional embodiments of inductive networks will now be described with reference to FIGS. 93 to 95. Referring to FIG. 93, a furniture component 1300 is shown having a working surface 1302 and a plurality of grommet 1310 embedded therein. Each grommet 1310 includes a housing 1320 and a base 1340 configured to secure grommet 1310 to furniture component 1330. An inductive device 1330 is positioned in housing 1320. A plurality of conductor 1350 electrically couple the plurality of grommet 1310 and inductive device 1330. A power converter 1360 is shown having conductors 1364 and 1354 extending therefrom. In one example, power converter 1360 receives AC power from conductor 1364 and converts the AC power to an AC form suitable to induce power wirelessly with one or more of inductive device 1330, which in this example functions as an inductive transmitter. In another example, each grommet 1310 also comprises a converter operable to receive power from power converter 1360 and to convert same to a form suitable to induce power wirelessly with one or more of inductive device 1330. In the present example, power converter may convert higher voltage AC power to lower voltage AC power, e.g. 110 volts to 24 volts, or higher voltage AC power to DC power, e.g. 110 volts AC to 12 volts DC.

Referring to FIG. 94, in another embodiment of an inductive network a furniture component 1400 is shown having a working surface 1402 and a plurality of grommet 1410 supported from the non-working surface of furniture component 1400. Each grommet 1410 includes a housing 1420. In the present embodiment, power converter 1360 provides each inductive device 1330 power of a form suitable to induce a current and transfer power wirelessly through furniture component 1400.

Referring to FIG. 95, in a further embodiment of an inductive network, furniture component 1400 supports a plurality of grommet 1510 from its non-working surface. Each grommet 1510 includes a housing 1520. Housing 1520 houses inductive device 1330 and a power converter 1530. In the present embodiment, power converter 1530 provides inductive device 1330 power of a form suitable to induce a current and transfer power wirelessly through furniture component 1400. Conductors 1550 provide power to the plurality of power converter 1530. In one example, the power provided by conductors 1550 is higher voltage AC power.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A furniture component for transferring power wirelessly, the furniture component comprising:
   a support structure;
   a seating device supported by the support structure and configured to seat a person thereon;
   a pivot mechanism supported by the support structure;
   a working platform supported by the pivot mechanism and configured to pivot relative to the support structure;
   a wireless power transfer device supported by the working platform, the wireless power transfer device adapted to transfer power wirelessly to an electrical load;
   a power conductor supported by the support structure, the power conductor adapted to receive electrical power at one end thereof and to provide the electrical power to the wireless power transfer device;
   wherein the wireless power transfer device comprises an inductive power transmitter; and
   wherein the inductive power transmitter includes an inductive coil and a capacitor, the capacitor adapted to tune the inductive power transmitter to a resonant frequency of the inductive power transmitter.

2. The furniture component of claim 1, wherein said working platform includes an upper surface and a lower surface, and said lower surface includes a cavity extending into said work surface without extending through said upper surface, said primary coil positioned within said cavity and disposed proximal to said upper surface.

3. The furniture component of claim 1, wherein a portion of the working platform has a thickness of at least 20 millimeters, and the wireless power transfer device is configured to transfer power wirelessly through the at least 20 millimeters thickness portion.

4. A furniture component for transferring power wirelessly, the furniture component comprising:
- a support structure;
- a seating device supported by the support structure and configured to seat a person thereon;
- a pivot mechanism supported by the support structure;
- a working platform supported by the pivot mechanism and configured to pivot relative to the support structure;
- a wireless power transfer device supported by the working platform, the wireless power transfer device adapted to transfer power wirelessly to an electrical load;
- a power conductor supported by the support structure, the power conductor adapted to receive electrical power at one end thereof and to provide the electrical power to the wireless power transfer device;
- wherein the wireless power transfer device comprises an inductive power transmitter; and
- wherein the working platform has a working surface and a non-working surface opposite the working surface, and the wireless, power transfer device is supported from the non-working surface and configured to transfer power wirelessly through the working platform.

5. The furniture component of claim 4, wherein a portion of the working platform has a thickness of at least 20 millimeters, and the wireless power transfer device is configured to transfer power wirelessly through the at least 20 millimeters thickness portion.

6. The furniture component of claim 4, wherein said non-working surface includes a cavity extending into said work surface without extending through said working surface, said primary coil positioned within said cavity and disposed proximal to said working surface.

7. A furniture component for transferring power wirelessly, the furniture component comprising:
- a support structure;
- a seating device supported by the support structure and configured to seat a person thereon;
- a pivot mechanism supported by the support structure;
- a working platform supported by the pivot mechanism and configured to pivot relative to the support structure;
- a wireless power transfer device supported by the working platform, the wireless power transfer device adapted to transfer power wirelessly to an electrical load;
- a power conductor supported by the support structure, the power conductor adapted to receive electrical power at one end thereof and to provide the electrical power to the wireless power transfer device;
- wherein the wireless power transfer device comprises an inductive power transmitter; and
- wherein the working platform has a working surface and a non-working surface opposite the working surface, further comprising an indicator element configured to indicate the location of the inductive power transmitter.

8. The furniture component of claim 7, wherein at least a portion of the working platform comprises a translucent material, and the indicator element is configured and positioned to emit light through the translucent material to indicate the location of the inductive power transmitter.

9. The furniture component of claim 7, wherein said non-working surface includes a cavity extending into said work surface without extending through said working surface, said primary coil positioned within said cavity and disposed proximal to said working surface.

10. A furniture assembly for transferring power wirelessly, the furniture assembly comprising a furniture component comprising:
- a support structure;
- a seating device supported by the support structure and configured to seat a person thereon;
- an extension assembly supported by the support structure, the extension assembly including a support member configured to move from a retracted position to an extended position; and
- a first inductive power transfer device supported by the support member,
- wherein the first inductive power transfer device is adapted, in the extended position of the support member, to inductively couple a second inductive power transfer device and transfer power therewith.

11. The furniture assembly of claim 10, further comprising a second furniture component including a working platform configured to support the second inductive power transfer device.

12. The furniture assembly of claim 10, wherein the second inductive power transfer device is coupled to a mobile device, and the first and the second inductive power transfer devices are adapted to form an inductive coupling configured to power the mobile device.

13. The furniture assembly of claim 12, wherein the inductive coupling is a resonant inductive coupling.

14. The furniture assembly of claim 13, wherein the mobile devise is supported by a working platform of a second furniture component, and the resonant inductive coupling is configured to transfer power through the working platform.

15. The furniture assembly of claim 14, wherein a portion of the working platform has a thickness of at least 20 millimeters, and the resonant inductive coupling is configured to transfer power through the at least 20 millimeters thickness portion.

16. A furniture assembly for transferring power wirelessly, the furniture assembly comprising:
- a support structure;
- a working platform supported by the support structure, the working platform including a working surface opposite a non-working surface;
- a plurality of inductive transmitters supported by the working platform and adapted to inductively power an electrical load positioned on the working surface;
- a power converter configured to receive power from a power source and to convert the power received from the power source to a converted power;
- a plurality of conductors electrically coupling the power converter and the plurality of inductive transmitters to conduct the converted power to the plurality of inductive transmitters and
- wherein a first inductive transmitter from the plurality of inductive transmitters is supported from the non-working surface of the working platform.

17. The furniture assembly of claim 16, wherein a first inductive transmitter from the plurality of inductive transmitters is adapted to form an inductive coupling with an inductive receiver coupled to the electrical load to power the electrical load.

18. The furniture assembly of claim 17, wherein the inductive coupling is a resonant inductive coupling.

19. The furniture assembly of claim 17, wherein the inductive coupling is configured to transfer power through the working platform.

20. The furniture assembly of claim 19, wherein a portion of the working platform has a thickness of at least 20 millimeters, and the inductive coupling is configured to transfer power through the at least 20 millimeters thickness portion.

\* \* \* \* \*